(12) United States Patent
Kuwamura et al.

(10) Patent No.: US 8,722,752 B2
(45) Date of Patent: May 13, 2014

(54) POLYURETHANE RESIN

(75) Inventors: Goro Kuwamura, Chiba (JP); Toshihiko Nakagawa, Ichihara (JP); Daisuke Hasegawa, Ichihara (JP); Satoshi Yamasaki, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 12/682,714

(22) PCT Filed: Oct. 14, 2008

(86) PCT No.: PCT/JP2008/068599
§ 371 (c)(1),
(2), (4) Date: Apr. 12, 2010

(87) PCT Pub. No.: WO2009/051114
PCT Pub. Date: Apr. 23, 2009

(65) Prior Publication Data
US 2010/0216905 A1    Aug. 26, 2010

(30) Foreign Application Priority Data

| | | |
|---|---|---|
| Oct. 15, 2007 | (JP) | 2007-268013 |
| Nov. 16, 2007 | (JP) | 2007-298374 |
| Nov. 16, 2007 | (JP) | 2007-298375 |
| Nov. 22, 2007 | (JP) | 2007-303324 |
| Nov. 27, 2007 | (JP) | 2007-306094 |
| Nov. 28, 2007 | (JP) | 2007-307366 |
| Dec. 12, 2007 | (JP) | 2007-321159 |
| Jul. 29, 2008 | (JP) | 2008-194377 |

(51) Int. Cl.
*C08G 18/32* (2006.01)

(52) U.S. Cl.
USPC .............. 521/170; 528/59; 528/65

(58) Field of Classification Search
CPC ................................... C08G 18/32
See application file for complete search history.

(56) References Cited

U.S. PATENT DOCUMENTS

| | | | |
|---|---|---|---|
| 4,203,916 | A | 5/1980 | Zengel et al. |
| 4,256,869 | A | 3/1981 | Schulze et al. |
| 4,275,223 | A | 6/1981 | Zengel et al. |
| 4,395,529 | A | 7/1983 | Panandiker et al. |
| 4,418,211 | A | 11/1983 | Zengel et al. |
| 4,439,370 | A | 3/1984 | Zengel et al. |
| 4,457,871 | A | 7/1984 | Zengel et al. |
| 4,467,114 | A | 8/1984 | Zengel et al. |

(Continued)

FOREIGN PATENT DOCUMENTS

| | | |
|---|---|---|
| CN | 1708524 A | 12/2005 |
| FR | 1408314 | 8/1965 |

(Continued)

OTHER PUBLICATIONS

Werner Blank Diol Tetramethylnene glycol graph of molecular weight v. Hydroxyl number. Published Jul. 6, 2006.*

(Continued)

*Primary Examiner* — Randy Gulakowski
*Assistant Examiner* — Jeffrey Washville
(74) *Attorney, Agent, or Firm* — Foley & Lardner LLP

(57) ABSTRACT

Disclosed is a polyurethane resin which is obtained by a reaction between a polyisocyanate component, which contains 1,4-bis(isocyanatomethyl)cyclohexane including not less than 80% by mole of trans isomers, and an active hydrogen compound component.

20 Claims, 1 Drawing Sheet

(56) References Cited

U.S. PATENT DOCUMENTS

| | | | |
|---|---|---|---|
| 4,486,603 | A | 12/1984 | Zengel et al. |
| 4,525,491 | A | 6/1985 | Narisawa et al. |
| 4,565,835 | A | 1/1986 | Oertel, III et al. |
| 5,523,467 | A | 6/1996 | Okazaki et al. |
| 5,571,623 | A | 11/1996 | Kuriyama et al. |
| 5,576,412 | A | 11/1996 | Hirata et al. |
| 5,750,580 | A | 5/1998 | Mayer et al. |
| 5,906,704 | A * | 5/1999 | Matsuura et al. .......... 156/331.4 |
| 6,242,555 | B1 | 6/2001 | Du Prez et al. |
| 7,232,859 | B2 | 6/2007 | Argyropoulos et al. |
| 2002/0032297 | A1 | 3/2002 | Carlson et al. |
| 2004/0087754 | A1* | 5/2004 | Foley et al. ..................... 528/59 |
| 2005/0107562 | A1 | 5/2005 | Leberfinger et al. |
| 2005/0209427 | A1* | 9/2005 | Detrembleur et al. .......... 528/44 |
| 2006/0058453 | A1* | 3/2006 | Argyropoulos et al. ...... 524/589 |
| 2007/0148471 | A1* | 6/2007 | Rukavina et al. .......... 428/423.1 |
| 2007/0265388 | A1 | 11/2007 | Argyropoulos et al. |
| 2008/0070043 | A1 | 3/2008 | Arai et al. |

FOREIGN PATENT DOCUMENTS

| | | |
|---|---|---|
| JP | 55-9699 | 1/1980 |
| JP | 58-025364 A | 2/1983 |
| JP | 59-117521 A | 7/1984 |
| JP | 59-145129 A | 8/1984 |
| JP | 59-187019 A | 10/1984 |
| JP | 60-032815 A | 2/1985 |
| JP | 62-246547 | 10/1987 |
| JP | 63-08097 | 1/1988 |
| JP | 02-269139 | 11/1990 |
| JP | 03-220167 | 9/1991 |
| JP | 05-086161 A | 4/1993 |
| JP | 06-091682 A | 4/1994 |
| JP | 07-018055 | 1/1995 |
| JP | 07-126521 A | 5/1995 |
| JP | 07-166072 | 6/1995 |
| JP | 07-292061 | 7/1995 |
| JP | 7-309827 A | 11/1995 |
| JP | 08-176268 | 7/1996 |
| JP | 9-003154 A | 1/1997 |
| JP | 09-323968 | 12/1997 |
| JP | 11-080378 | 3/1999 |
| JP | 11-310566 A | 11/1999 |
| JP | 2003-201331 | 7/2003 |
| JP | 2003-212835 A | 7/2003 |
| JP | 2003-261643 | 9/2003 |
| JP | 2004-501997 A | 1/2004 |
| JP | 2004-099748 | 4/2004 |
| JP | 2004-150610 A | 5/2004 |
| JP | 2004-169011 A | 6/2004 |
| JP | 2004-224970 A | 8/2004 |
| JP | 2004-244349 A | 9/2004 |
| JP | 2004-285359 | 10/2004 |
| JP | 2005-096432 A | 4/2005 |
| JP | 2005-281390 | 10/2005 |
| JP | 2006-504843 A | 2/2006 |
| JP | 2006-504849 A | 2/2006 |
| JP | 3911030 B2 | 2/2007 |
| WO | WO-02/00749 A2 | 1/2002 |
| WO | WO 2004/041890 * | 5/2004 |
| WO | WO 2004/041890 A1 | 5/2004 |
| WO | WO 2006/040965 A1 | 4/2006 |

OTHER PUBLICATIONS

Dow Answer Center. Calculations to determine OH number.*
Office Action in U.S. Appl. No. 12/744,976 dated Apr. 28, 2011.
Communication (Supplementary EP Search Report) in EP Appln No. 08 83 9749 dated Nov. 30, 2011.
Office Action Chinese Application No. 200880111417.8 dated Jul. 20, 2012.
Baole Han et al., "Applications of Polyurethanes in Modern Automobile Industry", CPUIA Conference 2006, pp. 44-59.
Office Action in U.S. Appl. No. 12/682,858 dated Mar. 19, 2012.
Final Office Action U.S. Appl. No. 12/744,976 dated Sep. 1, 2011.
International Search Report mailed Dec. 22, 2008 received in PCT/JP2008/068577.
Non-Final Office Action U.S. Appl. No. 12/682,858 dated Jan. 10, 2012.
Non-Final Office Action U.S. Appl. No. 12/682,858 dated Mar. 5, 2013.
S. Yamasaki et al., "Effects of aggregation structure on rheological properties of thermoplastic polyurethanes", Polymer, vol. 48, (2007), pp. 4793-4803.
Yu-Chin Lai et al., "Synthesis and Polymerization of Some New Bis-Triazolinediones: A Stability Study of 4-Substituted Triazolinediones", J. Macromol. Sci.-Chem, A22(10), 1985, pp. 1443-1461.
International Search Report mailed Dec. 22, 2008 received in PCT/JP2008/068599.
Notification of Reasons for Refusal dated Jul. 16, 2013 in connection with the Japanese Application No. 2008-273251.
Notification of Reasons for Refusal dated Jul. 16, 2013 in connection with the Japanese Application No. 2008-273249.
Final Office Action U.S. Appl. No. 12/682,858 dated Jul. 25, 2012.
Notification of Reasons for Refusal issued Jun. 10, 2013, JPA 2009-538097.
Notification of Reasons for Refusal issued Jun. 12, 2013, JPA 2009-538090.
Notification of Reasons for Refusal issued May 16, 1986, JPA 55-9699.
Office Action received in U.S. Appl. No. 13/965,471 dated Oct. 25, 2013.

* cited by examiner

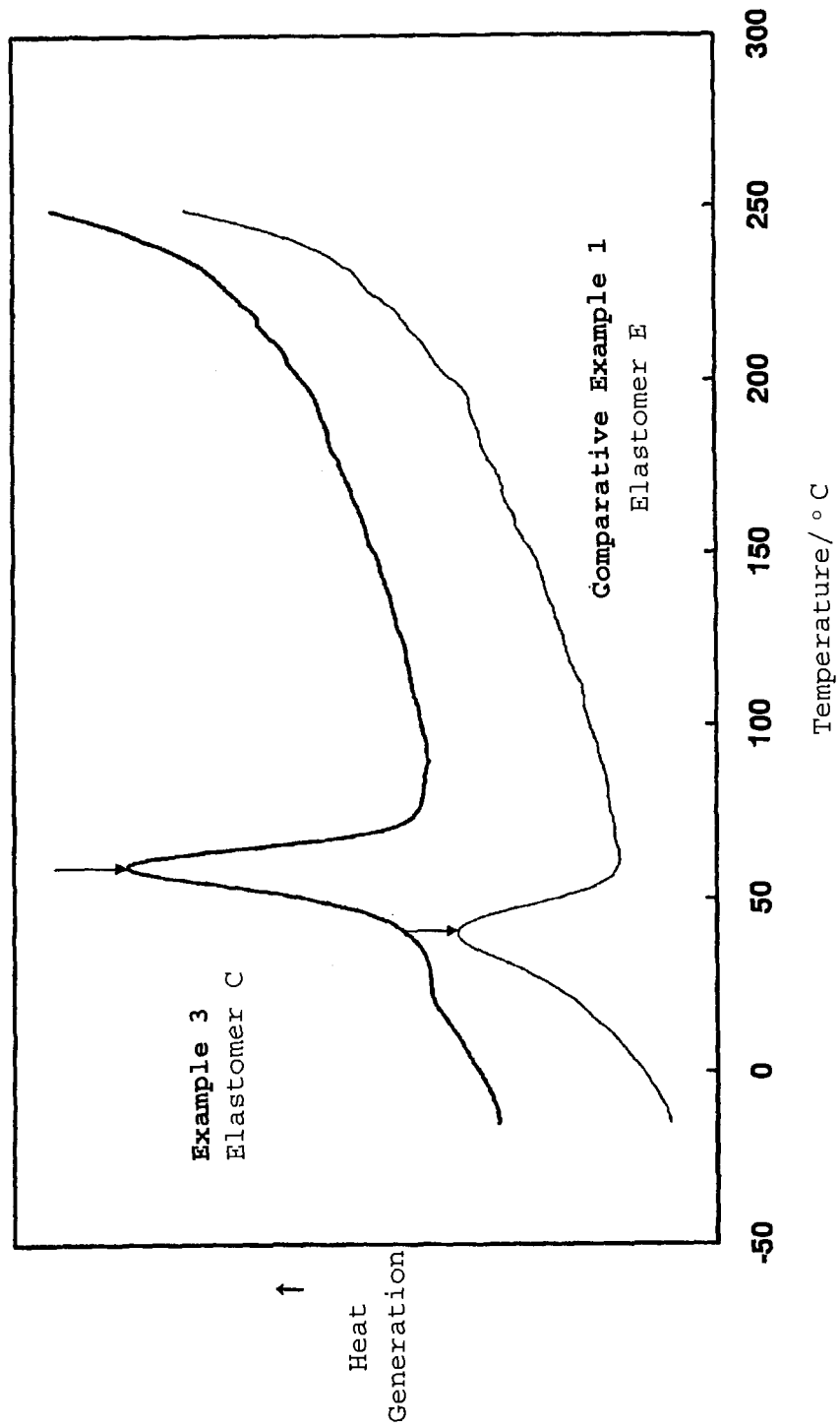

POLYURETHANE RESIN

TECHNICAL FIELD

The present invention relates to a polyurethane resin and more specifically to a polyurethane resin used in various fields of industry.

BACKGROUND ART

Polyurethane resins are usually produced by a reaction between a polyisocyanate component and a polyol component, and are widely used in various fields of industry, for example, as elastomers, lenses, synthetic leather, slush powders, elastic molded articles (spandex), RIM molded articles, paints, adhesives, sealing materials, or foams.

As the polyisocyanate component, although aromatic diisocyanate such as tolylene diisocyanate (TDI) or diphenylmethane diisocyanate (MDI) is industrially well-known, aliphatic and alicyclic diisocyanates such as hexamethylene diisocyanate (HDI), 3-isocyanatomethyl-3,5,5-trimethyl cyclohexylisocyanate (IPDI), further dicyclohexylmethane diisocyanate (hydrogenated MDI), or bis(isocyanatomethyl) cyclohexane (hydrogenated XDI), are widespread in the fields where yellowing resistance is required.

Among them, bis(isocyanatomethyl)cyclohexane is excellent in yellowing resistance and mechanical properties, and further use thereof is expected in future.

Bis(isocyanatomethyl)cyclohexane includes structural isomers of 1,3-bis(isocyanatomethyl)cyclohexane and 1,4-bis(isocyanatomethyl)cyclohexane, and further, geometric isomers designated as the trans isomer and the cis isomer are known to exist in each of 1,3-bis(isocyanatomethyl)cyclohexane and 1,4-bis(isocyanatomethyl)cyclohexane.

There has been reported that, for example, 1,4-bis(aminomethyl)cyclohexane having a content ratio of trans- to cis-isomer of 3.3:1 (i.e., 77% by mole of trans isomers) is phosgenated to synthesize 1,4-bis(isocyanatomethyl)cyclohexane containing 77% by mole of trans isomers, and the 1,4-bis(isocyanatomethyl)cyclohexane is used to synthesize an elastomer (see, for example, the following Patent Document 1).

Patent Document 1: U.S. Pat. No. 4,565,835

DISCLOSURE OF THE INVENTION

Problems to be Solved

However, in the production of a polyurethane resin, it is desirable to select a raw material component so as to improve required physical properties for various applications.

It is an object of the present invention to provide a polyurethane resin capable of improving required physical properties in various applications.

Means for Solving the Problem

To achieve the above object, the polyurethane resin of the present invention is obtained by a reaction between a polyisocyanate component including 1,4-bis(isocyanatomethyl) cyclohexane including not less than 80% by mole of trans isomers, and an active hydrogen compound component.

In the polyurethane resin of the present invention, it is preferable that the 1,4-bis(isocyanatomethyl)cyclohexane contains not less than 85% by mole of trans isomers.

It is preferable that the polyurethane resin of the present invention is a molding resin.

It is preferable that the polyurethane resin of the present invention is an optical polyurethane resin.

In the polyurethane resin of the present invention, it is preferable that the active hydrogen compound component is a polyol component having a hydroxyl value of 280 to 1240 mg KOH/g and an average functionality of more than 2 and less than 5.

In the polyurethane resin of the present invention, it is preferable that the polyisocyanate component contains a polyisocyanate, the active hydrogen compound component contains a high-molecular-weight polyol; an active hydrogen compound containing a hydrophilic group, and a chain extender; and first, the polyisocyanate is allowed to react with the high-molecular-weight polyol and the active hydrogen compound containing a hydrophilic group to prepare an isocyanate group-terminated prepolymer, and subsequently, the isocyanate group-terminated prepolymer and the chain extender are allowed to react to thereby obtain an aqueous polyurethane resin.

The film of the present invention is made of the above-mentioned polyurethane resin.

Further, the artificial and synthetic leather of the present invention uses the above-mentioned polyurethane resin.

It is preferable that the polyurethane resin of the present invention is a granular polyurethane resin.

It is preferable that the polyurethane resin of the present invention is used for slush molding.

The slush molded article of the present invention is obtained by slush molding of the above-mentioned polyurethane resin.

It is preferable that the polyurethane resin of the present invention, is a polyurethane resin for elastic molding.

The elastic molded article of the present invention uses the above-mentioned polyurethane resin.

In the polyurethane resin of the present invention, it is preferable that the polyisocyanate component contains an isocyanurate-modified product of at least either one of alicyclic polyisocyanate and aralkyl polyisocyanate, and the polyurethane resin is a polyurethane resin for reaction injection molding.

In the polyurethane resin of the present invention, it is preferable that the alicyclic polyisocyanate and the aralkyl polyisocyanate are at least one kind selected from the group consisting of 1,3-bis(isocyanatomethyl)cyclohexane, 1,4-bis (isocyanatomethyl)cyclohexane, 2,5-di(isocyanatomethyl) bicyclo[2,2,1]heptane, 2,6-di(isocyanatomethyl)bicyclo[2,2, 1]heptane, isophorone diisocyanate, 1,3-bis (isocyanatomethyl)benzene, and 1,4-bis(isocyanatomethyl) benzene.

The reaction injection molded article of the present invention is formed from the above-mentioned polyurethane resin.

In the polyurethane resin of the present invention, it is preferable that the polyisocyanate component contains an allophanate-modified 1,4-bis(isocyanatomethyl)cyclohexane including not less than 80% by mole of trans isomers and an isocyanurate-modified 1,4-bis(isocyanatomethyl)cyclohexane including not less than 80% by mole of trans isomers so as to have an allophanate/isocyanurate composition ratio of 50/50 to 100/0, to be prepared as a two-part curing polyurethane resin.

It is preferable that the polyurethane resin of the present invention further includes a foaming agent and is obtained as a polyurethane foam by foaming and reaction.

In the polyurethane resin of the present invention, it is preferable that the active hydrogen compound component is a polyol component, the polyol component having a hydroxyl value of 10 to 120 mg KOH/g and a primary hydroxyl group at its molecular end of not less than 40% by mole or more.

It is preferable that the polyurethane resin of the present invention is used as a molded article for clothing, sanitary, or shoes.

Effect of the Invention

The polyurethane resin of the present invention contains 1,4-bis(isocyanatomethyl)cyclohexane containing not less than 80% by mole of trans isomers as a polyisocyanate component. Therefore, the required physical properties for various applications can be improved.

BRIEF DESCRIPTION OF THE DRAWINGS

FIG. 1 shows DSC measurement results of Example 3 and Comparative Example 1 in 2) Synthesis and Evaluation of Elastomer.

EMBODIMENT OF THE INVENTION

The polyurethane resin of the present invention can be obtained by a reaction between a polyisocyanate component and an active hydrogen compound component.

In the present invention, the polyisocyanate component essentially contains 1,4-bis(isocyanatomethyl)cyclohexane containing not less than 80% by mole of trans isomers.

1,4-bis(isocyanatomethyl)cyclohexane includes geometric isomers of cis-1,4-bis(isocyanatomethyl)cyclohexane (hereinafter referred to as cis-1,4 isomer) and trans-1,4-bis(isocyanatomethyl)cyclohexane (hereinafter referred to as trans-1,4 isomer), and in the present invention, 1,4-bis(isocyanatomethyl)cyclohexane contains trans-1,4 isomers in a proportion of not less than 80% by mole, or preferably not less than 85% by mole.

The above-mentioned 1,4-bis(isocyanatomethyl)cyclohexane can be produced for example, by phosgenation process (a cold/hot two-stage process (direct process) or a salt-forming process) described in Japanese Unexamined Patent Publication No. 7-309827 or by non-phosgenation process described in Japanese Unexamined Patent Publication Nos. 2004-244349 and 2003-212835, using 1,4-bis(aminomethyl)cyclohexane containing not less than 80% by mole of trans isomers as a raw material.

The above-mentioned 1,4-bis(isocyanatomethyl)cyclohexane can also be prepared as a derivative.

Examples of the derivative of the 1,4-bis(isocyanatomethyl)cyclohexane include multimers of 1,4-bis(isocyanatomethyl)cyclohexane (dimers or trimers (e.g., isocyanurate-modified products)); biuret-modified products (e.g., those produced by a reaction between 1,4-bis(isocyanatomethyl)cyclohexane and water); allophanate-modified products (e.g., those produced by a reaction between 1,4-bis(isocyanatomethyl)cyclohexane and a monol or a low-molecular-weight polyol (described later)); polyol-modified products (e.g., those produced by a reaction between 1,4-bis(isocyanatomethyl)cyclohexane and a low-molecular-weight polyol (described later) or a high-molecular-weight polyol (described later)); oxadiazinetrione-modified products (e.g., oxadiazinetrione produced by a reaction between 1,4-bis(isocyanatomethyl)cyclohexane and carbon dioxide); carbodiimide-modified products (those produced by a decarboxylation condensation reaction of 1,4-bis(isocyanatomethyl)cyclohexane); and urethodione-modified products.

The above-mentioned polyisocyanate component can contain polyisocyanate, for example, diisocyanate such as alicyclic diisocyanate, aliphatic diisocyanate, aralkyl diisocyanate, and aromatic diisocyanate, as long as the excellent effects of the polyurethane resin of the present invention are not impaired.

Examples of the alicyclic diisocyanate include 1,3-cyclopentane diisocyanate, 1,4-cyclohexane diisocyanate, 1,3-cyclohexane diisocyanate, 3-isocyanatomethyl-3,5,5-trimethyl cyclohexyl isocyanate (also known as isophorone diisocyanate), 4,4'-methylene-bis(cyclohexyl isocyanate), methyl-2,4-cyclohexane diisocyanate, methyl-2,6-cyclohexane diisocyanate, 1,3-bis(isocyanatomethyl)cyclohexane, 1,3-bis(isocyanatoethyl)cyclohexane, 1,4-bis(isocyanatoethyl)cyclohexane, and 2,5- or 2,6-bis(isocyanatomethyl)norbornane (NBDI) and mixtures thereof.

Examples of the aliphatic diisocyanate include trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, 2,4,4- or 2,2,4-trimethyl hexamethylene diisocyanate, and 2,6-diisocyanato methyl caproate.

Examples of the aralkyl diisocyanate include 1,3- or 1,4-xylylene diisocyanate or mixtures thereof, 1,3- or 1,4-tetramethylxylylene diisocyanate or mixtures thereof, and $\omega,\omega'$-diisocyanato-1,4-diethylbenzene.

Examples of the aromatic diisocyanate include 2,4-tolylene diisocyanate and 2,6-tolylene diisocyanate, and isomeric mixtures of these tolylene diisocyanates; 4,4'-diphenylmethane diisocyanate, 2,4'-diphenylmethane diisocyanate, and 2,2'-diphenylmethane diisocyanate, and any isomeric mixtures of these diphenylmethane diisocyanates; toluoylene diisocyanate, paraphenylene diisocyanate, and naphthalene diisocyanate.

Derivatives of these diisocyanates may be used in combination. More specifically, a multimer of these diisocyanates (dimers or trimers (e.g., isocyanurate-modified products)); a biuret-modified diisocyanate, an allophanate-modified diisocyanate, a polyol-modified diisocyanate, an oxadiazinetrione-modified diisocyanate, a carbodiimide-modified diisocyanate, or an urethodione-modified diisocyanate may be used in combination.

As the polyisocyanate that can be used in combination with 1,4-bis(isocyanatomethyl)cyclohexane, 3-isocyanatomethyl-3,5,5-trimethyl cyclohexyl isocyanate (also known as isophorone diisocyanate), 4,4'-methylene-bis(cyclohexyl isocyanate), 1,4-cyclohexane diisocyanate, 1,3-bis(isocyanatomethyl)cyclohexane, 2,5- or 2,6-bis(isocyanatomethyl)norbornane (NBDI) and mixtures thereof, 1,5-pentamethylene diisocyanate, and 1,6-hexamethylene diisocyanate, and derivatives of these polyisocyanates are preferable.

It should be noted that 1,3-bis(isocyanatomethyl)cyclohexane has geometric isomers of cis-1,3-bis(isocyanatomethyl)cyclohexane (hereinafter referred to as cis-1,3 isomer) and trans-1,3-bis(isocyanatomethyl)cyclohexane (hereinafter referred to as trans-1,3 isomer), and when 1,3-bis(isocyanatomethyl)cyclohexane is used in combination with 1,4-bis(isocyanatomethyl)cyclohexane, 1,3-bis(isocyanatomethyl)cyclohexane contains trans-1,3 isomers in a proportion of preferably not less than 50% by mass, more preferably 70% by mass, or even more preferably not less than 90% by mass.

The above-mentioned polyisocyanate component contains 1,4-bis(isocyanatomethyl)cyclohexane containing not less than 80% by mole of trans isomers in a proportion of, for example, not less than 50% by mole, preferably not less than 70% by mole, more preferably 80% by mole, or even more preferably 90% by mole.

In the present invention, examples of the active hydrogen compound component include polyol components (components which mainly contain a polyol having two or more hydroxyl groups), polythiol components (components which mainly contain a polythiol having two or more mercapto groups (thiol groups)), and polyamine components (compounds which mainly contain a polyamine having two or more amino groups).

In the present invention, examples of the polyol component include low-molecular-weight polyols and high-molecular-weight polyols.

The low-molecular-weight polyol is a compound having two or more hydroxyl groups and a number average molecular weight of less than 400, and examples thereof include dihydric alcohols such as ethylene glycol, propylene glycol, 1,3-propanediol, 1,4-butylene glycol, 1,3-butylene glycol, 1,2-butylene glycol, 1,5-pentanediol, 1,6-hexandiol, neopentyl glycol, alkane (7-22) diol, diethylene glycol, triethylene glycol, dipropylene glycol, 3-methyl-1,5-pentanediol, alkane-1,2-diol (C17-20), 1,3- or 1,4-cyclohexane dimethanol and mixtures thereof, 1,4-cyclohexanediol, hydrogenated bisphenol-A, 1,4-dihydroxy-2-butene, 2,6-dimethyl-1-octene-3,8-diol, and bisphenol A; trihydric alcohols such as glycerol and trimethylolpropane; tetravalent alcohols such as tetramethylolmethane (pentaerythritol) and diglycerol; pentavalent alcohols such as xylitol; hexavalent alcohols such as sorbitol, mannitol, allitol, iditol, dulcitol, altritol, inositol, and dipentaerythritol; heptavalent alcohols such as perseitol; and octavalent alcohols such as sucrose.

The high-molecular-weight polyol is a compound having two or more hydroxyl groups and a number average molecular weight of 400 or more, and examples thereof include polyether polyol, polyester polyol, polycarbonate polyol, polyurethane polyol, epoxy polyol, vegetable oil-based polyol, polyolefin polyol, acrylic polyol, and vinyl monomer-modified polyol.

Examples of the polyether polyol include polypropylene glycol and polytetramethylene ether glycol.

Examples of the polypropylene glycol include addition polymers of alkylene oxide (including a random and/or block copolymer of two or more kinds of alkylene oxide), such as ethylene oxide and propylene oxide, using the above-mentioned low-molecular-weight polyol or aromatic/aliphatic polyamine (described later) as an initiator.

Examples of the polytetramethylene ether glycol include a ring-opening polymerization product obtained by cationic polymerization of tetrahydrofuran, and amorphous polytetramethylene ether glycol obtained by copolymerizing the above-mentioned dihydric alcohol to a polymerization unit of tetrahydrofuran.

Examples of the polyester polyol include a polycondensation product obtained by allowing the above-mentioned low-molecular-weight polyol (preferably dihydric alcohol) and a polybasic acid to react under known conditions.

Examples of the polybasic acid include oxalic acid, malonic acid, succinic acid, methylsuccinic acid, glutaric acid, adipic acid, 1,1-dimethyl-1,3-dicarboxypropane, 3-methyl-3-ethyl glutaric acid, azelaic acid, sebacic acid, and other saturated aliphatic dicarboxylic acids (of 11 to 13 carbon atoms); maleic acid, fumaric acid, itaconic acid, and other unsaturated aliphatic dicarboxylic acids; orthophthalic acid, isophthalic acid, terephthalic acid, toluene dicarboxylic acid, naphthalene dicarboxylic acid, and other aromatic dicarboxylic acids; hexahydrophthalic acid and other alicyclic dicarboxylic acids; dimer acid, hydrogenated dimer acid, HET acid, and other carboxylic acids; and acid anhydrides derived from these carboxylic acids, such as oxalic anhydride, succinic anhydride, maleic anhydride, phthalic anhydride, 2-alkyl(C12-C18)succinic anhydride, tetrahydrophtalic anhydride, trimellitic anhydride; and further acid halides derived from the carboxylic acids, such as oxalic acid dichloride, adipic acid dichloride, and sebacic acid dichloride.

Examples of the polyester polyol include vegetable oil-based polyester polyol obtained by subjecting the above-mentioned low-molecular-weight polyol and hydroxycarboxylic acid such as hydroxyl group-containing vegetable oil fatty acid (e.g., castor oil fatty acid containing ricinoleic acid, hydrogenated castor oil fatty acid containing 12-hydroxystearic acid, etc.) to a condensation reaction under known conditions.

Examples of the polyester polyol include polycaprolactone polyol and polyvalerolactone polyol, which are obtained by ring-opening polymerization of lactones, such as ɛ-caprolactone and γ-valerolactone, using the above-mentioned low-molecular-weight polyol (preferably dihydric alcohol) as an initiator; and lactone-based polyester polyol obtained by copolymerizing the above-mentioned dihydric alcohol to these polyols.

Examples of the polycarbonate polyol include a ring-opening polymerization product of ethylene carbonate using the above-mentioned low-molecular-weight polyol (preferably dihydric alcohol) as an initiator; and amorphous polycarbonate polyol obtained by copolymerizing a ring-opening polymerization product and dihydric alcohol such as 1,4-butanediol, 1,5-pentanediol, 3-methyl-1,5-pentanediol, or 1,6-hexandiol.

The polyurethane polyol can be obtained as polyester polyurethane polyol, polyether polyurethane polyol, polycarbonate polyurethane polyol, or polyester polyether polyurethane polyol, by allowing the polyester polyol, polyether polyol, and/or polycarbonate polyol to react with the above-mentioned polyisocyanate (containing 1,4-bis(isocyanatomethyl) cyclohexane; the same applies to the following) at such a ratio that the equivalent ratio (OH/NCO) of the hydroxyl group to the isocyanate group exceeds 1.

Examples of the epoxy polyol include epoxy polyol obtained by a reaction between the above-mentioned low-molecular-weight polyol and a polyfunctional halohydrin such as epichlorohydrin and β-methyl epichlorohydrin.

Examples of the vegetable oil-based polyol include hydroxyl group-containing vegetable oils such as castor oil and coconut oil. In addition, examples thereof include a castor oil polyol or an ester-modified castor oil polyol obtained by a reaction between a castor oil polyol and a polypropylene polyol.

Examples of the polyolefin polyol include polybutadiene polyol and partially saponified ethylene-vinylacetate copolymer.

Examples of the acrylic polyol include copolymers obtained by copolymerizing hydroxyl group-containing acrylate with a copolymerizable vinyl monomer copolymerizable with the hydroxyl group-containing acrylate.

Examples of the hydroxyl group-containing acrylate include 2-hydroxyethyl (meth)acrylate, hydroxypropyl (meth)acrylate, hydroxybutyl(meth)acrylate, 2,2-dihydroxymethylbutyl(meth)acrylate, polyhydroxyalkyl maleate and polyhydroxyalkyl fumarate. Among them, 2-hydroxyethyl(meth)acrylate is preferable.

Examples of the copolymerizable vinyl monomer include alkyl(meth)acrylates (of 1 to 12 carbon atoms) such as methyl (meth)acrylate, ethyl(meth)acrylate, propyl(meth)acrylate, isopropyl(meth)acrylate, butyl(meth)acrylate, isobutyl (meth)acrylate, s-butyl(meth)acrylate, t-butyl(meth)acrylate, pentyl(meth)acrylate, isopentyl(meth)acrylate, hexyl(meth)

acrylate, isononyl(meth)acrylate, 2-ethylhexyl(meth)acrylate, and cyclohexyl acrylate; aromatic vinyl monomers such as styrene, vinyltoluene, and α-methylstyrene; vinyl cyanides such as (meth)acrylonitrile; vinyl monomers containing carboxyl groups such as (meth)acrylic acid, fumaric acid, maleic acid, and itaconic acid, or alkyl esters thereof; alkane polyol poly(meth)acrylates such as ethylene glycol di(meth)acrylate, butylene glycol di(meth)acrylate, hexanediol di(meth)acrylate, oligo-ethylene glycol di(meth)acrylate, trimethylol propane di(meth)acrylate, and trimethylol propane tri(meth)acrylate; and vinyl monomers containing isocyanate groups such as 3-(2-isocyanato-2-propyl)-α-methylstyrene.

The acrylic polyol can be obtained by copolymerizing these hydroxyl group-containing acrylates and copolymerizable vinyl monomers in the presence of a suitable solvent and a suitable polymerization initiator.

The acrylic polyol also contains, for example, a silicone polyol or a fluorine-containing polyol.

Examples of the silicone polyol include acrylic polyols blended with a silicone compound containing a vinyl group, such as γ-methacryloxypropyl trimethoxy silane, as a copolymerizable vinyl monomer in the copolymerization of the acrylic polyol.

Examples of the fluorine-containing polyol include acrylic polyols blended with a fluorine-containing compound containing a vinyl group such as tetrafluoroethylene or chlorotrifluoroethylene, as a copolymerizable vinyl monomer in the copolymerization of the acrylic polyol.

The vinyl monomer-modified polyol can be obtained by a reaction between the above-mentioned high-molecular-weight polyol and a vinyl monomer.

As the high-molecular-weight polyol, a high-molecular-weight polyol selected from polyether polyols, polyester polyols, and polycarbonate polyols is preferable.

Examples of the vinyl monomer include the above-mentioned alkyl(meth)acrylate, and vinyl cyanide or vinylidene cyanide. These vinyl monomers can be used alone or in combination of two or more kinds. Among them, alkyl(meth)acrylate is preferable.

The vinyl monomer-modified polyol can be obtained by allowing these high-molecular-weight polyols and vinyl monomers to react in the presence of a radical polymerization initiator (e.g., persulfate, organic peroxide, azo compound, etc.) and the like.

These polyol components can be used alone or in combination of two or more kinds.

Examples of the polythiol component include aliphatic polythiols, aromatic polythiols, heterocyclic ring-containing polythiols, aliphatic polythiols containing a sulfur atom other than the mercapto group, aromatic polythiols containing a sulfur atom other than the mercapto group, and heterocyclic ring-containing polythiols containing a sulfur atom other than the mercapto group.

Examples of the aliphatic polythiol include methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexane dithiol, 1,2-cyclohexanedithiol, 2,2-dimethylpropane-1,3-dithiol, 3,4-dimethoxybutane-1,2-dithiol, 1-methylcyclohexane-2,3-dithiol, bicyclo[2,2,1]hepta-exo-cis-2,3-dithiol, 1,1-bis(mercaptomethyl)cyclohexane, thiomalate bis(2-mercaptoethylester), 2,3-dimercaptosuccinic acid (2-mercaptoethylester), 2,3-dimercapto-1-propanol (2-mercaptoacetate), 2,3-dimercapto-1-propanol (3-mercaptopropionate), diethylene glycol bis(2-mercaptoacetate), diethylene glycol bis(3-mercaptopropionate), 1,2-dimercaptopropyl methyl ether, 2,3-dimercaptopropyl methyl ether, 2,2-bis(mercaptomethyl)-1,3-propanedithiol, bis(2-mercaptoethyl)ether, ethylene glycol bis(2-mercaptoacetate), ethylene glycol bis(3-mercaptopropionate), trimethylolpropane bis(2-mercaptoacetate), trimethylolpropane bis(3-mercaptopropionate), pentaerythritol tetrakis(2-mercaptoacetate), and pentaerythritol tetrakis(3-mercaptopropionate).

Examples of the aromatic polythiol include 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercapto methyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 1,2,3-trimercapto benzene, 1,2,4-trimercapto benzene, 1,3,5-trimercapto benzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris(mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)benzene, 1,3,5-tris(mercaptoethyleneoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,4,5-tetrakis(mercaptomethyl)benzene, 1,2,3,4-tetrakis(mercapto ethyl)benzene, 1,2,3,5-tetrakis(mercaptoethyl)benzene, 1,2,4,5-tetrakis(mercaptoethyl)benzene, 1,2,3,4-tetrakis(mercaptomethyleneoxy)benzene, 1,2,3,5-tetrakis(mercaptomethyleneoxy)benzene, 1,2,4,5-tetrakis(mercaptoethyleneoxy)benzene, 1,2,3,4-tetrakis(mercaptoethyleneoxy)benzene, 1,2,3,5-tetrakis(mercaptoethyleneoxy)benzene, 1,2,4,5-tetrakis(mercaptoethyleneoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethio-1,1,3-di(p-methoxyphenyl) propane-2,2-dithiol, 1,3-diphenylpropane-2,2-dithiol, phenylmethane-1,1-dithiol, and 2,4-di(p-mercaptophenyl)pentane.

Examples of the heterocyclic ring-containing polythiol include 2-methylamino-4,6-dithiol-sym-triazine, 2-ethylamino-4,6-dithiol-sym-triazine, 2-amino-4,6-dithiol-sym-triazine, 2-morpholino-4,6-dithiol-sym-triazine, 2-cyclohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiol-sym-triazine, and 2-thiobutyloxy-4,6-dithiol-sym-triazine.

Examples of the aliphatic polythiols containing a sulfur atom other than the mercapto group include bis(mercaptomethyl)sulfide, bis(mercaptoethyl)sulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropyl)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2- mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, 2,5-dimercaptomethyl-1,4-dithiane, bis(mercaptomethyl) disulfide, bis(mercaptoethyl)disulfide, bis(mercaptopropyl) disulfide, and the like, and thioglycolic acid and mercaptopropionic acid esters of the above-mentioned compounds, hydroxymethylsulfide bis(2-mercapto acetate), hydroxymethylsulfide bis(3-mercaptopropionate), hydroxyethylsulfide bis(2-mercapto acetate), hydroxyethylsulfide bis(3-mercaptopropionate), hydroxypropylsulfide bis(2-mercaptoacetate), hydroxypropylsulfide bis(3-mercaptopropionate), hydroxymethyldisulfide bis(2-mercapto acetate), hydroxymethyldisulfide bis(3-mercaptopropionate), hydroxyethyldisulfide bis(2-mercapto acetate), hydroxyethyldisulfide bis(3-mercaptopropionate), hydroxypropyldisulfide bis(2-mercapto acetate), hydroxypropyldisulfide bis(3-mercaptopropionate), 2-mercaptoethylether bis(2-mercaptoacetate), 2-mercaptoethylether bis(3-mercaptopropionate), 1,2-bis [(2-mercaptoethyl)thio]-3-mercaptopropane, 1,4-dithiane-2,5-diol bis(2-mercapto acetate), 1,4-dithiane-2,5-diol bis(3-mercaptopropionate), thiodiglycolic acid bis(2-mercaptoethylester), thiodipropionic acid bis(2-mercaptoethylester), 4,4-thiodibutyric acid bis(2-mercaptoethylester), dithiodiglycolic acid bis(2-mercaptoethylester), dithiodipropionic acid bis(2-mercaptoethylester), 4,4-dithiodibutyric acid bis(2-mercaptoethylester), thioglycolic bis(2,3-dimercaptopropylester), thiodipropionic acid bis(2,3-dimercaptopropylester), dithioglycolic acid bis(2,3-dimercaptopropylester), and dithiodipropionic acid bis(2,3-dimercaptopropylester).

Examples of the aromatic polythiols containing a sulfur atom other than the mercapto group include 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene, and the like, and nuclear alkylated products of the above-mentioned compounds.

Examples of the heterocyclic ring-containing polythiols containing a sulfur atom other than the mercapto group include 3,4-thiophenedithiol, 2,5-dimercapto-1,3,4-thiadiazole, and the like, and thioglycolic acid esters and mercaptopropionic acid esters of the above-mentioned compounds.

Further examples of the polythiol component include halogen substituted compound of these polythiols, such as chlorine-substituted compound and bromine-substituted compound of the polythiol components.

These polythiols can be used alone or in combination of two or more kinds.

Examples of the polyamine component include aromatic polyamine, aralkyl polyamine, alicyclic polyamine, aliphatic polyamine, amino alcohol, alkoxysilyl compounds having a primary amino group, or having a primary amino group and a secondary amino group, and polyoxyethylene group-containing polyamine.

Examples of the aromatic polyamine include 4,4'-diphenylmethanediamine and tolylenediamine.

Examples of the aralkyl polyamine include 1,3- or 1,4-xylylene diamine, or mixtures thereof.

Examples of the alicyclic polyamine include 3-aminomethyl-3,5,5-trimethyl cyclohexylamine (also known as isophoronediamine), 4,4'-dicyclohexylmethanediamine, 2,5(2,6)-bis(aminomethyl)bicyclo[2.2.1]heptane, 1,4-cyclohexanediamine, 1-amino-3-aminomethyl-3,5,5-trimethylcyclohexane, bis-(4-aminocyclohexyl)methane, diaminocyclohexane, 3,9-bis(3-aminopropyl)-2,4,8,10-tetraoxaspiro[5,5]undecane, 1,3- and 1,4-bis(aminomethyl)cyclohexane, and mixtures thereof.

Examples of the aliphatic polyamine include ethylenediamine, propylenediamine, 1,3-propanediamine, 1,4-butanediamine, 1,5-pentanediamine, 1,6-hexamethylenediamine, hydrazine (including hydrates thereof), diethylenetriamine, triethylenetetramine, tetraethylenepentamine, 1,2-diaminoethane, 1,2-diaminopropane, and 1,3-diaminopentane.

Examples of the amino alcohol include N-(2-aminoethyl) ethanolamine.

Examples of the alkoxysilyl compounds having a primary amino group, or having a primary amino group and a secondary amino group include alkoxysilyl group-containing monoamines such as γ-aminopropyltriethoxysilane and N-phenyl-γ-aminopropyl trimethoxysilane, N-(3(aminoethyl)γ-aminopropyl trimethoxysilane, and N-β(aminoethyl)γ-aminopropylmethyl dimethoxysilane.

Examples of the polyoxyethylene group-containing polyamine include polyoxyalkylene etherdiamine such as polyoxyethylene etherdiamine. More specific examples thereof include diamine PEG#1000 manufactured by NOF Corporation, and Jeffamine ED-2003, EDR-148, and XTJ-512 manufactured by Huntsman Corporation.

These polyamine components can be used alone or in combination of two or more kinds.

When the molecular weight of the polyurethane resin is adjusted, a monol and/or a monoamine can be used together as the active hydrogen compound component.

Examples of the monol include methanol, ethanol, propanol, butanol, 2-ethylhexyl alcohol, other alkanols (C5-38) and aliphatic unsaturated alcohol (9-24), alkenyl alcohol, 2-propen-1-ol, alkadienol (C6-8), and 3,7-dimethyl-1,6-octadien-3-ol.

Examples of the monoamine include dimethylamine, diethylamine, di-n-propylamine, diisopropylamine, di-n-butylamine, diisobutylamine, di-t-butylamine, dihexylamine, 2-ethylhexylamine, 3-methoxypropylamine, 3-ethoxypropylamine, 3-(2-ethylhexyloxypropylamine), 3-(dodecyloxy) propylamine, and morpholine.

In the present invention, a known additive can optionally be added.

The polyurethane resin of the present invention contains 1,4-bis(isocyanatomethyl)cyclohexane containing not less than 80% by mole of trans isomers as the polyisocyanate component. Therefore, the required physical properties for various applications can be improved.

Accordingly, the polyurethane resin of the present invention can be used for wide applications such as elastomers (solution polyurethane, aqueous polyurethane, powder, thermosetting elastomer, thermoplastic elastomer, spray molding urethane, elastic fiber, film, sheet, etc.), lenses (glass lenses), artificial and synthetic leather, slush powders, elastic molded articles (spandex), RIM products, paints (mainly solution-based and powder-based curing agents: adduct, allophanate, biuret, urethodione, isocyanurate, and mixtures thereof), adhesives, sealing materials, and foams.

A method for producing the polyurethane resin of the present invention corresponding to each application will be explained below.

First, the case of producing an elastomer (molding resin) as the polyurethane resin of the present invention will be explained.

In the case of producing the polyurethane resin of the present invention as an elastomer, preferably, 1,4-bis(isocyanatomethyl)cyclohexane containing not less than 80% by mole of trans isomers is used alone as the above-mentioned polyisocyanate component.

In the case of producing the polyurethane resin of the present invention as an elastomer, the above-mentioned active hydrogen compound component that may be used include, for example, the above-mentioned polyol components.

As the active hydrogen compound component, the above-mentioned high-molecular-weight polyols are preferable, polyester polyols are more preferable, or adipic acid-based, sebacic acid-based, and phthalic acid-based polyester polyols are even more preferable.

In the case of producing the polyurethane resin of the present invention as an elastomer, the high-molecular-weight polyol has a hydroxyl value of, for example, 10 to 125 mg KOH/g, and a number average molecular weight of, for example, 400 to 5000, preferably 1400 to 3000, or more preferably 1500 to 2500.

The hydroxyl value can be determined by acetylation or phthalation according to method A or B of JIS K 1557-1. The hydroxyl value and the hydroxyl equivalent satisfy the relation of the following equation (1):

$$\text{Hydroxyl value} = 56100/\text{hydroxyl equivalent} \tag{1}$$

The number average molecular weight can be determined by the hydroxyl equivalent and an average functionality, and the average functionality can be determined by the following equation (2):

$$\text{Average functionality} = \text{sum of (functionality of each polyol} \times \text{the number of equivalents)/sum of the number of equivalents of each polyol)} \tag{2}$$

As the active hydrogen compound component, if necessary, for example, the above-mentioned low-molecular-weight polyol, polythiol component, polyamine component, monol and/or monoamine can further be blended at an appropriate ratio. Preferably, the low-molecular-weight polyol and the polyamine component are blended.

Then, the polyurethane resin of the present invention can be produced as an elastomer by a polymerization method such as bulk polymerization or solution polymerization.

In the bulk polymerization, for example, while the polyisocyanate component is stirred under a nitrogen flow, the active hydrogen compound component is added thereto, and the mixture is allowed to react at a reaction temperature of 50 to 250° C. or more preferably 50 to 200° C. for about 0.5 to 15 hours.

In the solution polymerization, the polyisocyanate component and the active hydrogen compound component are added to an organic solvent, and the mixture is allowed to react at a reaction temperature of 50 to 120° C., or more preferably 50 to 100° C. for about 0.5 to 15 hours.

Examples of the organic solvent include ketones such as acetone, methyl ethyl ketone, methyl isobutyl ketone, and cyclohexanone; nitriles such as acetonitrile; alkyl esters such as methyl acetate, ethyl acetate, butyl acetate, and isobutyl acetate; aliphatic hydrocarbons such as n-hexane, n-heptane, and octane; alicyclic hydrocarbons such as cyclohexane and methylcyclohexane; aromatic hydrocarbons such as toluene, xylene, and ethylbenzene; glycol ether esters such as methyl cellosolve acetate, ethyl cellosolve acetate, methyl carbitol acetate, ethyl carbitol acetate, ethylene glycol ethyl ether acetate, propylene glycol methyl ether acetate, 3-methyl-3-methoxy butyl acetate, and ethyl-3-ethoxy propionate; ethers such as diethyl ether, tetrahydrofuran, and dioxane; halogenated aliphatic hydrocarbons such as methyl chloride, methylene chloride, chloroform, carbon tetrachloride, methyl bromide, methylene iodide, and dichloroethane; and aprotic polar solvents such as N-methylpyrrolidone, dimethylformamide, N,N'-dimethylacetamide, dimethyl sulfoxide, and hexamethyl phosphoramide.

Further, in the above-mentioned polymerization reaction, known urethanizing catalysts such as amines or organometallic compounds may optionally be added, and a free (unreacted) polyisocyanate may be removed from the resulting isocyanate group-terminated prepolymer by a known removal means such as distillation or extraction.

Examples of the amines include tertiary amines such as triethylamine, triethylenediamine, bis-(2-dimethylaminoethyl)ether, and N-methylmorpholine; quaternary ammonium salts such as tetraethyl hydroxyl ammonium; and imidazoles such as imidazole and 2-ethyl-4-methylimidazole.

Examples of the organometallic compound include organotin compounds such as tin acetate, tin octylate, tin oleate, tin laurate, dibutyl tin diacetate, dimethyl tin dilaurate, dibutyl tin dilaurate, dibutyl tin dimercaptide, dibutyl tin maleate, dibutyl tin dilaurate, dibutyl tin dineodecanoate, dioctyl tin dimercaptide, dioctyl tin dilaurylate, and dibutyl tin dichloride; organic lead compounds such as lead octanoate and lead naphthenate; organic nickel compounds such as nickel naphthenate; organic cobalt compounds such as cobalt naphthenate; organocopper compounds such as octenate copper; and organic bismuth compounds such as bismuth octylate and bismuth neodecanoate.

Further, examples of the urethanizing catalyst include potassium salts such as potassium carbonate, potassium acetate, and potassium octoate.

These urethanizing catalysts can be used alone or in combination of two or more kinds.

In the bulk polymerization and the solution polymerization, for example, the polyisocyanate component and the active hydrogen compound component are blended such that the equivalent ratio (NCO/active hydrogen group) of the isocyanate group in the polyisocyanate component to the active hydrogen group (hydroxyl group, mercapto group, and amino group) in the active hydrogen compound component is in the range of, for example, 0.75 to 1.3, or preferably 0.9 to 1.1.

Further, when the above polymerization reaction is more industrially carried out, the polyurethane resin can be obtained by a known process such as one shot process and prepolymer process.

In the one shot process, for example, the polyisocyanate component and the active hydrogen compound component are prepared (mixed) such that the equivalent ratio (NCO/active hydrogen group) of the isocyanate group in the polyisocyanate component to the active hydrogen group (hydroxyl group, mercapto group, and amino group) in the active hydrogen compound component is in the range of, for example, 0.75 to 1.3, or preferably 0.9 to 1.1, and thereafter, the mixture is subjected to a curing reaction at a temperature of, for example, room temperature to 250° C., or preferably room temperature to 200° C., for example, for 5 minutes to 72 hours, or preferably for 4 to 24 hours. The curing temperature may be constant, or can also be gradually increased or cooled.

In the curing reaction, the polyisocyanate component and/or the active hydrogen compound component is/are preferably warmed to have a low viscosity and then mixed. Thereafter, the mixture is optionally defoamed, and then injected into a preheated mold.

After the mixture is injected into the mold and subjected to reaction, the reactant is released from the mold, so that a polyurethane resin formed into a desired shape can be obtained. After the mold release, the polyurethane resin can optionally be aged at room temperature within about 7 days.

Alternatively, in the prepolymer process, for example, first, the isocyanate component and a part of the active hydrogen compound component (preferably, high-molecular-weight polyol) are allowed to react to thereby synthesize an isocyanate group-terminated prepolymer having an isocyanate group at the end of the molecule. Then, the isocyanate group-terminated prepolymer thus obtained is allowed to react with the remainder of the active hydrogen compound component (preferably, low-molecular-weight polyol and/or polyamine component) to conduct a curing reaction. In the prepolymer process, the remainder of the active hydrogen compound component is used as a chain extender.

The isocyanate group-terminated prepolymer is synthesized in the following manner. The polyisocyanate component and a part of the active hydrogen compound component are prepared (mixed) such that the equivalent ratio (NCO/active hydrogen compound component) of the isocyanate group in the polyisocyanate component to the active hydrogen group in the part of the active hydrogen compound component is in the range of, for example, 1.1 to 20, preferably 1.3 to 10, or more preferably 1.3 to 6, and the mixture is allowed to react in a reaction vessel at a temperature of, for example, room temperature to 150° C., or preferably 50 to 120° C., for example, for 0.5 to 18 hours, or preferably for 2 to 10 hours. In this reaction, the above-mentioned urethanizing catalyst may optionally be added, and after completion of the reaction, an unreacted polyisocyanate component can optionally be removed from the resultant product by a known removal means such as distillation or extraction.

Next, the isocyanate group-terminated prepolymer thus obtained and the remainder of the active hydrogen compound component are allowed to react in the following manner. The isocyanate group-terminated prepolymer and the remainder of the active hydrogen compound component are prepared (mixed) such that the equivalent ratio (NCO/active hydrogen group) of the isocyanate group in the isocyanate group-terminated prepolymer to the active hydrogen group in the remainder of the active hydrogen compound component is in the range of, for example, 0.75 to 1.3, or preferably 0.9 to 1.1, and the mixture is then subjected to a curing reaction at a temperature of, for example, room temperature to 250° C., or preferably room temperature to 200° C., for example, for 5 minutes to 72 hours, or preferably for 1 to 24 hours.

In the curing reaction, the isocyanate group-terminated prepolymer and/or the remainder of the active hydrogen compound component is/are preferably warmed to have a low viscosity and then mixed. Thereafter, the mixture is optionally defoamed and then injected into a preheated mold.

After the mixture is injected into the mold and subjected to reaction, the reactant is released from the mold, so that a polyurethane resin formed into a desired shape can be obtained. After the mold release, the polyurethane resin can optionally be aged at room temperature within about 7 days.

When the polyurethane resin of the present invention is produced as an elastomer, further, known additives such as plasticizer, antiblocking agent, heat-resistant stabilizer, light-resistant stabilizer, antioxidant, releasing agent, and catalyst; further, pigment, dye, lubricant, filler, and hydrolysis inhibitor can optionally be blended at an appropriate ratio. These additives may be added during synthesis of each component or may be added during mixing and dissolving of each component, and can also be added after the synthesis.

The polyurethane resin thus obtained as an elastomer has an excellent yellowing resistance and excellent hardness development (i.e., apparent hardness), elastic and thermal properties.

Next, the case of producing a lens as the polyurethane resin of the present invention will be explained.

In such case, the polyurethane resin of the present invention is produced as an optical polyurethane resin by a reaction between the above-mentioned polyisocyanate component and the above-mentioned active hydrogen compound component.

In the case of producing the polyurethane resin of the present invention as an optical polyurethane resin, for example, 1,4-bis(isocyanatomethyl)cyclohexane containing not less than 80% by mole of trans isomers is used alone as the above-mentioned polyisocyanate component.

In the case of producing the polyurethane resin of the present invention as an optical polyurethane resin, the above-mentioned active hydrogen compound component that may be used include, for example, the above-mentioned polyols and/or polythiol components.

As the active hydrogen compound component, the above-mentioned high-molecular-weight polyols and/or the above-mentioned aliphatic thiols are preferable, or polyether polyol and/or pentaerythritol tetrakis(3-mercaptopropionate) is/are more preferable.

In the case of producing the polyurethane resin of the present invention as an optical polyurethane resin, the polyol component has a hydroxyl value of, for example, 280 to 1240 mg KOH/g, or preferably, 400 to 940 mg KOH/g and an average functionality of, for example, more than 2, preferably more than 2.5, or even more preferably more than 2.8, and usually less than 5, or preferably less than 4.5.

When the hydroxyl value and the average functionality are within these ranges, the impact resistance and heat resistance of the polyurethane resin produced as an optical polyurethane resin can be improved.

The polyol component has a number average molecular weight of, for example, 90 to 1000, or preferably 100 to 800.

As the active hydrogen compound component, if necessary, for example, the above-mentioned low-molecular-weight polyol, polythiol component (excluding aliphatic polythiols), polyamine component, monol and/or monoamine can further be blended at an appropriate ratio.

For the reaction between the polyisocyanate component and the active hydrogen compound component, a known polyurethane forming method such as the above-mentioned one shot process (one shot process employed for producing the polyurethane resin of the present invention as an elastomer) or the above-mentioned prepolymer process (prepolymer process employed for producing the polyurethane resin of the present invention as an elastomer) can be applied.

When the one shot process is employed, the polyisocyanate component and the active hydrogen compound component are prepared (mixed) such that the equivalent ratio (NCO/active hydrogen group) of the isocyanate group in the polyisocyanate component to the active hydrogen group (hydroxyl group, mercapto group, and amino group) in the active hydrogen compound component is in the range of, for example, 0.5 to 2.0, or preferably 0.75 to 1.25, and the mixture is then injected into a mold, and a curing reaction is conducted at a temperature of, for example, room temperature to 150° C., or preferably room temperature to 120° C., for example, for 10 minutes to 72 hours, or preferably for 4 to 24 hours.

When the prepolymer process is employed, first, the polyisocyanate component and a part of the active hydrogen compound component are prepared (mixed) such that the equivalent ratio (NCO/active hydrogen compound component) of the isocyanate group in the polyisocyanate component to the active hydrogen group in the part of the active hydrogen compound component is in the range of, for example, 1.1 to 20, or preferably 1.5 to 10, and the mixture is allowed to react in a reaction vessel at a temperature of, for example, room temperature to 150° C., or preferably 50 to 120° C., for example, for 0.5 to 18 hours, or preferably for 2 to 10 hours, so that an isocyanate group-terminated prepolymer is produced.

Next, the isocyanate group-terminated prepolymer thus obtained and the remainder of the active hydrogen compound component are allowed to react in the following manner. The isocyanate group-terminated prepolymer and the remainder of the active hydrogen compound component are prepared (mixed) such that the equivalent ratio (NCO/active hydrogen group) of the isocyanate group in the isocyanate group-terminated prepolymer to the active hydrogen group in the remainder of the active hydrogen compound component is in the range of, for example, 0.5 to 2.0, or preferably 0.75 to 1.25. The mixture is then injected into a mold, and a curing reaction is conducted at a temperature of, for example, room temperature to 150° C., or preferably room temperature to 120° C., for example, for 5 minutes to 72 hours, or preferably for 1 to 24 hours.

When the polyurethane resin (optical polyurethane resin) thus obtained is used for polarizing lenses or the like, for example, insert molding can also be performed in the above-mentioned forming method, specifically, after a polarizing film or the like is preliminarily set in a mold, the mixed raw material (the polyisocyanate component and the active hydrogen compound component) is injected thereinto.

Also, when the polyurethane resin of the present invention is produced as an optical polyurethane resin, further, known additives such as internal release agent, plasticizer, antifoaming agent, leveling agent, flatting agent, fire retardant, thixotropic agent, tackifier, thickening agent, lubricant, antistatic agent, surfactant, reaction retardant, dehydrator, antioxidant, ultraviolet absorber, hydrolysis inhibitor, or weathering stabilizer can optionally be blended at an appropriate ratio.

For example, in the case of blending an internal release agent, in the above-mentioned forming method, when the mixed raw material (the polyisocyanate component and the active hydrogen compound component) is injected into a mold, an internal release agent preferably warmed is injected together with the mixed raw material into the mold at a ratio of, for example, 0.01 to 10 parts by mass, or preferably 0.1 to 5 parts by mass, per 100 parts by mass of the total amount of the polyisocyanate component and the active hydrogen compound component.

Examples of the internal release agent include phosphoric ester-based release agent, alkyl phosphate-based release agent, and fatty acid ester-based release agent. Among them, a phosphoric ester-based release agent is preferable. The blending of such internal release agent can produce a polyurethane resin capable of facilitating mold release.

The polyurethane resin thus produced as an optical polyurethane resin has an excellent appearance (transparency) and is excellent in hardness, thermal properties, storage modulus (storage modulus under high temperature) refractive index, and impact resistance.

Accordingly, the polyurethane resin (optical polyurethane resin) satisfies a practical level of optical characteristics and is excellent in mechanical properties such as heat resistance and impact resistance, so that the polyurethane resin (optical polyurethane resin) can be suitably used for optical lenses such as transparent lenses, sunglass lenses, and polarizing lenses; and optical components such as protective glasses, hoods, protective shields, automotive safety components, and lighting components.

Next, the case of producing a film, artificial leather, synthetic leather, or the like as the polyurethane resin of the present invention will be explained.

In such case, the polyurethane resin of the present invention is produced as an aqueous polyurethane resin (an aqueous dispersion of a polyurethane resin) by a reaction between the above-mentioned polyisocyanate component and the above-mentioned active hydrogen compound component.

As the method of producing the polyurethane resin of the present invention as an aqueous polyurethane resin, the above-mentioned prepolymer process (the prepolymer process employed for producing the polyurethane resin of the present invention as an elastomer) is employed.

More specifically, a polyurethane resin is produced as an aqueous polyurethane resin in the following manner. For example, first, the above-mentioned isocyanate component and the active hydrogen compound component are allowed to react at such a ratio that the equivalent ratio (NCO/active hydrogen group) of the isocyanate group in the isocyanate component to the active hydrogen group in the active hydrogen compound component exceeds 1, so that an isocyanate group-terminated prepolymer is obtained.

In the case of producing the polyurethane resin of the present invention as an aqueous polyurethane resin, for example, 1,4-bis(isocyanatomethyl)cyclohexane containing not less than 80% by mole of trans isomers is used alone as the above-mentioned polyisocyanate component.

In the case of producing the polyurethane resin of the present invention as an aqueous polyurethane resin, the active hydrogen compound component that may be used includes, for example, the above-mentioned polyol components.

As the active hydrogen compound component, high-molecular-weight polyols are preferable, or polyester polyols, polyether polyols, and polycarbonate polyols are more preferable.

In the case of producing the polyurethane resin of the present invention as an aqueous polyurethane resin, the high-molecular-weight polyol has a hydroxyl value of, for example, 10 to 125 mg KOH/g, and a number average molecular weight of, for example, 400 to 5000, preferably 1400 to 3000, or more preferably 1500 to 2500.

In the case of producing the polyurethane resin as an aqueous polyurethane resin, the active hydrogen compound component contains an active hydrogen compound containing a hydrophilic group (hereinafter referred to as a hydrophilic group-containing active hydrogen compound).

The hydrophilic group-containing active hydrogen compound is a compound having at least one hydrophilic group and two or more active hydrogen groups together, and examples of the hydrophilic group include an anionic group, a cationic group, and a nonionic group. Examples of the active hydrogen group include a hydroxyl group, an amino group, a carboxyl group, and an epoxy group, which are groups reacting with an isocyanate group. More specifically, examples of the hydrophilic group-containing active hydrogen compound include carboxylic acid group-containing active hydrogen compound, sulfonic acid group-containing active hydrogen compound, hydroxyl group-containing active hydrogen compound, hydrophilic group-containing polybasic acid, and polyoxyethylene group-containing active hydrogen compound.

Examples of the carboxylic acid group-containing active hydrogen compound include dihydroxylcarboxylic acids such as 2,2-dimethylolacetic acid, 2,2-dimethylollactic acid, 2,2-dimethylolpropionic acid (hereinafter referred to as DMPA), 2,2-dimethylolbutanoic acid (hereinafter referred to as DMBA), 2,2-dimethylolbutyric acid, and 2,2-dimethylolvaleric acid; and diaminocarboxylic acid such as lysine and arginine, or metal salts or ammonium salts thereof. Among them, 2,2-dimethylolpropionic acid (DMPA) and 2,2-dimethylolbutanoic acid (DMBA) are preferable.

Examples of the sulfonic acid group-containing active hydrogen compound include dihydroxybutane sulfonic acid and dihydroxypropane sulfonic acid which are obtained by a synthetic reaction between an epoxy group-containing compound and an acid sulfite. Further, examples thereof include N,N-bis(2-hydroxyethyl)-2-aminoethanesulfonic acid, N,N-bis(2-hydroxyethyl)-2-aminobutanesulfonic acid, 1,3-phenylenediamine-4,6-disulfonic acid, diaminobutanesulfonic acid, diaminopropanesulfonic acid, 3,6-diamino-2-toluenesulfonic acid, 2,4-diamino-5-toluenesulfonic acid, N-(2-aminoethyl)-2-aminoethanesulfonic acid, 2-aminoethanesulfonic acid, N-(2-aminoethyl)-2-aminobutanesulfonic acid, or metal salts or ammonium salts of these sulfonic acids.

Examples of the hydroxyl group-containing active hydrogen compound include N-(2-aminoethyl)ethanolamine.

Examples of the hydrophilic group-containing polybasic acid include polybasic acids containing a sulfonic acid, or more specifically, 5-sulfoisophthalic acid, sulfoterephthalic acid, 4-sulfophthalic acid, 5-(p-sulfophenoxy)isophthalic acid, 5-(sulfopropoxy)isophthalic acid, 4-sulfonaphthalene-2,7-dicarboxylic acid, sulfopropylmalonic acid, sulfosuccinic acid, 2-sulfobenzoic acid, 2,3-sulfobenzoic acid, 5-sulfosalicylic acid, and alkyl esters of those carboxylic acids; and further, metal salts and ammonium salts of those sulfonic acids. Among them, a sodium salt of 5-sulfoisophthalic acid and a sodium salt of dimethyl 5-sulfoisophthalate are preferable.

The polyoxyethylene group-containing active hydrogen compound is a compound containing a polyoxyethylene group in its main chain or its side chain and having two or more active hydrogen groups.

Examples of the polyoxyethylene group-containing active hydrogen compound include polyethylene glycol (having a number average molecular weight of, for example, 200 to 6000, or preferably 300 to 3000) and a polyoxyethylene side chain-containing polyol.

The polyoxyethylene side chain-containing polyol is a compound containing a polyoxyethylene group in its side chain and having two or more active hydrogen groups, and can be synthesized in the following manner.

Specifically, first, a urethane-forming reaction is conducted by mixing the above-mentioned diisocyanate (containing 1,4-bis(isocyanatomethyl)cyclohexane; the same applies to the following) and a one-end-capped polyoxyethylene glycol (e.g., alkoxy ethylene glycol of which the terminal is capped with an alkyl group of 1 to 4 carbon atoms, having a number average molecular weight of 200 to 6000, or preferably 300 to 3000) at such a ratio that the amount of the isocyanate group in the diisocyanate exceeds the amount of the hydroxyl group in the one-end-capped polyoxyethylene glycol, and, if necessary, unreacted diisocyanate is removed from the mixture, to thereby obtain a polyoxyethylene chain-containing monoisocyanate.

Subsequently, a urea-forming reaction is conducted by mixing the polyoxyethylene chain-containing monoisocyanate and dialkanolamine (e.g., diethanolamine) at such a ratio that the amount of the isocyanate group in the polyoxyethylene group-containing monoisocyanate is nearly equal to the amount of the secondary amino group in the dialkanolamine.

As the diisocyanate used to obtain a polyoxyethylene side chain-containing polyol, aliphatic diisocyanates such as hexamethylene diisocyanate (HDI); and alicyclic diisocyanates such as 1,4- or 1,3-bis(isocyanatomethyl)cyclohexane ($H_6XDI$), 3-isocyanatomethyl-3,5,5-trimethyl cyclohexylisocyanate (also known as isophorone diisocyanate (IPDI)), 4,4'-methylene bis(cyclohexylisocyanate) ($H_{12}MDI$) and 2,6-bis(isocyanatomethyl)norbornane (NBDI) are preferable. HDI is more preferable.

When the polyoxyethylene group-containing active hydrogen compound is blended, the content of the polyoxyethylene group in the polyurethane resin (solid content) is in the range of, for example, 0.9 to 30% by mass, preferably 2 to 20% by mass, or more preferably 2 to 10% by mass.

The concentration of the polyoxyethylene group in the polyurethane resin or the isocyanate group-terminated prepolymer can be determined, for example, by the NMR method or the like using an internal standard substance.

These hydrophilic group-containing active hydrogen compounds can be used alone or in combination of two or more kinds. Among them, a carboxylic acid group-containing active hydrogen compound and a polyoxyethylene group-containing active hydrogen compound are preferable.

As the active hydrogen compound component, the above-mentioned low-molecular-weight polyol, polythiol component, polyamine component, monol and/or monoamine can be blended at an appropriate ratio.

The isocyanate group-terminated prepolymer is obtained, for example, by allowing the above-mentioned polyisocyanate component and the above-mentioned active hydrogen compound component (containing the hydrophilic group-containing active hydrogen compound) to react by a known polymerization method such as the bulk polymerization (bulk polymerization performed in the case of producing the polyurethane resin of the present invention as an elastomer) or the solution polymerization (solution polymerization performed in the case of producing the polyurethane resin of the present invention as an elastomer).

Then, each of the above-mentioned components are prepared (mixed) such that the equivalent ratio (NCO/active hydrogen group) of the isocyanate group in the polyisocyanate component to the active hydrogen group in the active hydrogen compound component (containing the hydrophilic group-containing active hydrogen compound) is in the range of, for example, 1.1 to 2.5, preferably 1.2 to 2.3, or more preferably 1.2 to 2.0. When the equivalent ratio of the isocyanate group is within this range, the polyurethane resin can have an improved dispersion stability. Accordingly, the use of this polyurethane resin can provide a film, artificial leather, and synthetic leather having excellent feel.

When the bulk polymerization is employed, for example, while the polyisocyanate component is stirred under a nitrogen flow, the high-molecular-weight polyol and the hydrophilic group-containing active hydrogen compound are added thereto, and the mixture is allowed to react at a reaction temperature of 50 to 130° C. or preferably 50 to 80° C. for about 3 to 15 hours.

When the solution polymerization is employed, the polyisocyanate component, the high-molecular-weight polyol, and the hydrophilic group-containing active hydrogen compound are added to the organic solvent, and the mixture is allowed to react at a reaction temperature of 50 to 120° C., or preferably 50 to 80° C. for about 3 to 15 hours.

In the above-mentioned polymerization reaction, when the hydrophilic group-containing active hydrogen compound is contained in a molecular chain of the high-molecular-weight polyol, the high-molecular-weight polyol and the above-mentioned polyisocyanate component are allowed to react, so that an isocyanate group-terminated prepolymer can be obtained.

For example, in synthesis of the above-mentioned polyester polyol, blending of the above-mentioned hydrophilic group-containing active hydrogen compound as a low-molecular-weight polyol allows the hydrophilic group-containing active hydrogen compound to be contained in a molecular chain of the high-molecular-weight polyol.

Alternatively, for example, in synthesis of the above-mentioned polyester polyol, blending of the hydrophilic group-containing polybasic acid as a polybasic acid also allows the hydrophilic group-containing active hydrogen compound to be contained in a molecular chain of the high-molecular-weight polyol.

As a further alternative, for example, in synthesis of the polyester polyol, polyether polyol, polycarbonate polyol, and epoxy polyol obtained by ring-opening polymerization, blending of the above-mentioned hydrophilic group-containing active hydrogen compound as an initiator or a copolymerization component also allows the hydrophilic group-containing active hydrogen compound to be contained in a molecular chain of the high-molecular-weight polyol.

As an even further alternative, for example, a reaction between the hydrophilic group-containing active hydrogen compound and the high-molecular-weight polyol such as a polyether polyol (preferably, polytetramethylene ether glycol) also allows the hydrophilic group-containing active hydrogen compound to be contained in a molecular chain of the high-molecular-weight polyol.

When an anionic group or a cationic group is contained as the hydrophilic group in the isocyanate group-terminated prepolymer thus obtained, a neutralizing agent is preferably added thereto to form a salt of the anionic group or the cationic group.

When, for example, an anionic group is contained, examples of the neutralizing agent include conventional bases such as organic bases [e.g., tertiary amines (tri C1-4 alkylamines such as trimethylamine and triethylamine; alkanolamines such as dimethylethanolamine, methyldiethanolamine, triethanolamine, and tri-isopropanolamine; and heterocyclic amines such as morpholine)], and inorganic bases [ammonia, alkali metal hydroxide (such as lithium hydroxide, sodium hydroxide, and potassium hydroxide), alkali earth metal hydroxide (such as magnesium hydroxide and calcium hydroxide), and alkali metal carbonate (such as sodium carbonate and potassium carbonate)]. These bases can be used alone or in combination of two or more kinds.

The neutralizing agent is added at a ratio of, for example, 0.4 to 1.2 equivalents, or preferably 0.6 to 1 equivalent, per 1 equivalent of the anionic group.

The isocyanate group-terminated prepolymer thus obtained is a polyurethane prepolymer having two or more free isocyanate groups at the end of the molecule, and the content of the isocyanate group (isocyanate group content) is in the range of, for example, 0.3 to 10% by mass, preferably 0.5 to 6% by mass, or more preferably 1.0 to 5.0% by mass. An average functionality of the isocyanate group is for example, 1.5 to 3.0, or preferably 1.9 to 2.5, and a number average molecular weight (number average molecular weight determined by GPC using a calibration curve of standard polystyrene) of the isocyanate group is for example, 1000 to 30000, or preferably 1500 to 20000. Further, a hydrophilic group concentration of the isocyanate group-terminated prepolymer has is for example, 0.1 to 1.0 mmol/g, preferably 0.2 to 0.7 mmol/g, or more preferably 0.2 to 0.6 mmol/g.

To produce the polyurethane resin of the present invention as an aqueous polyurethane resin, the isocyanate group-terminated prepolymer obtained above and a chain extender are subsequently allowed to react in water to disperse them. This can produce a polyurethane resin having the isocyanate group-terminated prepolymer chain-extended by the chain extender, as an aqueous polyurethane resin.

Examples of the chain extender include low-molecular-weight polyols such as the above-mentioned dihydric alcohols and the above-mentioned trihydric alcohols; and polyamine components such as the above-mentioned alicyclic polyamines and the above-mentioned aliphatic polyamines.

Further, examples of the chain extender include active hydrogen compounds containing an alkoxysilyl group. The active hydrogen compound containing an alkoxysilyl group is a compound having both an alkoxysilyl group and an active hydrogen group.

In the alkoxysilyl group, examples of the alkoxy group to be bonded with a Si atom include alkoxy groups of 1 to 4 carbon atoms, such as a methoxy group, an ethoxy group, a propoxy group, a butoxy group, an isopropoxy group and an isobutoxy group. Among them, a methoxy group and an ethoxy group are preferable. The number of the above alkoxy group bonded to the Si atom is usually 1 to 3, or preferably 1 to 2.

Examples of the active hydrogen group include a hydroxyl group, a mercapto group, and an amino group. Among them, an amino group is preferable.

More specifically, examples of the active hydrogen compound component containing an alkoxysilyl group include N-β(aminoethyl)-γ-aminopropylmethyl dimethoxysilane, N-β(aminoethyl)-γ-aminopropyl trimethoxysilane, γ-(2-aminoethyl)aminopropyl triethoxysilane, γ-(2-aminoethyl)aminopropyl dimethoxysilane, γ-(2-aminoethyl)aminopropyl diethoxysilane, γ-aminopropyl trimethoxysilane, γ-aminopropyl triethoxysilane, γ-aminopropyl dimethoxysilane, γ-aminopropyl diethoxysilane and N,N'-bis[(α-(trimethoxysilyl)propyl)]ethylenediamine.

The equivalent of the active hydrogen group contained in the chain extender is preferably 250 to 800 mg KOH/g, or more preferably 350 to 600 mg KOH/g. When the equivalent of the active hydrogen group is within this range, a polyurethane resin (aqueous polyurethane resin) having excellent durability can be obtained.

These chain extenders can be used alone or in combination of two or more kinds.

For the production of the polyurethane resin of the present invention as an aqueous polyurethane resin, the isocyanate group-terminated prepolymer obtained above and the chain extender are allowed to react in water to disperse them. This can produce a polyurethane resin having the isocyanate group-terminated prepolymer chain-extended by the chain extender, as an aqueous dispersion (an aqueous dispersion of a polyurethane resin).

The isocyanate group-terminated prepolymer is allowed to react with the chain extender in water in the following manner. For example, first, the isocyanate group-terminated prepolymer is added to water to disperse the isocyanate group-terminated prepolymer. Subsequently, the chain extender is added thereto to chain-extend the isocyanate group-terminated prepolymer.

The isocyanate group-terminated prepolymer is dispersed by gradually adding the isocyanate group-terminated prepolymer to water under stirring. The water is added at a ratio of preferably 60 to 1000 parts by mass per 100 parts by mass of the isocyanate group-terminated prepolymer.

Then, the chain extender is added to the isocyanate group-terminated prepolymer thus dispersed in water under stirring such that the equivalent ratio (active hydrogen group/NCO) of the active hydrogen group in the chain extender to the isocyanate group in the isocyanate group-terminated prepolymer is in the range of, for example, 0.5 to 1.1, or preferably 0.7 to 1.

In the case of using a polyamine component (diamine) as the chain extender, the amino group thereof has high reactivity with the isocyanate group of the isocyanate group-terminated prepolymer and a urea bond formed by the reaction has an extremely high intermolecular cohesive force, so that it is necessary to minimize localized reaction between the chain extender and the isocyanate monomer. Therefore, the chain extender is preferably blended as an aqueous solution. The concentration of the diamine in the aqueous solution is preferably at least 20% by mass, or more preferably at least 50% by mass. The chain extender is added preferably at a temperature of 40° C. or less, and after completion of the addition, the mixture is further stirred to complete the reaction at room temperature, for example.

When the isocyanate group-terminated prepolymer is obtained by solution polymerization, after completion of the reaction of the isocyanate group-terminated prepolymer, the organic solvent is removed, for example, by heating the organic solvent at an appropriate temperature under reduced pressure.

When the hydrophilic group-containing active hydrogen compound is not used as an active hydrogen compound component, that is, when the polyurethane resin is not internally emulsified during the production thereof as an aqueous polyurethane resin, for example, external emulsification (phase inversion emulsification or forced emulsification) is performed using an external emulsifier, for example, a nonionic surfactant such as polyoxyethylene alkyl ether, or an anionic surfactant such as sodium polyoxyethylene alkyl ether sulfate, whereby an external emulsification type aqueous polyurethane resin (an aqueous dispersion of polyurethane resin) can be obtained.

The aqueous polyurethane resin (the aqueous dispersion of polyurethane resin) thus obtained is prepared so as to have a solid content of, for example, 20 to 50% by mass.

The polyurethane resin has a number average molecular weight (number average molecular weight determined by GPC using a calibration curve of standard polystyrene) of, for example, 3000 to 100000, or preferably 5000 to 80000. As for the aqueous polyurethane resin (solid content), the charged ratio of the urethane group to the urea group is in the range of, for example, preferably 0.05 to 1.2, or more preferably 0.1 to 0.8.

Also, when the polyurethane resin of the present invention is produced as an aqueous polyurethane resin, further, known additives such as plasticizer, antiblocking agent, heat-resistant stabilizer, light-resistant stabilizer, antioxidant, releasing agent, and catalyst; or further, pigment, dye, lubricant, filler, and hydrolysis inhibitor can optionally be blended at an appropriate ratio.

When the polyurethane resin of the present invention produced as the aqueous polyurethane resin is formed into a film, the film excellent in chemical resistance, thermal properties, tensile strength at break, elongation at break, and strength development, and further having excellent dispersion stability, solvent resistance, and feel can be obtained.

Therefore, the film can be suitably used for artificial or synthetic leather which takes advantage of the above-mentioned properties.

The film can be formed by applying the aqueous polyurethane resin onto a substrate by a known coating such as gravure coating, reverse coating, roll coating, bar coating, spray coating, air knife coating, and dipping, and thereafter, heating the coated substrate to dry.

When used in the production of artificial and synthetic leather, the polyurethane resin of the present invention can be used, for example, as a material for a wet process or a dry process.

The aqueous polyurethane resin is not limited to the film, and the artificial and synthetic leather as mentioned above, and can be used for various applications such as automobile, electronics, clothing, medical materials, building materials, paints, and adhesives.

Next, the case of producing slush powders as the polyurethane resin of the present invention will be explained.

In such case, the polyurethane resin of the present invention is produced as a granular polyurethane resin by a reaction between the above-mentioned polyisocyanate component and the above-mentioned active hydrogen compound component.

In the case of producing the polyurethane resin of the present invention as a granular polyurethane resin, for example, 1,4-bis(isocyanatomethyl)cyclohexane containing not less than 80% by mole of trans isomers is used alone as the above-mentioned polyisocyanate component.

In the case of producing the polyurethane resin of the present invention as a granular polyurethane resin, the active hydrogen compound component that may be used includes, for example, the above-mentioned polyol components.

As the active hydrogen compound component, high-molecular-weight polyols are preferable, or polyester polyols are more preferable.

Further, in the case of producing the polyurethane resin of the present invention as a granular polyurethane resin, the active hydrogen compound component contains a chain extender.

Examples of the chain extender include the same chain extenders as those used when the polyurethane resin of the present invention is produced as an aqueous polyurethane resin, and specific examples thereof include low-molecular-weight polyols such as the above-mentioned dihydric alcohols and the above-mentioned trihydric alcohols; and polyamine components such as the above-mentioned alicyclic diamines and the above-mentioned aliphatic diamines.

As the chain extender, dihydric alcohols are preferable, or ethylene glycol, 1,3-propanediol, 1,4-butanediol, and 1,6-hexamethylene glycol are more preferable.

As the active hydrogen compound component, if necessary, for example, the above-mentioned low-molecular-weight polyol, polythiol component, polyamine component, monol and/or monoamine can further be used in combination.

For the reaction between the polyisocyanate component and the active hydrogen compound component, a known polyurethane forming method such as the above-mentioned one shot process (one shot process employed for producing the polyurethane resin of the present invention as an elastomer) or the above-mentioned prepolymer process (prepolymer process employed for producing the polyurethane resin of the present invention as an elastomer) can be applied. Preferably, the polyisocyanate component and the active hydrogen compound component are allowed to react according to the prepolymer process.

When the one shot process is employed, the above-mentioned components are allowed to react by simultaneously blending the above-mentioned polyisocyanate component and the above-mentioned active hydrogen compound component such a ratio that the equivalent ratio (NCO/active hydrogen group) of the isocyanate group in the polyisocyanate component to the active hydrogen group in the active hydrogen compound component is in the range of, for example, 0.8 to 1.1, or preferably 0.9 to 1.05.

This reaction is continued, for example, under a nitrogen atmosphere at a reaction temperature of 40 to 260° C., or preferably 80 to 220° C. for a reaction time of 0.5 to 10 hours, or preferably 2 to 8 hours.

In the reaction, if necessary, the above-mentioned urethanizing catalyst (urethanizing catalyst used in the case of producing the polyurethane resin of the present invention as an elastomer) or the above-mentioned organic solvent (organic solvent used in the case of producing the polyurethane resin of the present invention as an elastomer) can be added.

The urethanizing catalyst is added in an amount of, for example, 0.001 to 5 parts by mass, or preferably 0.01 to 3 parts by mass, per 100 parts by mass of the high-molecular-weight polyol.

Then, in the one shot process, the polyurethane resin thus obtained is, if necessary, crushed by a known method and thereafter, a freeze crushing method is performed to produce the polyurethane resin of the present invention in the form of powder.

When the prepolymer process is employed, first, the active hydrogen compound component except chain extenders (e.g., high-molecular-weight polyol; and low-molecular-weight polyol, polythiol component, polyamine component, monol, and monoamine which are blended if necessary) and the above-mentioned polyisocyanate component are allowed to react by blending them at such a ratio that the equivalent ratio (NCO/active hydrogen group) of the isocyanate group in the above-mentioned polyisocyanate component to the active hydrogen group in the active hydrogen compound component except chain extenders is, for example, from 1.1 to 4, or preferably from 1.4 to 2.5, so that an isocyanate group-terminated prepolymer is obtained.

When the above equivalent ratio is less than 1.1, the polyurethane resin has excessively high molecular weight, which may deteriorate moldability. On the other hand, when it exceeds 4, the slush molded article may become hard, which may damage the texture.

This reaction is continued, for example, under a nitrogen atmosphere at a reaction temperature of 40 to 180° C., or preferably 60 to 140° C. for a reaction time of 0.5 to 10 hours, or preferably 2 to 8 hours, and in the reaction system, the reaction is terminated at the time when a desired isocyanate group content (e.g., 1 to 12% by mass) is obtained. In the reaction, if necessary, the above-mentioned urethanizing catalyst (urethanizing catalyst used in the case of producing the polyurethane resin of the present invention as an elastomer) or the above-mentioned organic solvent (organic solvent used in the case of producing the polyurethane resin of the present invention as an elastomer) can also be added.

Subsequently, the isocyanate group-terminated prepolymer thus obtained and the chain extender are blended at such a ratio that the equivalent ratio (active hydrogen group/NCO) of the active hydrogen group in the chain extender to the isocyanate group in the isocyanate group-terminated prepolymer is in the range of, for example, 0.8 to 1.1, or preferably 0.9 to 1.05, and the blended mixture is subjected to a chain extension reaction, whereby a polyurethane resin is produced.

In the chain extension reaction, for example, the isocyanate group-terminated prepolymer is dispersed in a non-aqueous dispersion medium or an aqueous dispersion medium to prepare a dispersion of the isocyanate group-terminated prepolymer, and a chain extender is added at once or in portions to the dispersion.

Examples of the non-aqueous dispersion medium include the above-mentioned organic solvents, and examples of the aqueous dispersion include water, or mixed solutions of water and alcohols (e.g., methanol, ethanol, etc.).

The blending amount of the non-aqueous dispersion medium or the aqueous dispersion medium is in the range of, for example, 10 to 200 parts by mass, or preferably 20 to 150 parts by mass, per 100 parts by mass of the isocyanate group-terminated prepolymer.

When the isocyanate group-terminated prepolymer is dispersed in the aqueous dispersion medium, for example, the above-mentioned hydrophilic group-containing active hydrogen compound (hydrophilic group-containing active hydrogen compound used in the case of producing the polyurethane resin of the present invention as of an aqueous polyurethane resin) is contained in the active hydrogen compound component in the preparation of the isocyanate group-terminated prepolymer, whereby the isocyanate group-terminated prepolymer can be internally emulsified.

Alternatively, when the isocyanate group-terminated prepolymer is dispersed in the aqueous dispersion medium, the same external emulsifier as the above-mentioned external emulsifier (external emulsifier used in the case of producing the polyurethane resin of the present invention as an aqueous polyurethane resin) is added to the aqueous dispersion medium and/or the isocyanate group-terminated prepolymer, whereby the isocyanate group-terminated prepolymer can also be externally emulsified.

Further, a dispersion stabilizer can be added to the dispersion in order to prevent the sedimentation of the dispersed phase. Examples of the dispersion stabilizer include dispersing agents described in Japanese Unexamined Patent Publication No. 2004-169011, such as resin obtained by dehydration condensation of an alkenyl succinic anhydride and a polyol or a polyester polyol; alkyd resin obtained by dehydration condensation of a part of the remaining OH groups of the polyester, which is obtained by dehydration condensation of dicarboxylic acid and pentaerythritol, with fatty acids; resin obtained by grafting an ethylenically unsaturated monomer onto a polyol obtained by dehydration condensation of an unsaturated bond-containing dicarboxylic acid and a polyol or a polyester polyol, and thereafter masking an OH group; and resin obtained by masking an OH group of a polyol obtained by dehydration condensation of an unsaturated bond-containing dicarboxylic acid and a polyol or a polyester polyol, and thereafter grafting an ethylenically unsaturated monomer.

The blending amount of the external emulsifier or the dispersion stabilizer is in the range of, for example, 0.05 to 5 parts by mass, preferably 0.1 to 3 parts by mass, or more preferably 0.15 to 1.5 parts by mass, per 100 parts by mass of the isocyanate group-terminated prepolymer.

The chain extension reaction is conducted, for example, at a reaction temperature of 10 to 100° C., or preferably 20 to 90° C. for a reaction time of 0.5 to 8 hours, or preferably 2 to 6 hours. In the reaction, if necessary, the above-mentioned known urethanizing catalyst can be added.

Thus, the polyurethane resin can be obtained in the form of a dispersion.

In the chain extension reaction, without dispersing the isocyanate group-terminated prepolymer in the non-aqueous dispersion medium or the aqueous dispersion medium, the isocyanate group-terminated prepolymer and the chain extender can be allowed to react directly with each other.

As for the polyurethane resin of the present invention, when the dispersion is prepared from a non-aqueous dispersion medium, solids are separated, for example, by separation means such as filtration to obtain a polyurethane resin in the form of powder. On the other hand, when the dispersion is prepared from an aqueous dispersion medium, solids are separated, for example, by spray drying to obtain a polyurethane resin in the form of powder. Further, when the isocyanate group-terminated prepolymer and the chain extender are allowed to react directly with each other without dispersing in the non-aqueous dispersion medium or the aqueous dispersion medium, a polyurethane resin is obtained in the form of powder, for example, by a freeze crushing method.

Also, when the polyurethane resin of the present invention is produced as a granular polyurethane resin, further, known additives such as plasticizer, antiblocking agent, heat-resistant stabilizer, light-resistant stabilizer, antioxidant, and releasing agent; further, antioxidant, pigment, dye, lubricant, filler, and hydrolysis inhibitor; or further, thermally crosslinkable monomer and polymerization inhibitor can optionally be blended at an appropriate ratio. These additives may be added during synthesis of each component or may be added during mixing and dissolving of each component, and further, they can also be added after synthesis.

According to the polyurethane resin of the present invention thus obtained in the form of powder (granular polyurethane resin), a slush molded article excellent in releasability from a mold after molding, tensile strength, and thermal properties during slush molding, and further having excellent texture (feel) and design can be slush-molded with high production efficiency.

Therefore, the slush molded article of the present invention is excellent in tensile strength and thermal properties, and further has excellent texture (feel) and design.

Accordingly, the polyurethane resin of the present invention obtained as a granular polyurethane resin and a mold article thereof are useful in various fields involving slush molding, for example, furniture such as sofas and bedding; toys; sporting goods; and toner binders, and are particularly useful in automobile interior trim articles. The polyurethane resin (granular polyurethane resin) of the present invention is useful in fields other than those involving slush molding, for example, toner binders.

Next, the case of producing an elastic molded article (spandex) as the polyurethane resin of the present invention will be explained.

In such case, the polyurethane resin of the present invention is produced as a polyurethane resin for elastic molding by a reaction between the above-mentioned polyisocyanate component and the above-mentioned active hydrogen compound component.

In the case of producing the polyurethane resin of the present invention as a polyurethane resin for elastic molding, for example, 1,4-bis(isocyanatomethyl)cyclohexane containing not less than 80% by mole of trans isomers is used alone as the above-mentioned polyisocyanate component.

In the case of producing the polyurethane resin of the present invention as a polyurethane resin for elastic molding, the active hydrogen compound component that may be used include, for example, the above-mentioned polyol components.

As the active hydrogen compound component, high-molecular-weight polyols are preferable, or polyester polyols and polyether polyols are more preferable.

Further, in the case of producing the polyurethane resin of the present invention as a granular polyurethane resin, the active hydrogen compound component contains a chain extender.

Examples of the chain extender include the same chain extenders as those used when the polyurethane resin of the present invention is produced as an aqueous polyurethane resin, and specific examples thereof include low-molecular-weight polyols such as the above-mentioned dihydric alcohols and the above-mentioned trihydric alcohols; and polyamine components such as the above-mentioned alicyclic diamines and the above-mentioned aliphatic diamines. Among them, a polyamine component is preferable, or aliphatic diamine is more preferable.

As the chain extender used in the case of producing the polyurethane resin of the present invention as a polyurethane resin for elastic molding, the above-mentioned monoamine can be used. Further, as long as the moldability or extensibility of the polyurethane resin is not impaired, an amine compound such as bis-(4-amino-3-chlorophenyl)methane, diethyltoluenediamine, dimethylthiotoluenediamine, trimethylene-bis(4-aminobenzoate), or 4,4'-diamino-3,3-diethyl-5,5-dimethyldiphenylmethane can also be used.

These chain extenders can be used alone or in combination of two or more kinds. In particular, the polyurethane resin of the present invention can be adjusted to a desired molecular weight by using a polyamine component and a monoamine in combination. Among them, as the polyamine component, ethylenediamine, hydrazine (including hydrate thereof), 1,2-diaminopropane, 1,4-bis(aminomethyl)cyclohexane, and 1,4-cyclohexanediamine are preferable, and as monoamine, di-n-butylamine and diethylamine are preferable. More preferable is a combination use of diethylamine and ethylenediamine (e.g., diethylamine (DEA) and ethylenediamine (EDA) at a molar ratio (DEA/EDA) of 0.5/99.5 to 20/80).

When the chain extension is performed by using these chain extenders, a urea group (—NH$_2$—CO—NH$_2$—) can be contained in a hard segment (a segment obtained by the reaction between the polyisocyanate component and the chain extender) contained in the polyurethane resin. Therefore, a polyurethane resin having excellent elasticity and extensibility can be obtained.

As the active hydrogen compound component, if necessary, for example, the above-mentioned low-molecular-weight polyol, polythiol component, polyamine component, monol and/or monoamine can further be used in combination.

For the reaction between the polyisocyanate component and the active hydrogen compound component, a known polyurethane forming method such as the above-mentioned one shot process (one shot process employed for producing the polyurethane resin of the present invention as an elastomer) or the above-mentioned prepolymer method (prepolymer method employed for producing the polyurethane resin of the present invention as an elastomer) can be applied.

When the one shot process is employed, the above-mentioned components are allowed to react by simultaneously blending the above-mentioned polyisocyanate component and the above-mentioned active hydrogen compound component such a ratio that the equivalent ratio (NCO/active hydrogen group) of the isocyanate group in the polyisocyanate component to the active hydrogen group in the active hydrogen compound component is in the range of, for example, 0.9 to 1.1, or preferably 0.98 to 1.05.

This reaction can be conducted in the same manner as the bulk polymerization (bulk polymerization performed in the case of producing the polyurethane resin of the present invention as an elastomer) or the solution polymerization (solution polymerization performed in the case of producing the polyurethane resin of the present invention as an elastomer).

When the bulk polymerization is employed, for example, the above-mentioned components are allowed to react under a nitrogen atmosphere at a temperature of 100 to 250° C. or preferably 130 to 220° C. for 0.5 to 12 hours, or preferably 1 to 10 hours.

When the solution polymerization is employed, for example, the above-mentioned components are allowed to react under a nitrogen atmosphere at a temperature of 30 to 100° C. or preferably 40 to 90° C. for 2 to 10 hours, or preferably 3 to 8 hours.

When the prepolymer process is employed, first, the active hydrogen compound component except chain extenders (e.g., high-molecular-weight polyol; and low-molecular-weight polyol, polythiol component, polyamine component, monol, and monoamine which are blended if necessary) and the above-mentioned polyisocyanate component are allowed to react by blending them at such a ratio that the equivalent ratio (NCO/active hydrogen group) of the isocyanate group in the above-mentioned polyisocyanate component to the active hydrogen group in the active hydrogen compound component except chain extenders is, for example, from 1.1 to 3, preferably from 1.3 to 2.5, or more preferably from 1.3 to 2, so that an isocyanate group-terminated prepolymer is obtained.

This reaction is continued, for example, under a nitrogen atmosphere at a reaction temperature of 40 to 130° C., or preferably 50 to 120° C. for a reaction time of 1 to 10 hours, or preferably 2 to 6 hours. In the reaction, if necessary, the above-mentioned urethanizing catalyst (urethanizing catalyst in the case of producing the polyurethane resin of the present invention as an elastomer) or an organic solvent can also be added.

Subsequently, the isocyanate group-terminated prepolymer thus obtained and the chain extender are blended at such a ratio that the equivalent ratio (NCO/active hydrogen group) of the isocyanate group in the isocyanate group-terminated prepolymer to the active hydrogen group in the chain extender is in the range of, for example, 0.9 to 1.1, or preferably 0.98 to 1.05, and the blended mixture is subjected to chain extension reaction, whereby a polyurethane resin is produced.

In the chain extension reaction, for example, the isocyanate group-terminated prepolymer and the chain extender are allowed to react by dissolving them in an organic solvent. Thus, a polyurethane resin in which the isocyanate group-terminated prepolymer is chain-extended by the chain extender can be obtained in the form of a solution.

Examples of the organic solvent include those mentioned above, and among them, N,N'-dimethylacetamide is preferable.

The isocyanate group-terminated prepolymer and the chain extender are allowed to react in the organic solvent in the following manner. For example, first, a solvent is added to the isocyanate group-terminated prepolymer, and the isocyanate group-terminated prepolymer is dissolved to prepare a prepolymer solution. Subsequently, the chain extender is added to this prepolymer solution to chain-extend the isocyanate group-terminated prepolymer.

The isocyanate group-terminated prepolymer is dissolved in the solvent, for example, by gradually adding an organic solvent to the isocyanate group-terminated prepolymer under stirring. The organic solvent is added so as to be in an amount of preferably from 180 to 900 parts by mass per 100 parts by mass of the isocyanate group-terminated prepolymer. More specifically, the organic solvent is added so that the concentration of the isocyanate group-terminated prepolymer is in the range of, for example, 10 to 35% by mass.

During the dissolution, the temperature of the isocyanate group-terminated prepolymer is preliminarily lowered to, for example, 50° C. or less, or preferably 40° C. or less.

Subsequently, the chain extender is added to the prepolymer solution so as to have the above-mentioned proportion. When a polyamine component is used as the chain extender, the polyamine component is added at a temperature of preferably 20° C. or less, and after completion of the addition, the mixture is further stirred to complete the reaction at a temperature of, for example, 25 to 80° C. On the other hand, when a low-molecular-weight polyol is used as the chain extender, the chain extender is added dropwise at a temperature of preferably 40 to 90° C., and the reaction is completed within this temperature range. The chain extender can also be added as a chain extender solution of the solvent.

The polyurethane resin thus obtained has a number average molecular weight (number average molecular weight determined by GPC using a calibration curve of standard polystyrene) of, for example, 60000 to 300000, or preferably 90000 to 250000.

When the polyurethane resin of the present invention is produced as a polyurethane resin for elastic molding, a sulfonamide group-containing compound having a sulfonamide group is preferably contained according to the purposes and applications.

The containing of the sulfonamide group-containing compound allows the polyurethane resin of the present invention produced as a polyurethane resin for elastic molding to have improved thermal stability.

Therefore, when the polyurethane resin for elastic molding is used for elastic molded articles subjected to heat treatment (e.g., drying treatment), for example, elastic fibers such as clothes and socks, the containing of the sulfonamide group-containing compound in the polyurethane resin for elastic molding can produce elastic fibers, sheets, or the like which are excellent in thermal stability.

Examples of the sulfonamide group-containing compound include aliphatic sulfonamides such as methane sulfonamide, N,N-dimethylmethane sulfonamide, N,N-dimethylethane sulfonamide, N,N-diethylmethane sulfonamide, N-methoxymethane sulfonamide, N-dodecylmethane sulfonamide, N-cyclohexyl-1-butane sulfonamide, and 2-aminoethane sulfonamide; and aromatic sulfonamides such as benzene sulfonamide, dimethylbenzene sulfonamide, sulfanilamide, o-toluene sulfonamide, and p-toluene sulfonamide, and mixtures thereof, hydroxynaphthalene sulfonamide, naphthalene-1-sulfonamide, naphthalene-2-sulfonamide, m-nitrobenzene sulfonamide, and p-chlorobenzene sulfonamide.

These sulfonamide group-containing compounds can be used alone or in combination of two or more kinds. Among them, aromatic sulfonamide is preferable, or o-toluene sulfonamide, p-toluene sulfonamide, and mixtures thereof are more preferable.

In the case of producing the polyurethane resin of the present invention as a polyurethane resin for elastic molding, when the polyurethane resin of the present invention contains a sulfonamide group-containing compound, the content of the sulfonamide group-containing compound to the polyurethane resin is in the range of, for example, preferably 1 to 10000 ppm, more preferably, 10 to 8000 ppm, and even more preferably 100 to 3000 ppm on mass basis.

To contain the sulfonamide group-containing compound in the polyurethane resin, for example, the sulfonamide group-containing compound may be blended with the polyisocyanate component or the active hydrogen compound component, or added to the prepolymer solution, though not limited thereto.

Also, when the polyurethane resin of the present invention is produced as a polyurethane resin for elastic molding, further, known additives such as plasticizer, antiblocking agent, heat-resistant stabilizer, light-resistant stabilizer, and releasing agent; or further, pigment, dye, lubricant, filler, and hydrolysis inhibitor can optionally be added. These additives may be added during synthesis of each component or may be added during mixing and dissolving of each component, and further they can also be added after separation/drying of the polyurethane resin.

Among these additives, examples of the heat-resistant stabilizer include stabilizers such as a hindered phenol type stabilizer, an amine type stabilizer, a phosphorus type stabilizer, and a sulfur stabilizer.

Examples of the light-resistant stabilizer include a benzophenone type ultraviolet absorber, a benzotriazol type ultraviolet absorber, a hindered amine type ultraviolet absorber, a salicylate type ultraviolet absorber, a cyanoacrylate type ultraviolet absorber, an acrylonitrile type ultraviolet absorber, a nickel or cobalt complex type ultraviolet absorber. Among them, a benzophenone type ultraviolet absorber and a benzotriazol type ultraviolet absorber are preferable.

According to the polyurethane resin of the present invention produced as a polyurethane resin for elastic molding, it is possible to suppress the deterioration of mechanical strength and the residual strain under cyclic deformation, to improve thermal properties, tensile strength at break, elongation at break, and strength development, and further to improve yellowing resistance.

Therefore, even under cyclic deformation, the molded article of the present invention is less susceptible to deterioration of mechanical strength and hardly causes residual strain. It is also excellent in thermal properties, tensile strength at break, elongation at break, and strength development, and further has excellent yellowing resistance.

Therefore, the molded article of the present invention is useful for various elastic molded articles (spandex) requiring elastic performance, such as elastic fibers used for various textiles including socks, stocking, circular knitted fabric, tricot, swimming suits, ski pants, working clothes, fire-proof clothing, clothes, golf trousers, wet suits, brassiere, girdles, and gloves; elastic films used as food wrap film; and fastening materials for leakage prevention of sanitary products including disposable diapers, securing materials for waterproofing materials, artificial baits, artificial flowers, electric insulating materials, wiping cloth, copy cleaners, and gaskets.

When the polyurethane resin of the present invention is used in elastic fibers, the elastic fibers can be produced by a known spinning method such as melt spinning, dry spinning, and wet spinning.

When the elastic fibers are produced by a melt spinning method, the specific spinning conditions are as follows. For example, the spinning temperature is in the range of 160 to 230° C., and the spinning speed is adjusted so as to produce a 20 to 50-denier yarn. Then, the spun elastic fibers are used in the state of, for example, covering yarn or bare yarn.

On the other hand, when used for elastic films, the polyurethane resin of the present invention can be made by a known method such as solvent casting or T-die casting, or inflation.

When an elastic film is made by a T-die casting method and an inflation method, the specific film forming conditions are as follows. For example, the die temperature is in the range of 160 to 230° C., and the winding speed is adjusted to give a film thickness of 20 to 100 µm. In addition, when an elastic sheet is made, the die lip width and the winding speed are adjusted. Thus, a molded article (elastic sheet) having a thickness exceeding 100 µm can be obtained.

The polyurethane resin of the present invention is not limited to the above-mentioned elastic molded articles, and can be used for various applications such as nonwoven cloth produced by a method including spunbond and meltblown forming; paints; and raw material of adhesives produced by a method including hot melt method.

Next, the case of producing the polyurethane resin of the present invention as a polyurethane resin for reaction injection molding (RIM) will be explained.

The polyurethane resin of the present invention produced as a polyurethane resin for RIM can be obtained by a reaction between the above-mentioned polyisocyanate component and the above-mentioned active hydrogen compound component.

In the case of producing the polyurethane resin of the present invention as a polyurethane resin for RIM, for example, 1,4-bis(isocyanatomethyl)cyclohexane containing not less than 80% by mole of trans isomers and the polyisocyanate modified product of the above-mentioned isocyanurate (hereinafter simply referred to as isocyanurate-modified product) are used in combination as the above-mentioned polyisocyanate component.

As the isocyanurate-modified product, an isocyanurate-modified alicyclic diisocyanate and an isocyanurate-modified aralkyl diisocyanate are preferable, or an isocyanurate-modified alicyclic diisocyanate is more preferable.

The content of the isocyanurate-modified product in the polyisocyanate component is in the range of, for example, 60 to 10 parts by mass, preferably 50 to 20 parts by mass, or more preferably 40 to 20 parts by mass, per 100 parts by mass of the polyisocyanate component.

When these mass mixing ratios are within the above range, the tear strength (tear resistance) of the polyurethane resin for RIM can be improved, so that it is possible to suppress breakage (e.g., tear, etc.) of the reaction injection molded article at the time of releasing from the mold after the reaction injection molding. In addition, the long-term heat resistance of the reaction injection molded article can also be improved.

In the case of producing the polyurethane resin of the present invention as a polyurethane resin for RIM, the polyisocyanate component is prepared, for example, by blending 1,4-bis(isocyanatomethyl)cyclohexane and an isocyanurate-modified product at the above-mentioned mass mixing ratio, and then mixing them with a known stirrer.

In the case of producing the polyurethane resin of the present invention as a polyurethane resin for RIM, the above-mentioned active hydrogen compound component that may be used include, for example, the above-mentioned polyol components.

As the active hydrogen compound component, high-molecular-weight polyols are preferable, or polyether polyols are more preferable.

As the active hydrogen compound component, if necessary, for example, the above-mentioned low-molecularweight polyol, polythiol component, polyamine component, monol and/or monoamine can further be used in combination.

In the case of producing the polyurethane resin of the present invention as a polyurethane resin for RIM, the polyurethane resin can be molded with a known reaction injection molding apparatus. The known reaction injection molding apparatus is an apparatus equipped with at least (1) a first supply tank for supplying a polyisocyanate component, (2) a second supply tank for supplying an active hydrogen compound component, (3) a mixing head for mixing the polyisocyanate component and the active hydrogen compound component to inject the mixture into a mold, and (4) a mold.

Specifically, first, a polyisocyanate component and an active hydrogen compound component are supplied from the first supply tank (1) and the second supply tank (2), respectively, to the mixing head (3). At this time, the raw material temperature of the polyisocyanate component is adjusted to, for example, 35 to 55° C. On the other hand, the raw material temperature of the active hydrogen compound component is also adjusted to, for example, 35 to 55° C. During mixing, the index (INDEX), which is represented by the molar ratio of the isocyanate group in the polyisocyanate component to the active hydrogen group in the active hydrogen compound component in terms of percentage, is in the range of, for example, 80 to 120 and is preferably set to 95 to 105.

Then, the polyisocyanate component and the active hydrogen compound component are mixed with stirring with the mixing head (3), and the mixture is injected into the mold (4) at an injection rate of, for example 200 to 2500 g/sec. The mold (4) is preliminarily pressurized with a pressure of, for example, 10 to 30 MPa and heated to a temperature of 60 to 80° C. Further, if necessary, a releasing agent such as an aqueous wax emulsion is applied to the molding surface of the mold (4) to improve the mold releasability of a molded article.

Then, the polyisocyanate component and the active hydrogen compound component are injected into the mold (4), and thereafter, both of the components are subjected to polymerization in the mold (4), for example, for 1 to 3 minutes. Subsequently, the mold (4) is cooled to room temperature and the pressure therein is reduced to normal pressure, and the resulting reaction injection molded article is released from the mold (4) to obtain a reaction injection molded article.

Also, when the polyurethane resin of the present invention is produced as a polyurethane resin for RIM, further, known additives such as the above-mentioned urethanizing catalyst (urethanizing catalyst used in the case of producing the polyurethane resin of the present invention as an elastomer), light-resistant stabilizer (ultraviolet absorber), antioxidant (heat-resistant stabilizer), or multifunctional stabilizer can optionally be blended at an appropriate ratio. These additives are preliminarily added to the polyisocyanate component and/or the active hydrogen compound component. Preferably, they are added to the active hydrogen compound component.

Examples of the urethanizing catalyst include those mentioned above. Among them, an organometallic compound is preferable, or dibutyl tin dineodecanoate is more preferable. The amount of the urethanizing catalyst added is in the range of, for example, 0.1 to 1.5 parts by mass, or preferably 0.3 to 1.0 parts by mass, per 100 parts by mass of the active hydrogen compound component.

Examples of the light-resistant stabilizer (ultraviolet absorber) include those mentioned above (light-resistant stabilizer used in the case of producing the polyurethane resin of the present invention as a polyurethane resin for elastic molding).

Among them, a benzotriazol type ultraviolet absorber and a hindered amine type ultraviolet absorber are preferable. The amount of the ultraviolet absorber added is in the range of, for example, 0.1 to 1.0 parts by mass, or preferably 0.3 to 0.7 parts by mass, per 100 parts by mass of the active hydrogen compound component.

Examples of the antioxidant (heat-resistant stabilizer) include those mentioned above (heat-resistant stabilizer used in the case of producing the polyurethane resin of the present invention as a polyurethane resin for elastic molding). Among them, a hindered phenol type stabilizer is preferable. The amount of the antioxidant added is in the range of, for example, 0.1 to 1.0 parts by mass, or preferably 0.3 to 0.7 parts by mass, per 100 parts by mass of the active hydrogen compound component.

The multifunctional stabilizer is a stabilizer, for example, having both an ultraviolet absorption function and an antioxidant function, and specific examples thereof include a benzotriazolyl-alkyl bisphenol compound. The amount of the multifunctional stabilizer added is in the range of, for example, 0.1 to 1.0 parts by mass, or preferably 0.3 to 0.7 parts by mass, per 100 parts by mass of the polyol component.

Further, depending on the applications, known additives such as chain extender, crosslinking agent, pigment, flame retardant, pigment dispersing agent (lubricating dispersing agent), foam stabilizer, or antifoaming agent can also be blended with the mixture of the polyisocyanate component and the active hydrogen compound component at an appropriate ratio.

According to the polyurethane resin of the present invention obtained as a polyurethane resin for injection molding, a reaction injection molded article excellent in releasability from the mold after molding, hardness, thermal properties, and tear resistance development, and further having excellent weather resistance can be injection-molded with high production efficiency.

Therefore, the reaction injection molded article of the present invention is excellent in hardness, thermal properties, and tear resistance development, and is further excellent in weather resistance.

Accordingly, the polyurethane resin of the present invention obtained as a polyurethane resin for reaction injection molding and a reaction injection molded article thereof are useful in various fields involving reaction injection molding, for example, transportation equipment components such as automobile bumpers, dashboards, door trims, and instrument panels; interior parts of stores, offices, and other buildings; and home and office furniture, and particularly useful in skin layers of interior decorative materials in transportation equipment, such as automobile instrument panels and door trims, which are exposed to high-temperature environment.

Next, the case of using the polyurethane resin of the present invention as a paint (coating composition) and an adhesive (adhesive composition) will be explained.

In such case, the polyurethane resin of the present invention is prepared as a two-part curing polyurethane resin obtained by separately preparing the above-mentioned polyisocyanate component and the above-mentioned active hydrogen compound component, and blending them when used.

In the case of producing the polyurethane resin of the present invention as a two-part curing polyurethane resin, for example, 1,4-bis(isocyanatomethyl)cyclohexane containing not less than 80% by mole of trans isomers is prepared as a derivative, and the derivative thereof is used alone as the above-mentioned polyisocyanate component.

More specifically, as the above-mentioned polyisocyanate component, an allophanate-modified and/or isocyanurate-modified 1,4-bis(isocyanatomethyl)cyclohexane containing not less than 80% by mole of trans isomers is/are used alone.

The allophanate-modified and/or isocyanurate-modified 1,4-bis(isocyanatomethyl)cyclohexane containing not less than 80% by mole of trans isomers can be obtained, for example, by a reaction between 1,4-bis(isocyanatomethyl)cyclohexane containing not less than 80% by mole of trans isomers and a monol having 10 to 50 carbon atoms.

Examples of the monol having 10 to 50 carbon atoms include n-decanol, n-undecanol, n-dodecanol (dodecyl alcohol), butylhexanol, trimethyl nonyl alcohol, n-tridecanol, n-tetradecanol, 5-ethyl-2-nonanol, n-pentadecanol, n-hexadecanol, 2-hexyldecanol, n-heptadecanol, 3,9-diethyl-6-decanol, n-octadecanol, 2-isoheptylisoundecanol, n-nonadecanol, eicosanol, 2-octyldodecanol, ceryl alcohol, 2-decyltetradecanol, 2-cetyl stearyl alcohol, and melissyl alcohol. Among them, monols having 10 to 30 carbon atoms are preferable, or monols having 10 to 16 carbon atoms are more preferable. More specifically, examples thereof include n-decanol (n-decyl alcohol), n-dodecanol (n-dodecyl alcohol), and n-hexadecanol (n-hexadecyl alcohol). These monols can be used alone or in combination of two or more kinds.

As long as these monols have one hydroxyl group in a molecule thereof, the other molecular structures are not limited unless the excellent effect of the present invention is impaired, and for example, they can also have an ester group, an ether group, a cyclohexane ring, an aromatic ring, or the like in a molecule thereof.

In the case of producing the polyurethane resin of the present invention as a two-part curing polyurethane resin, the above-mentioned polyisocyanate component is prepared by a reaction between for example, 1,4-bis(isocyanatomethyl)cyclohexane containing not less than 80% by mole of trans isomers and a monol having 10 to 50 carbon atoms such that the allophanate/isocyanurate composition ratio (the mass ratio of the allophanate-modified 1,4-bis(isocyanatomethyl)cyclohexane containing not less than 80% by mole of trans isomers to the isocyanurate-modified 1,4-bis(isocyanatomethyl)cyclohexane containing not less than 80% by mole of trans isomers) is 50/50 to 100/0, or preferably 60/40 to 95/5.

That is, the reaction is conducted so that the mass of the allophanate composition (allophanate-modified 1,4-bis(isocyanatomethyl)cyclohexane containing not less than 80% by mole of trans isomers) is the same or larger than the mass of the isocyanurate composition (isocyanurate-modified 1,4-bis(isocyanatomethyl)cyclohexane containing not less than 80% by mole of trans isomers).

The allophanate/isocyanurate composition ratio can be calculated, for example, by measuring the molecular weight distribution of the polyisocyanate component using a gel permeation chromatograph (GPC) equipped with a differential refractive index detector (RID), and determining a ratio (area ratio) between a peak corresponding to the allophanate-modified 1,4-bis(isocyanatomethyl)cyclohexane containing not less than 80% by mole of trans isomers and a peak corresponding to the isocyanurate-modified 1,4-bis(isocyanatomethyl)cyclohexane containing not less than 80% by mole of trans isomers, from the obtained chromatogram (chart). For convenience, in the chromatogram measured by GPC, peaks other than the peak corresponding to the allophanate-modified 1,4-bis(isocyanatomethyl)cyclohexane containing not less than 80% by mole of trans isomers are regarded as the peak corresponding to the isocyanurate-modified 1,4-bis(isocyanatomethyl)cyclohexane containing not less than 80% by mole of trans isomers (however, the peak corresponding to unreacted 1,4-bis(isocyanatomethyl)cyclohexane containing not less than 80% by mole of trans isomers, if remains, is excluded), and the area ratio of the peak corresponding to the allophanate-modified 1,4-bis(isocyanatomethyl)cyclohexane containing not less than 80% by mole of trans isomers to all the peaks can be calculated as an allophanate composition ratio (the remainder thereof is an isocyanurate composition ratio).

In the polyisocyanate component, the 1,4-bis(isocyanatomethyl)cyclohexane containing not less than 80% by mole of trans isomers and the monol having 10 to 50 carbon atoms are made to react with each other under specific reaction conditions in the presence of a specific reaction catalyst so that the allophanate/isocyanurate composition ratio falls in the above range.

As the reaction catalyst, catalysts having easy reaction control, little coloring of the reaction product, and capable of reducing the generation of dimers having poor thermal stability, are used, and examples of the reaction catalyst include the above-mentioned urethanizing catalyst (urethanizing catalyst used in the case of producing the polyurethane resin of the present invention as an elastomer).

Examples of the reaction catalyst also include, in addition to the above-mentioned urethanizing catalyst, a hydroxide or organic weak acid salt of a tetraalkylammonium such as tetramethylammonium and tetraethylammonium; a hydroxide or organic weak acid salt of trialkylhydroxyalkylammonium such as trimethylhydroxypropylammonium and triethylhydroxypropylammonium; an alkali metal salt of an alkylcarboxylic acid such as acetic acid, caproic acid, octylic acid, and myristic acid; a metal salt such as a tin salt, zinc salt, or lead salt of the above-mentioned alkylcarboxylic acid; a metal chelate compound of a 13-diketone such as aluminum acetylacetone and lithium acetylacetone; a Friedel-Crafts catalyst such as aluminum chloride and boron trifluoride; various organic metallic compounds such as titanium tetrabutylate and tributyl antimony oxide; and an aminosilyl group-containing compound such as hexamethylsilazane. Among them, an alkali metal salt of an alkylcarboxylic acid is preferable. These reaction catalysts can be used alone or in combination of two or more kinds.

The catalyst is added in an amount of, for example, 0.1 parts by mass or less, or preferably 0.01 parts by mass or less, per 100 parts by mass of the 1,4-bis(isocyanatomethyl)cyclohexane containing not less than 80% by mole of trans isomers. If possible, the catalyst is desirably added in a small amount in order to prevent high polymerization of polyurethane compounds.

As the reaction conditions, for example, the reaction is conducted under an atmosphere of inert gas such as nitrogen gas, and normal pressure (atmospheric pressure); the reaction temperature is, for example, in excess of 70° C., or preferably from 80 to 130° C.; and the reaction time is in the range of, for example, 1 to 24 hours, or preferably 2 to 20 hours.

In this reaction, the 1,4-bis(isocyanatomethyl)cyclohexane containing not less than 80% by mole of trans isomers and the monol having 10 to 50 carbon atoms are blended at such a ratio that the equivalent ratio (NCO/OH) of the isocyanate group in the 1,4-bis(isocyanatomethyl)cyclohexane containing not less than 80% by mole of trans isomers to the hydroxyl group in the monol having 10 to 50 carbon atoms is in the range of, for example, 5 to 50, or preferably 15 to 40.

In this reaction, if necessary, the above-mentioned organic solvent (organic solvent used in the case of producing the polyurethane resin of the present invention as an elastomer)

may be blended, and further, a known catalyst deactivator can also be added at arbitrary timing.

The reaction is described in more specific details: For example, a reaction vessel in which the atmosphere has been replaced by inert gas is charged with 1,4-bis(isocyanatomethyl)cyclohexane containing not less than 80% by mole of trans isomers and a monol having 10 to 50 carbon atoms in the above blending proportion. The mixture is then allowed to react therein at a temperature, for example, in excess of 80° C., or preferably 85 to 120° C. for 2 to 6 hours. Thereafter, a reaction catalyst is added thereto and further allowed to react at a temperature of, for example, 90 to 110° C., or preferably 90 to 100° C. for 2 to 24 hours. Subsequently, a catalyst deactivator (e.g., o-toluenesulfonamide) is added to terminate the reaction.

After completion of the reaction, if necessary, unreacted 1,4-bis(isocyanatomethyl)cyclohexane containing not less than 80% by mole of trans isomers is removed by a known method such as distillation.

In addition, after the reaction is completed, the obtained polyisocyanate component can be allowed to react with a polyol having a number average molecular weight of, for example, 400 to 5000, or preferably 700 to 3000, whereby the obtained polyisocyanate component can be modified with the polyol.

Examples of the polyol include polyoxyalkylene polyols such as polyoxyethylene diol, polyoxyethylene triol, polyoxypropylene diol, polyoxypropylene triol, polyoxyethylene oxypropylene diol, and polyoxyethylene oxypropylene triol; and castor oil polyols, acrylic polyols, and polyester polyols. These polyols can also be used alone or in combination of two or more kinds.

The blending amount of the polyol is in the range of, for example, 1 to 20 parts by mass, or preferably 5 to 15 parts by mass, per 100 parts by mass of the polyisocyanate component.

The polyisocyanate component and the polyol can be made to react with each other under any known reaction conditions without particular limitation.

As described above, the polyisocyanate component thus obtained has an allophanate/isocyanurate composition ratio in the range of preferably 50/50 to 100/0 (mass ratio), or even 60/40 to 95/5 (mass ratio); a conversion ratio (reaction ratio) of, for example, 30 to 50%, or even 35 to 45%; an isocyanate content of, for example, 10 to 20%, or even 12 to 18%; and a content of the unreacted 1,4-bis(isocyanatomethyl)cyclohexane containing not less than 80% by mole of trans isomers of, for example, 1.0% by mass or less, or even 0.5% by mass or less.

In the case of producing the polyurethane resin of the present invention as a two-part curing polyurethane resin, for example, the above-mentioned polyol components are used as the above-mentioned active hydrogen compound component. Among them, a high-molecular-weight polyol is preferable, and as a coating composition, acrylic polyol is preferable.

As the active hydrogen compound component, if necessary, for example, the above-mentioned low-molecular-weight polyol, polythiol component, polyamine component, monol and/or monoamine can further be blended at an appropriate ratio.

The two-part curing polyurethane resin is preferably used as a two-part curing type paint and/or a two-part curing type adhesive agent. Specifically, first, the above-mentioned active hydrogen compound component is prepared, a polyisocyanate component is then separately prepared. The active hydrogen compound component and the polyisocyanate component are mixed immediately before use, to prepare a two-part curing polyurethane resin, and the two-part curing polyurethane resin is applied onto an article to be coated or adhered.

In addition to the above components, the two-part curing polyurethane resin can also contain other functional compounding agents according to the purpose and application.

As the functional compounding agent, for example, CAB (cellulose acetate butyrate), NC (nitrocellulose) or the like may be contained in order to improve the drying property of the coating film, or a polymer polymerized from an acrylic acid or ester, or polyester can be contained in order to improve the gloss and the hardness of the coating film, and the application performance of the paint.

In the case of producing the polyurethane resin of the present invention as a two-part curing polyurethane resin, further, a known additive, such as color pigment, dye, ultraviolet absorber, curing accelerator, light stabilizer, and flatting agent, as a coating composition; or an oxyacid of phosphorus or its derivative, and a silane coupling agent which give improvement of adhesion for coatings as an adhesive composition can optionally be blended at an appropriate ratio.

Examples of the color pigment and dye include inorganic pigments such as carbon black and titanium oxide with good weather resistance; and organic pigments and dyes such as phthalocyanine blue, phthalocyanine green, quinacridone red, indanthrene orange, and isoindolinone yellow.

Examples of the ultraviolet absorber include ultraviolet absorbers of benzophenone type, benzotriazol type, triazine type, and cyanoacrylate type.

Examples of the curing accelerator include dibutyltin dilaurate.

Examples of the light stabilizer include a hindered amine light stabilizer, and more specifically, Adeka Stab LA62, Adeka Stab LA67 (trade names, hereinabove manufactured by Adeka Argus Chemical Co., Ltd.), Tinuvin 292, Tinuvin 144, Tinuvin 123, and Tinuvin 440 (trade names, hereinabove manufactured by Ciba Specialty Chemicals Inc.).

Examples of the flatting agent include superfine synthetic silica. When the flatting agent is blended, an elegant coating film having a semi-gloss and flat finish can be formed.

As for the oxyacid of phosphorus or its derivative, examples of the oxyacid of phosphorus include phosphoric acids such as phosphinic acid, phosphorous acid, orthophosphoric acid and hypophosphoric acid; and condensed phosphoric acids such as metaphosphoric acid, pyrophosphoric acid, tripoliphosphoric acid, polyphosphoric acid and ultraphosphoric acid.

Examples of the derivative thereof include salts such as sodium salts and potassium salts, of phosphoric acids or condensed phosphoric acids; monoesters such as monomethyl orthophosphate, monoethyl orthophosphate, monopropyl orthophosphate, monobutyl orthophosphate, mono-2-ethylhexyl orthophosphate, monophenyl orthophosphorate, monomethyl phosphite, monoethyl phosphite, monopropyl phosphite, monobutyl phosphite, mono-2-ethylhexyl phosphite and monophenyl phosphite; di- and triesters such as di-2-ethylhexyl orthophosphate, diphenyl orthophosphate, trimethyl orthophosphate, triethyl orthophosphate, tripropyl orthophosphorate, tributyl orthophosphate, tri-2-ethylhexyl orthophosphate, triphenyl orthophosphate, dimethyl phosphite, diethyl phosphite, dipropyl phosphite, dibutyl phosphite, di-2-ethylhexyl phosphite, diphenyl phosphite, trimethyl phosphite, triethyl phosphite, tripropyl phosphite, tributyl phosphite, tri-2-ethylhexyl phosphite, and triphenyl phosphite; or mono-, di- and triesters obtained from condensed phosphoric acids and alcohols.

As for the oxyacid of phosphorus or its derivative, the above-mentioned various oxyacids of phosphorus or their derivatives can be used alone or in combination of two or more kinds. The oxyacid of phosphorus or its derivative is blended in a proportion of 0.001 to 3 parts by mass, or preferably 0.01 to 2.5 parts by mass, to 100 parts by mass of the total of the polyisocyanate component and the active hydrogen compound component.

The silane coupling agent is represented by, for example, structural formula of R—Si≡(X)$_3$ or R—Si≡(R') (X)$_2$, (wherein R represents an organic group having a vinyl, epoxy, amino, imino, isocyanate, or mercapto group; R' represents a lower alkyl group having 1 to 4 carbon atoms; and X represents a methoxy or ethoxy group, or chlorine atom).

Specific examples of the silane coupling agent include chlorosilanes such as vinyltrichlorosilane; epoxysilanes such as γ-glycidoxypropyltrimetoxysilane, γ-glycidoxypropyltriethoxysilane, β-(3,4-epoxycyclohexyl)ethyltrimethoxysilane and di(γ-glycidoxypropyl)dimethoxysilane; aminosilanes such as N—β-(aminoethyl)-γ-aminopropyltrimethoxysilane, γ-aminopropyltriethoxysilane, N-β-(aminoethyl)-γ-propylmethyl dimethoxysilane, n-(dimethoxymethylsilylpropyl)ethylenediamine, n-(triethoxysilylpropyl)ethylenediamine and N-phenyl-γ-aminopropyltrimethoxysilane; vinyl silanes such as vinyltriethoxysilane; and isocyanato silanes such as γ-isocyanatopropyltrimethoxysilane and γ-isocyanatopropyltriethoxysilane.

As for the silane coupling agent, the above-mentioned various silane coupling agents can be used alone or in combination of two or more kinds. The silane coupling agent is blended in a proportion of 0.001 to 10 parts by mass, or preferably 0.01 to 5 parts by mass, to 100 parts by mass of the total of the polyisocyanate component and the active hydrogen compound component.

These functional compounding agents and additives may be preliminarily blended with the polyisocyanate component and/or the active hydrogen compound component, or can also be blended with the two-part curing polyurethane resin after blending of the polyisocyanate component and the active hydrogen compound component.

In the case of producing the polyurethane resin of the present invention as a two-part curing polyurethane resin, the polyisocyanate component and the active hydrogen compound component are blended at the time of use, to prepare a two-part curing polyurethane resin, and the two-part curing polyurethane resin is applied to an article to be coated or adhered.

The polyisocyanate component and the active hydrogen compound component are blended at such a ratio that the equivalent ratio (NCO/active hydrogen group) of the isocyanate group in the polyisocyanate component to the active hydrogen group in the active hydrogen compound component is in the range of, for example, 0.5 to 1.5, or preferably 0.8 to 1.2.

The polyurethane resin of the present invention thus produced as the two-part curing polyurethane resin can produce a coating film capable of drying to be cured in a short drying time, excellent in coating properties such as coating hardness and tensile strength, and further having excellent solvent resistance, weather resistance, and impact resistance.

The two-part curing polyurethane resin can be coated over the article to be coated or adhered by any coating method such as spray coating, air spray coating, brush coating, dip coating, a roll coater method, and a flow coater method, without particular limitation.

The article to be coated is not particularly limited, and examples thereof include inorganic substances such as concrete, natural stone, and glass; metals such as iron, stainless steel, aluminum, copper, brass, and titanium; and organic substances such as plastic, rubber, adhesive, and wood. In particular, the two-part curing polyurethane resin is suitable for re-coating of surfaces of already-formed coating films. It is also suitable for coating of a fiber reinforcement plastic (FRP) which is an organic/inorganic composite, a concrete polymer composite, a fiber-reinforced concrete, or the like.

The article to be adhered is not particularly limited, and examples thereof include various building materials and various laminated films.

More specifically, the two-part curing polyurethane resin is suitable for transportation equipments such as an automobile, an electric train, an airplane; civil engineering components such as a bridge component and a steel tower; industrial equipments such as a water-proof sheet, a tank, and a pipe; building components such as an exterior of a building, a door, a window material, a monument, and a pole; road components such as a center divider, a guardrail, and a sound insulating wall; communication equipments; or electric or electronic components.

Next, the case of producing the polyurethane resin of the present invention in the form of a polyurethane foam will be explained.

The polyurethane resin of the present invention produced in the form of a polyurethane foam is produced from a raw material containing the polyisocyanate component, the active hydrogen compound component, a foaming agent, and an urethanizing catalyst.

In the case of producing the polyurethane resin of the present invention in the form of a polyurethane foam, for example, 1,4-bis(isocyanatomethyl)cyclohexane containing not less than 80% by mole of trans isomers is used alone as the above-mentioned polyisocyanate component.

In the case of producing the polyurethane resin of the present invention in the form of a polyurethane foam, the above-mentioned active hydrogen compound component that may be used include, for example, the above-mentioned polyol components.

As the active hydrogen compound component, the above-mentioned high-molecular-weight polyols are preferable, or polyether polyols are more preferable.

In the case of producing the polyurethane resin of the present invention in the form of a polyurethane foam, the high-molecular-weight polyol has a hydroxyl value of, for example, 10 to 120 mg KOH/g, preferably 20 to 10 mg KOH/g, or more preferably 20 to 80 mg KOH/g, and a number average molecular weight of, for example, 400 to 20000.

When the hydroxyl value is within the above range, the polyurethane foam can achieve an improved impact resilience and a low permanent compression set.

The high-molecular-weight polyol has an average functionality of preferably about 2 to 6 from the view point of mechanical properties.

In addition, since the high-molecular-weight polyol has a low reactivity with bis(isocyanatomethyl)cyclohexane as compared to reactivity with aromatic diisocyanate, a primary hydroxyl group is preferably contained in the end of the molecule in order to improve the impact resilience of the polyurethane foam. In such case, the ratio of the primary hydroxyl group to all the hydroxyl groups at the end of the molecule (primary hydroxyl group ratio at the molecular end) is, for example, not less than 40% by mole, preferably, not less than 50% by mole, or more preferably not less than 60% by mole. The primary hydroxyl group ratio at the molecular end can be determined by $^1$H-NMR measurement.

Further, the high-molecular-weight polyol is prepared preferably in liquid state at room temperature in order to improve the mixing properties with the polyisocyanate component.

As the active hydrogen compound component, if necessary, for example, the above-mentioned low-molecular-weight polyol, polythiol component, polyamine component, monol and/or monoamine can further be blended at an appropriate ratio. When a low-molecular-weight polyol and a polyamine component are used in combination as the active hydrogen compound component, the low-molecular-weight polyol and/or the polyamine component is/are blended as crosslinking agent(s) in order to improve the impact resilience of the polyurethane foam.

The crosslinking agents can be used alone or in combination of two or more kinds. The amount of the crosslinking agent blended is in the range of, for example, 0.5 to 10 parts by mass, or preferably 1 to 7 parts by mass, per 100 parts by mass of the high-molecular-weight polyol.

As the foaming agent, for example, a chemical foaming agent and a physical foaming agent may be used. Examples of the chemical foaming agent include water, which generates carbon dioxide by allowing to react with a polyisocyanate component. The amount of the chemical foaming agent is in the range of, for example, 0.1 to 6 parts by mass, preferably 0.5 to 5 parts by mass, or more preferably 0.5 to 4 parts by mass, per 100 parts by mass of the high-molecular-weight polyol.

Examples of the physical foaming agent include methylene chlorides, chlorofluorocarbons, hydroxy chlorofluorocarbons (HCFC-134a etc.), hydrocarbons (cyclopentane, etc.), carbon dioxide, liquefied carbon dioxide, supercritical (carbon dioxide) gas, HFCs (hydrofluorocarbons), organic foaming agents (organic foaming agents having a decomposition temperature of 60 to 130° C., including, for example, azo compounds such as diazoaminobenzene, ethyl diazoacetate, diazoacetic acidamide, and azodicarbonamide; and sulfonyl-hydrazide compounds such as benzene sulphonyl hydrazide and p-toluene sulfonyl hydrazide), and inorganic foaming agents (inorganic foaming agents having a decomposition temperature of 60 to 130° C., including, for example, ammonium carbonate, ammonium hydrogencarbonate, sodium hydrogencarbonate, phosphorous acid ammonium, etc.).

These physical foaming agents can be used alone or in combination of two or more kinds. The amount of the physical foaming agent is in the range of, for example, 0.1 to 4 parts by mass, or preferably 0.1 to 3 parts by mass, per 100 parts by mass of the high-molecular-weight polyol.

The density of the polyurethane foam can be controlled according to the blending amount of the foaming agent.

As the urethanizing catalyst, the above-mentioned known urethanizing catalysts may be used. Preferably, amines and potassium salts are used in combination. The amount of the urethanizing catalyst is in the range of, for example, 0.01 to 3 parts by mass, or preferably 0.02 to 1.5 parts by mass, per 100 parts by mass of the high-molecular-weight polyol.

In the case of producing the polyurethane resin of the present invention in the form of a polyurethane foam, as a raw material, a foam stabilizer or other additives can further optionally be blended at an appropriate ratio.

Examples of the foam stabilizer include silicone-based foam stabilizers such as a siloxane-oxyalkylene block copolymer. Specific examples thereof include products manufactured by MOMENTIVE, trade names: L-580, L-590, L-620, L-680, L-682, L-690, SC-154, SC-155, SC-240, L-598, L-2100, L-2171, SH-210, L-2114, SE-232, L-533, L-534, L-539, M-6682B, L-626, L-627, L-3001, L-3111, L-3415, L-3002, L-3010, L-3222, L-3416, L-3003, L-3333, L-3417, L-2171, L-3620, L-3630, L-3640, L-3170, L-3360, L-3350, L-3555, L-3167, L-3150, L-3151, L-5309, SH-209, and L-3184.

Further examples thereof include products manufactured by Dow Corning Toray Co., Ltd., trade names: SF-2964, SF-2962, SF-2969, SF-2971, SF-2902L, SF-2904, SF-2908, SF=2909, SRX-274C, SZ-1328, SZ-1329, SZ-1330, SZ-1336, SZ=1346, SZ-3601, SRX-294A, SRX-280A, SRX-298, SH-190, SH-192, and SH-194.

Further, examples thereof include products manufactured by Shin-Etsu Chemical Co., Ltd., trade names: F-327, F-345, F-305, and F-242T; and products manufactured by BYK Chemie, trade names: Silbyk 9700, Silbyk 9705, and Silbyk 9710.

These foam stabilizers can be used alone or in combination of two or more kinds. The amount of the foam stabilizer is in the range of, for example, 0.1 to 3 parts by mass, or preferably 0.2 to 1.5 parts by mass, per 100 parts by mass of the high-molecular-weight polyol.

Examples of other additives include the above-mentioned antioxidant (antioxidant used in the case of producing the polyurethane resin of the present invention as a polyurethane resin for elastic molding), the above-mentioned light-resistant stabilizer (light-resistant stabilizer used in the case of producing the polyurethane resin of the present invention as a polyurethane resin for elastic molding), and the above-mentioned multifunctional stabilizer (multifunctional stabilizer used in the case of producing the polyurethane resin of the present invention as a polyurethane resin for RIM).

In the case of producing the polyurethane resin of the present invention in the form of a polyurethane foam, the method for producing a polyurethane foam is not particularly limited, and a known foaming method can be used.

For example, as a raw material, a component (i.e., an active hydrogen compound component, a foaming agent and an urethanizing catalyst as essential components, and a crosslinking agent, a foam stabilizer, and an additive as optional components) other than the polyisocyanate component is preliminarily blended to prepare a resin premix. Subsequently, the polyisocyanate component and the resin premix are blended to perform foam molding. Known methods such as a slab foaming process and a mold foaming process may be used for foam molding.

Alternatively, the above-mentioned various components (i.e., an active hydrogen compound component, a foaming agent and an urethanizing catalyst as essential components, and a crosslinking agent, a foam stabilizer, and an additive as optional components) can be blended, for example, with the resin premix not preliminarily but immediately before foaming.

As the blending proportion of the polyisocyanate component and the resin premix, the index (INDEX), which is represented by the molar ratio of the isocyanate group in the polyisocyanate component to the active hydrogen group in the active hydrogen compound component in terms of percentage, is in the range of, for example, 70 to 180, preferably 80 to 150, or more preferably 85 to 130.

In the above-mentioned production, a mechanical froth foaming process can also be used. The mechanical froth foaming process is performed in the following manner. First, air is blown into the resin premix to whip, and uniform microbubbles are formed in the resin premix (air loading). Subsequently, polyisocyanate is mixed therein and react to be cured at a temperature of 60 to 130° C.

The slab foaming process produces molded articles, for example, for clothing, sanitary, or the like. Specifically, first, the polyurethane foam is molded by a slab foaming process and thereafter, cut into a predetermined size. Then, the cut molded foam is placed in a mold and thermoformed so as to have an intended shape, to thereby produce a molded article. As the thermoforming conditions, for example, the foam is heated at a temperature of 180 to 220° C. for several dozen seconds to several minutes.

On the other hand, the mold foaming process produces molded articles for shoes, body pressure distribution, or the like. Specifically, first, a reaction solution mixed with a resin premix and a polyisocyanate component is injected into a desired shaped mold in which the temperature is preliminarily adjusted to, for example, 40 to 70° C. Subsequently, the reaction solution is foamed in the mold to produce a polyurethane foam. Then, an intended molded article is produced through the subsequent steps such as coating and adhesion.

As a result of the above process, the polyurethane resin of the present invention can be obtained as, for example, a soft, semihard, hard, or finely foamed polyurethane foam (having a density of, for example, 10 to 200 kg/m$^3$, preferably 20 to 80 kg/m$^3$, or more preferably 25 to 70 kg/m$^3$).

The polyurethane resin of the present invention thus produced in the form of a polyurethane foam can complete foaming in a short period of time (the time from start to end of foaming is short), has low shrinkage, and is excellent in retention of impact resilience. Further, even if the history of heat or ultraviolet light is given, such polyurethane resin has less change in hue, and is also excellent in cushioning properties and yellowing resistance.

Therefore, the polyurethane resin of the present invention thus produced in the form of a polyurethane foam can be used in wide applications such as furniture articles such as mattress and sofas; clothing articles such as brassieres and shoulder pads; shoes articles such as soles; further, body pressure distribution articles such as pads and cushions for vehicles; heat resisting materials for electric refrigerators or buildings; fillers, and vehicles articles such as vehicle handles.

EXAMPLES

While in the following, the present invention is described with reference to Preparation Examples, Synthesis Examples, Examples, and Comparative Examples, the present invention is not limited to any of them. In the following description, the units "part(s)" and "%" are by mass, unless otherwise noted. Measuring methods used in Synthesis Examples are shown below.

1) Preparation of
1,4-Bis(isocyanatomethyl)cyclohexane (Determination of Hydrolyzable Chlorine Concentration of Polyisocyanate)

The concentration of the hydrolyzable chlorine contained in each 1,4-bis(isocyanatomethyl)cyclohexane (hereinafter abbreviated as HC) is determined according to the testing method for hydrolyzable chlorine described in Appendix 3, JIS K-1556 (2000).

Preparation Example 1

Preparation Method of
1,4-Bis(Isocyanatomethyl)Cyclohexane 1
(Hereinafter Referred to as 1,4-BIC1)

As a raw material, 1,4-bis(aminomethyl)cyclohexane (manufactured by Mitsubishi Gas Chemical Company, Inc.) having a trans/cis ratio of 93/7 determined by $^{13}$C-NMR was used to perform cold/hot two-stage phosgenation method under pressure.

A pressurizing reactor with a jacket equipped with an electromagnetic induction stirrer, an automatic pressure control valve, a thermometer, a nitrogen inlet line, a phosgene inlet line, a condenser and a material feed pump was charged with 2500 parts by mass of ortho dichlorobenzene. Then, 1425 parts by mass of phosgene was added thereto through the phosgene inlet line and stirring was started. Cold water was flowed through the jacket of the reactor to maintain the inner temperature at about 10° C. A solution prepared by dissolving 400 parts by mass of 1,4-bis(aminomethyl)cyclohexane in 2500 parts by mass of ortho dichlorobenzene was fed with the feed pump for cold phosgenation at 30° C. or less under an atmospheric pressure over 60 minutes. After completion of phosgene feeding, a pale-brown slurry was formed in the flask.

Subsequently, the inside of the reactor was pressurized at 0.25 MPa while the temperature was increased to 140° C. in 60 minutes, followed by hot-phosgenation under a pressure of 0.25 MPa at a reaction temperature of 140° C. for 2 hours. During the hot-phosgenation reaction, 480 pats by mass of phosgene was replenished. The liquid in the flask was turned into a pale-brown transparent liquid during the hot-phosgenation reaction. After completion of the hot-phosgenation reaction, nitrogen gas was introduced at 100 to 140° C. with a flow rate of 100 L/hour for degassing.

Next, the o-dichlorobenzene solvent was distilled off under reduced pressure, and thereafter, using a distillation tube filled with four elements of packing (manufactured by Sumitomo Heavy Industries Ltd., trade name: Sumitomo/Sulzer Labo Packing EX), a distillation column equipped with a reflux ratio control timer (manufactured by Sibata Scientific Technology Ltd., trade name: distillation column K type), and a rectifying column equipped with a condenser, the remainder was further rectified with refluxing in a glass flask under the conditions of 138 to 143° C. and 0.7 to 1 KPa, to produce 382 parts by mass of 1,4-BIC1.

The resulting 1,4-BIC1 had a purity, which was determined by gas chromatography, of 99.9%, a hue of 5 in APHA, and a trans/cis ratio, which was determined by $^{13}$C-NMR, of 93/7. It contained 19 ppm of hydrolyzable chlorine (HC).

Preparation Example 2

Preparation Method of
1,4-Bis(Isocyanatomethyl)Cyclohexane 2
(Hereinafter Referred to as 1,4-BIC2)

As a raw material, 1,4-bis(aminomethyl)cyclohexane (manufactured by Tokyo Chemical Industry Co., Ltd.) having a trans/cis ratio of 41/59 determined by $^{13}$C-NMR was used in the same manner as the 1,4-BIC1 to produce 388 parts by mass of 1,4-BIC2.

The resulting 1,4-BIC2 had a purity, determined by gas chromatography, of 99.9%, a hue of 5 in APHA, and a trans/cis ratio, determined by $^{13}$C-NMR, of 41/59. It contained 22 ppm of HC.

Preparation Example 3

Preparation Method of
1,4-Bis(Isocyanatomethyl)Cyclohexane 3
(Hereinafter Referred to as 1,4-BIC3)

A four-neck flask equipped with a stirrer, a thermometer, a reflux condenser, and a nitrogen inlet tube was charged with 865 parts by mass of 1,4-BIC1 of Preparation Example 1 and 135 parts by mass of 1,4-BIC2 of Preparation Example 2, and the mixture was stirred at room temperature for 1 hour under a nitrogen atmosphere. The resulting 1,4-BIC3 had a purity, determined by gas chromatography, of 99.9%, a hue of 5 in APHA, and a trans/cis ratio, determined by $^{13}$C-NMR, of 86/14. It contained 19 ppm of HC.

Preparation Example 4

Preparation Method of
1,4-Bis(Isocyanatomethyl)Cyclohexane 4
(Hereinafter Referred to as 1,4-BIC4)

The same operation as in Preparation Example 3 was performed to produce 1,4-BIC4, except that 769 parts by mass of 1,4-BIC1 of Preparation Example 1 and 231 parts by mass of 1,4-BIC2 of Preparation Example 2 were used. The resulting 1,4-BIC4 had a purity, determined by gas chromatography, of 99.9%, a hue of 5 in APHA, and a trans/cis ratio, determined by $^{13}$C-NMR, of 81/19. It contained 20 ppm of HC.

Preparation Example 5

Preparation Method of
1,4-Bis(Isocyanatomethyl)Cyclohexane 5
(Hereinafter Referred to as 1,4-BIC5)

The same operation as in Preparation Example 3 was performed to produce 1,4-BIC5, except that 692 parts by mass of 1,4-BIC1 of Preparation Example 1 and 308 parts by mass of 1,4-BIC2 of Preparation Example 2 were used. The resulting 1,4-BIC5 had a purity, determined by gas chromatography, of 99.9%, a hue of 5 in APHA, and a trans/cis ratio, determined by $^{13}$C-NMR, of 77/23. It contained 20 ppm of HC.

Preparation Example 6

Preparation Method of
1,4-Bis(Isocyanatomethyl)Cyclohexane 6
(Hereinafter Referred to as 1,4-BIC6)

The same operation as in Preparation Example 3 was performed to produce 1,4-BIC6, except that 173 parts by mass of 1,4-BIC1 of Preparation Example 1 and 827 parts by mass of 1,4-BIC2 of Preparation Example 2 were used. The resulting 1,4-BIC6 had a purity, determined by gas chromatography, of 99.9%, a hue of 5 in APHA, and a trans/cis ratio, determined by $^{13}$C-NMR, of 50/50. It contained 21 ppm of HC.

Preparation Example 7

Preparation Method of
1,4-Bis(Isocyanatomethyl)Cyclohexane 7
(Hereinafter Referred to as 1,4-BIC7)

The same operation as in Preparation Example 3 was performed to produce 1,4-BIC7, except that 577 parts by mass of 1,4-BIC1 of Preparation Example 1 and 423 parts by mass of 1,4-BIC2 of Preparation Example 2 were used. The resulting 1,4-BIC7 had a purity, determined by gas chromatography, of 99.9%, a hue of 5 in APHA, and a trans/cis ratio, determined by $^{13}$C-NMR, of 71/29. It contained 21 ppm of HC.

2) Synthesis and Evaluation of Elastomer (Isocyanate Group Content of Isocyanate Group-Terminated Prepolymer Solution/Unit: % by Mass)

The isocyanate group content of the isocyanate group-terminated prepolymer solution was determined by n-dibutyl amine titration method according to JIS K-1556, using a potentiometric titrator.

Synthesis Example 1

Synthesis of Prepolymer (A)

A four-neck flask equipped with a stirrer, a thermometer, a reflux condenser, and a nitrogen inlet tube was charged with 230.8 parts by mass of 1,4-BIC1 of Preparation Example 1 and 1000 parts by mass of adipate polyester polyol (trade name: Takelac U-2024, manufactured by Mitsui Chemicals Polyurethanes, Inc., abbreviated as U-2024) having a number average molecular weight of 2000. The mixture was allowed to react at 80° C. under a nitrogen atmosphere until the isocyanate group content was 4.70% by mass, to produce an isocyanate group-terminated prepolymer (A) (hereinafter abbreviated as a prepolymer (A)).

Synthesis Example 2

Synthesis of Prepolymer (B)

A prepolymer (B) was produced by the same blending formulation and operation as in Synthesis Example 1 except that 230.8 parts by mass of 1,4-BIC3 of Preparation Example 3.

Synthesis Example 3

Synthesis of Prepolymer (C)

A prepolymer (C) was produced by the same blending formulation and operation as in Synthesis Example 1 except that 230.8 parts by mass of 1,4-BIC4 of Preparation Example 4.

Synthesis Example 4

Synthesis of Prepolymer (D)

A prepolymer (D) was produced by the same blending formulation and operation as in Synthesis Example 1 except that 197.6 parts by mass of 1,4-BIC4 of Preparation Example 4 and 30.2 parts by mass of hexamethylene diisocyanate (HDI, trade name: TAKENATE T-700, manufactured by Mitsui Chemicals Polyurethanes, Inc.) were used to react until the isocyanate group content was 4.77% by mass.

Synthesis Example 5

Synthesis of Prepolymer (E)

A prepolymer (E) was produced by the same blending formulation and operation as in Synthesis Example 1 except that 230.8 parts by mass of 1,4-BIC5 of Preparation Example 5.

Synthesis Example 6

Synthesis of Prepolymer (F)

A prepolymer (F) was produced by the same blending formulation and operation as in Synthesis Example 1 except that 230.8 parts by mass of 1,4-BIC6 of Preparation Example 6.

Synthesis Example 7

Synthesis of Prepolymer (G)

A prepolymer (G) was produced by the same blending formulation and operation as in Synthesis Example 1 except that 230.8 parts by mass of 1,4-BIC2 of Preparation Example 2.

The formulation of these prepolymers are shown in Table 1.

TABLE 1

|  |  | Synthesis Example 1 | Synthesis Example 2 | Synthesis Example 3 | Synthesis Example 4 | Synthesis Example 5 | Synthesis Example 6 | Synthesis Example 7 |
|---|---|---|---|---|---|---|---|---|
| Prepolymer |  | A | B | C | D | E | F | G |
| Polyisocyanate | 1,4-BIC1 | 230.8 | — | — | — | — | — | — |
| (part by mass) | 1,4-BIC2 | — | — | — | — | — | — | 230.8 |
|  | 1,4-BIC3 | — | 230.8 | — | — | — | — | — |
|  | 1,4-BIC4 | — | — | 230.8 | 197.6 | — | — | — |
|  | 1,4-BIC5 | — | — | — | — | 230.8 | — | — |
|  | 1,4-BIC6 | — | — | — | — | — | 230.8 | — |
|  | HDI | — | — | — | 30.2 | — | — | — |
|  | Trans Ratio (mol %) | 93 | 86 | 81 | 81 | 77 | 50 | 41 |
| Polyol (part by mass) | U-2024 | 1000 | 1000 | 1000 | 1000 | 1000 | 1000 | 1000 |

Example 1

Synthesis of Elastomer (A)

A stainless steel container was filled with 1230.8 parts by mass of the prepolymer (A) preliminarily adjusted to 80° C., 3.9 parts by mass of a heat-resistant stabilizer (trade name: IRGANOX 1135, manufactured by Ciba Specialty Chemicals K. K.), and 0.32 parts by mass of a solution having 4% by mass of a catalyst (tin octylate, trade name: Stanoct, manufactured by API Corporation) diluted using diisononyl adipate (trade name: DINA, manufactured by J-PLUS Co., Ltd.), and using a three-one motor (trade name: HEIDON FBL3000, manufactured by Shinto Scientific Co., Ltd.), the mixture was mixed with stirring at 600 rpm for about 1 minute. Subsequently, 61.4 parts by mass of 1,4-butanediol (manufactured by Wako Pure Chemicals Industries, Ltd., abbreviated as 1,4-BD) preliminarily adjusted to 80° C. as a chain extender was added. The mixture was fully stirred for about another 2 minutes until it was thoroughly uniform, and thereafter, vacuum defoaming was immediately performed to defoam the mixed solution. While care was taken not to enter the foam into a sheet, a block, and a button mold which were preliminarily coated with a releasing agent (trade name: MIRAX RS-102, manufactured by Miyoshi Oil & Fat Co., Ltd.) and were temperature-controlled to 100° C., the mixed solution was injected thereinto and allowed to react at 100° C. for 22 hours. Thereafter, an elastomer (A) was removed from the mold, and its hardness was determined in 4 hours under constant temperature and humidity conditions of a room temperature of 23° C. and 50% relative humidity. The elastomer (A) was further aged for 7 days, and thereafter, the physical properties thereof was measured.

Example 2

Synthesis of Elastomer (B)

An elastomer (B) was produced by the same blending formulation and operation as in Example 1 except that 1230.8 parts by mass of the prepolymer (B) was used in place of the prepolymer (A).

Example 3

Synthesis of Elastomer (C)

An elastomer (C) was produced by the same blending formulation and operation as in Example 1 except that 1230.8 parts by mass of the prepolymer (C) was used in place of the prepolymer (A).

Example 4

Synthesis of Elastomer (D)

An elastomer (D) was produced by the same blending formulation and operation as in Example 1 except that 1227.8 parts by mass of the prepolymer (D) and 62.2 parts by mass of 1,4-butanediol were used in place of the prepolymer (A).

Comparative Example 1

Synthesis of Elastomer (E)

An elastomer (E) was produced by the same blending formulation and operation as in Example 1 except that 1230.8 parts by mass of the prepolymer (E) was used in place of the prepolymer (A).

Comparative Example 2

Synthesis of Elastomer (F)

An elastomer (F) was produced by the same blending formulation and operation as in Example 1 except that 1230.8 parts by mass of the prepolymer (F) was used in place of the prepolymer (A).

Comparative Example 3

Synthesis of Elastomer (G)

An elastomer (G) was produced by the same blending formulation and operation as in Example 1 except that 1230.8 parts by mass of the prepolymer (G) was used in place of the prepolymer (A).

Evaluation

As for the elastomers obtained in those Examples and Comparative Examples (hereinafter abbreviated as each elastomer), the hardness, hardness development, permanent compression set, tensile strength, softening temperature, and aggregation temperature of hard segment determined using DSC were determined by the following methods. The results are shown in Table 2.

<Hardness: Shore A>

The Shore A hardness was measured according to "JIS K-7311 Testing methods for thermoplastic polyurethane elastomers", and the results were numerically expressed.

<Hardness Development>

Each elastomer was removed from the mold and then allowed to stand under normal conditions for 4 hours. The hardness measurement was immediately performed and the result was set to a value (A) on the 0th day. Further, the hardness (B) after seven days was determined. Using these values, a value of hardness development was obtained by the following equation:

Hardness development=$(B-A)/7$

The smaller the value became, the less the hardness changed after mold release, resulting in excellent hardness development.

<Permanent Compression Set (Unit: %)>

According to "JIS K-6262 Rubber, vulcanized or thermoplastic-Determination of compression set at ambient, elevated or low temperatures", the permanent compression set was determined using a large-sized test piece at a temperature of 23° C., a test piece compression ratio of 25% for a retention time of 22 hours.

1.0 mm with a load of 0.49 N at a heating rate of 5° C./min in a nitrogen N2 atmosphere was used.

<Aggregation Temperature of Hard Segment Determined Using DSC (Unit: ° C.)>

The aggregation temperature was determined using a differential scanning calorimeter (manufactured by SII Nano-Technology Inc., trade name: EXSTAR6000PC station and DSC220C). About 8 mg of polyurethane was sampled by thinly cutting it so that the cut piece had a shape capable of contacting an aluminum pan as close as possible. A piece obtained by covering the aluminum pan and crimping it was used as a test sample. Similarly, a sampled alumina piece was used as a reference sample. The test sample and the reference sample was placed on the predetermined position in a cell, thereafter cooled to −90° C. at a rate of 10° C./min under a nitrogen flow at a flow rate of 40 NmL/min, and maintained at the same temperature for 5 minutes. Subsequently, the temperature was increased to 270° C. at a rate of 10° C./min. Both the samples were further maintained at 270° C. for 5 minutes and then cooled to −70° C. at a rate of 10° C./min. The temperature at the exothermic peak which appears during the cooling process was defined as an aggregation temperature of the hard segment. The DSC measurement results in Example 3 and Comparative Example 1 are shown in FIG. 1. In FIG. 1, the aggregation temperature of the hard segment was indicated by the arrow.

TABLE 2

|  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Polyurethane |  | A | B | C | D | E | F | G |
| Prepolymer (part by mass) |  | A 1230.8 | B 1230.8 | C 1230.8 | D 1227.8 | E 1230.8 | F 1230.8 | G 1230.8 |
| Chain Extender (part by mass) | 1,4-BD | 61.4 | 61.4 | 61.4 | 62.2 | 61.4 | 61.4 | 61.4 |
| Heat-Resistant Stabilizer (part by mass) | IRGANOX 1135 | 3.9 | 3.9 | 3.9 | 3.9 | 3.9 | 3.9 | 3.9 |
| Catalyst (part by mass) | 4% Tin Octylate | 0.32 | 0.32 | 0.32 | 0.32 | 0.32 | 0.32 | 0.32 |
| Evaluation of Physical Properties | Hardness (Shore A) | 93 | 92 | 90 | 90 | 87 | 81 | 76 |
|  | Hardness Development | 0.14 | 0.18 | 0.37 | 0.38 | 0.69 | 1.14 | 1.86 |
|  | Permanent Compression Set (%) | 15.0 | 15.1 | 15.2 | 15.5 | 16.9 | 17.3 | 17.8 |
|  | Tensile Strength (Gpa) | 10.9 | 11.7 | 11.5 | 11.1 | 8.71 | 8.36 | 5.77 |
|  | Softening Temperature (° C.) | 164.5 | 162.3 | 160.2 | 159.1 | 150.1 | 137.2 | 134.2 |
|  | Aggregation Temperature of Hard Segment | 76.3 | 68.2 | 60.8 | 58.7 | 40.9 | n.d. | n.d. |

<Tensile Strength (Unit: GPa)>

A tensile test was conducted using a sheet obtained according to the method described in "JIS K-7311 Testing methods for thermoplastic polyurethane elastomers". The test piece was stamped out with a JIS-No. 3 dumbbell, and the tensile strength was determined using a tensile strength testing machine (manufactured by Toyo Seiki Seisaku-sho, Ltd., trade name: full-automatic rubber tension tester, TYPE:AE-CT) on the conditions of a gauge length of 20 mm and a tensile speed of 300 mm/min. The area (integrated value) of the stress under the obtained stress-strain curve to the break point was determined as a tensile strength.

<Softening Temperature (Unit: ° C.)>

The softening temperature was determined using a device manufactured by Seiko Instruments Inc., trade name: TMA/SS6000, according to "JIS K-7196 Testing method for softening temperature of thermoplastic film and sheeting by thermomechanical analysis". An indenter having a diameter of 3) Synthesis and Evaluation of Optical Polyurethane Resin (Lens)

a) When the Active Hydrogen Compound Component is a Polyol Component

Synthesis Example 1

Synthesis of Prepolymer (A)

To a reactor equipped with a stirrer, a thermometer, a condenser tube, and a nitrogen introducing tube were added 100 parts by mass of polyether polyol (initiator: trimethylolpropane, trade name: Actcol T-880, manufactured by Mitsui Chemicals Polyurethanes, Inc.) preliminarily dehydrated by heating under reduced pressure, having an average hydroxyl value of 869 mg KOH/g and an average functionality of 3 and 505.1 parts by mass of 1,4-BIC3, and the mixture was then allowed to react at 90° C. for 3 hours under a nitrogen atmosphere, to thereby produce an isocyanate group-terminated prepolymer (A) (hereinafter abbreviated as prepolymer (A)) having an NCO content of 25.4% by mass.

Synthesis Example 2

Synthesis of Prepolymer (B)

A prepolymer (B) was produced by the same blending formulation and operation as in Synthesis Example 1 except that 1,4-BIC4 was used in place of 1,4-BIC3.

Synthesis Example 3

Synthesis of Prepolymer (C)

A prepolymer (C) was produced by the same blending formulation and operation as in Synthesis Example 1 except that 1,4-BIC7 was used in place of 1,4-BIC3.

Example 1

Synthesis of Optical Polyurethane Resin (A)

The prepolymer (A) in an amount such that the equivalent ratio (NCO/hydroxyl group) of the isocyanate group in the prepolymer (A) to the hydroxyl group in the above-mentioned polyether polyol was 1.00 was added to the above-mentioned polyether polyol (Actcol T-880) under a nitrogen atmosphere, and the mixture was stirred at 23° C. for 3 minutes. Thereafter, the stirred mixture was vacuum defoamed with stirring for about 1 hour to obtain a reaction mixture.

Subsequently, the reaction mixture was injected into a mold preliminarily coated with a silicone-based releasing agent and warmed to 120° C., and a heat-curing reaction was conducted at 120° C. for 5 hours. Thereafter, an optical polyurethane resin (A) was removed from the mold under constant temperature and humidity conditions of 23° C. and 55% relative humidity, and the following evaluations was performed.

Example 2

Synthesis of Optical Polyurethane Resin (B)

An optical polyurethane resin (B) was produced by the same blending formulation and operation as in Example 1 except that the prepolymer (B) was used in place of the prepolymer (A).

Comparative Example 1

Synthesis of Optical Polyurethane Resin (C)

An optical polyurethane resin (C) was produced by the same blending formulation and operation as in Example 1 except that the prepolymer (C) was used in place of the prepolymer (A).

Evaluation

As for the optical polyurethane resins (A) to (C) obtained in those Examples and Comparative Example, the appearance, hardness, softening temperature difference, and storage modulus were determined by the following methods. The results are shown in Table 3.

<Appearance>

The appearance was visually observed. For observation of the appearance, a sample prepared in the following manner was used. A heat-curing reaction was conducted at 120° C. for 5 hours, the optical polyurethane resin was then removed from the mold at a constant temperature of 23° C. and a constant relative humidity of 55%, and the removed resin was allowed to stand for three days under the same conditions.

<Hardness: Shore D>

According to the hardness test of JIS K7312-1996, the hardness of the optical polyurethane resins (A) to (C) in Examples and Comparative Examples were determined. The same sample as that used in the <Appearance> step described above was used.

<Softening Temperature Difference (Unit: ° C.)>

The softening temperature was determined using a thermo mechanical analyzer (manufactured by Seiko Instruments Inc., trade name: TMA/SS6000) according to JIS K-7196 "Testing method for softening temperature of thermoplastic film and sheeting by thermomechanical analysis". An indenter having a diameter of 1.0 mm with a load of 0.49 N at a heating rate of 5° C./min in a nitrogen atmosphere was used. It should be noted that the softening temperature difference is as follows. After a heat-curing reaction was conducted at 120° C. for 5 hours as described in the above Examples and Comparative Example, and after about 12 hours at a constant temperature of 23° C. and a constant relative humidity of 55%, the optical polyurethane resins (A) to (C) each having a softening temperature (a/unit: ° C.) were obtained, and after three days under the above-mentioned constant temperature and humidity, the optical polyurethane resins (A) to (C) each having a softening temperature (b/unit: ° C.) were obtained. Therefore, the softening temperature difference refers to a difference (b−a/unit: ° C.) between the softening temperature (a/unit: ° C.) and the softening temperature (b/unit: ° C.).

<Storage Modulus at 170° C. (Unit: MPa)>

The temperature dependency of the storage modulus of the thermosetting polyurethane was measured using a dynamic viscoelasticity measuring device (manufactured by Rheometrics Far East Ltd., trade name: RSA-III). The same sample as the one used in the <Appearance> step described above was used. The storage modulus at 170° C. was determined on the conditions of a temperature from room temperature to 350° C., in an air atmosphere, a heating rate of 5° C./min and a measuring frequency of 1 Hz.

TABLE 3

| | | Ex. 1 | Ex. 2 | Comp. Ex. 1 |
|---|---|---|---|---|
| Optical Polyurethane Resin | | A | B | C |
| Prepolymer | | A | B | C |
| Trans Ratio of 1,4-BIC (mol %) | | 86 | 81 | 71 |
| Evaluation of Physical Properties | Appearance | Clear Colorless | Clear Colorless | Clear Colorless |
| | Hardness (Shore D) | 89 | 89 | 88 |
| | Softening Temperature Difference (° C.) | 2.2 | 2.8 | 6.8 |
| | Storage Modulus at 170° C. (MPa) | 21.6 | 19.4 | 11.2 | b) When the Active Hydrogen Compound Component is Polythiol

Example 1

Synthesis of Optical Polyurethane Resin (D)

1,4-BIC3 in an amount such that the equivalent ratio (NCO/thiol group) of the isocyanate group to the thiol group in the pentaerythritol tetrakis(3-mercaptopropionate) was 1.0 was added to pentaerythritol tetrakis(3-mercaptopropionate) (manufactured by Mitsui Chemicals, Inc.), to obtain a reaction mixture. Subsequently, 0.01 parts by mass of dimethyl tin dichloride was mixed to a total of 100 parts by mass of the reaction mixture without mixing air bubbles.

Next, the reaction mixture was fully defoamed and then injected into a glass mold which was subjected to mold release treatment. While the mold was gradually heated from 30° C. to 120° C. over 22 hours, polymerization was finally performed at 120° C. over 5 hours. After completion of the polymerization reaction, the mold was gradually cooled to room temperature, and one day later, an optical polyurethane resin (D) (thermosetting thiourethane) was removed from the mold. Subsequently, the optical polyurethane resin (D) was allowed to stand for five days at a constant temperature of 23° C. and a constant relative humidity of 55%, and the following evaluation was conducted.

Comparative Example 1

Synthesis of Optical Polyurethane Resin (E)

An optical polyurethane resin (E) was produced by the same blending formulation and operation as in Example 1 except that 1,4-BIC7 was used in place of 1,4-BIC3.
Evaluation As for the optical polyurethane resins (D) and (E) obtained in those Example and Comparative Example, the appearance, refractive index, impact resistance, and softening temperature difference were determined by the following methods. The results are shown in Table 4.
<Appearance>

The appearance was visually observed. For observation of the appearance, a sample prepared in the following manner was used. After completion of the polymerization reaction at 120° C. for 5 hours, the optical polyurethane resins (D) and (E) were removed from the mold at a constant temperature of 23° C. and a constant relative humidity of 55%, and the removed resins were allowed to stand for five days under the same conditions.
<Softening Temperature Difference (Unit: ° C.)>

The softening temperature was determined using a thermo mechanical analyzer (manufactured by Seiko Instruments Inc., trade name: TMA/SS6000) according to JIS K-7196 "Testing method for softening temperature of thermoplastic film and sheeting by thermomechanical analysis". An indenter having a diameter of 1.0 mm with a load of 0.49 N at a heating rate of 5° C./min in a nitrogen atmosphere was used. It should be noted that the softening temperature difference is as follows. After completion of the polymerization reaction at 120° C. for 5 hours as described in the above Example and Comparative Example, and after about 12 hours at a constant temperature of 23° C. and a constant relative humidity of 55%, the optical polyurethane resins (D) and (E) each having a softening temperature (a/unit: ° C.) were obtained, and after five days under the above-mentioned constant temperature and humidity, the optical polyurethane resins (D) and (E) each having a softening temperature (b/unit: ° C.) were obtained. Therefore, the softening temperature difference refers to a difference (b–a/unit: ° C.) between the softening temperature (a/unit: ° C.) and the softening temperature (b/unit: ° C.).
<Refractive Index>

The refractive index was determined at 20° C. using a Pulfrich refractometer.
<Impact Resistance (Falling Ball Test)>

A falling ball test was conducted according to the technique described in FDA standards (1972) regarding the impact on eyeglass lenses. Specifically, after a steel ball was dropped from a height of 127 cm on the optical polyurethane resins (D) and (E), the cured products were visually observed for change in appearance, and the impact resistance was evaluated according to the following criteria.

In the impact resistance test, a sample prepared in the following manner was used. After completion of the polymerization reaction at 120° C. for 5 hours, the optical polyurethane resins (D) and (E) were removed from the mold at a constant temperature of 23° C. and a constant relative humidity of 55%, and the removed resins were allowed to stand for five days under the same conditions.

Good: Although a steel ball weighing 642 g was dropped, no change was observed in the appearance of the cured product.

Poor: After a steel ball weighing 642 g was dropped, a crack in the cured product was observed.

TABLE 4

| | | Ex. 1 | Comp. Ex. 1 |
|---|---|---|---|
| Optical Polyurethane Resin | | D | E |
| Trans Ratio of 1,4-BIC (mol %) | | 86 | 71 |
| Evaluation of Physical Properties | Appearance | Clear Colorless | Clear Colorless |
| | Softening Temperature Difference (° C.) | 1.7 | 4.7 |
| | Refractive Index | 1.56 | 1.56 |
| | Impact Resistance | Good | Good |

4) Synthesis and Evaluation of Aqueous Polyurethane Resin and Film (Carboxyl Group Concentration of Isocyanate Group-Terminated Prepolymer/Unit: Mmol/g)

The hydrophilic group concentration of the isocyanate group-terminated prepolymer was determined by neutralization titration using a potentiometric titrator (manufactured by Hiranuma Sangyo Co., Ltd., model: COM-980).

Specifically, about 1.5 g of a prepolymer solution before adding TEA was weighed and dissolved in 40 ml of a toluene/ethanol mixed solvent (the volume ratio of toluene/ethanol was 2/1) preliminarily prepared. Then, a potentiometric titration using 0.1 mol/L ethanol-containing potassium hydroxide (titration reagent with a factor) was conducted to determine a carboxyl group concentration.

Since the measured sample was an acetonitrile solution of the prepolymer, it was corrected so as to have the mass of the prepolymer based on the amount of the charged solvent, and the carboxyl group concentration of the prepolymer was calculated from the actually measured value.

(Oxyethylene Group Concentration of Isocyanate Group-Terminated Prepolymer/Unit: % by Mass)

Dissolved in 5 mL of deuterated chloroform was 0.5 g of an isocyanate-terminated prepolymer. A given amount of tetrachloroethane dissolved in the deuterated chloroform was further added as an internal standard substance. The oxyethylene group concentration was determined by $^1$H-NMR (manufactured by JEOL, JNM-AL400) of this solution.

Preparation Example 1

Synthesis of Polyoxyethylene Side Chain-Containing Diol (A)

A four-neck flask equipped with a stirrer, a thermometer, a reflux tube and a nitrogen introducing tube was charged with 1000 parts by mass of methoxypolyethylene glycol (manufactured by TOHO Chemical Industry Co., Ltd.) having a number average molecular weight of 1000 and 1682 parts by mass of 1,6-hexamethylene diisocyanate (trade name: TAKENATE-700, manufactured by Mitsui Chemicals Polyurethanes, Inc.), and the mixture was allowed to react at 90° C. for 9 hours under a nitrogen atmosphere. The resulting reaction solution was subjected to thin-film distillation to remove unreacted 1,6-hexamethylene diisocyanate, so that a polyoxyethylene group-containing monoisocyanate was obtained. Next, a four-neck flask equipped with a stirrer, a thermometer, a reflux tube, and a nitrogen introducing tube was charged with 82.5 parts by mass of diethanolamine, and 917.5 parts by mass of the above-mentioned monoisocyanate was gradually added dropwise thereto with air-cooling under a nitrogen atmosphere so that the reaction temperature did not exceed 70° C. After completion of the dropwise addition, the mixture was stirred at 70° C. for about 1 hour under a nitrogen atmosphere, and it was then confirmed that the isocyanate group had disappeared, so that a polyoxyethylene side chain-containing diol (A) was obtained.

As a result of the measurement by $^1$H-NMR, the oxyethylene group concentration in the polyoxyethylene side chain-containing diol (A) was 76% by mass.

Synthesis Example 1

Synthesis of Prepolymer Solution (A)

A four-neck flask equipped with a stirrer, a thermometer, a reflux condenser, and a nitrogen inlet tube was charged with 265 parts by mass of 1,4-BIC3 and 1000 parts by mass of adipate polyester polyol (trade name: Takelac U-5620, manufactured by Mitsui Chemicals Polyurethanes, Inc., hereinafter abbreviated as U-5620) having a number average molecular weight of 2000, which was preliminarily heated to 110° C. and dried under reduced pressure, 1366 parts by mass of acetonitrile (hereinafter abbreviated as AN), and 59 parts by mass of dimethylol propionic acid (hereinafter abbreviated as DMPA) which was heated and dried under reduced pressure in the same manner as the polyester polyol, and the mixture was allowed to react at 75° C. for 8 hours under a nitrogen atmosphere. Thus, an isocyanate group-terminated prepolymer solution (hereinafter referred to as prepolymer solution) having an isocyanate group content of 1.10% by mass was obtained.

Subsequently, this reaction solution was cooled to 20° C., and 42 parts by mass of triethylamine (hereinafter abbreviated as TEA) was added thereto. That is, TEA was added so that the mixture has an equivalent weight of 0.95 with respect to the hydrophilic group (carboxyl group) in the isocyanate group-terminated prepolymer.

Thereafter, the added mixture was mixed with stirring at the same temperature for 30 minutes to thereby obtain an isocyanate group-terminated prepolymer (hereinafter abbreviated as prepolymer) solution (A) in which the carboxylic acid was neutralized with TEA. The details of the synthesis conditions and properties of the prepolymer solution (A) thus obtained are shown in Table 5.

In Table 5, "Equivalent Ratio of Isocyanate Group" refers to the equivalent ratio (NCO/hydroxyl group) of the isocyanate group in the polyisocyanate component to the hydroxyl group in the high-molecular-weight polyol and the hydrophilic group-containing active hydrogen compound.

Synthesis Example 2

Synthesis of Prepolymer Solution (B)

A prepolymer solution (B) having an isocyanate group content of 1.13% by mass was produced by the same operation as in Synthesis Example 1, except that 265 parts by mass of 1,4-BIC4 was used in place of 1,4-BIC3. The details of the synthesis conditions and properties of the prepolymer solution (B) thus obtained are shown in Table 5.

Synthesis Example 3

Synthesis of Prepolymer Solution (C)

A prepolymer solution (C) having an isocyanate group content of 1.16% by mass was produced by the same operation as in Synthesis Example 1, except that 265 parts by mass of 1,4-BIC7 was used in place of 1,4-BIC3. The details of the synthesis conditions and properties of the prepolymer solution (C) thus obtained are shown in Table 5.

Synthesis Example 4

Synthesis of Prepolymer Solution (D)

A four-neck flask equipped with a stirrer, a thermometer, a reflux condenser, and a nitrogen inlet tube was charged with 184 parts by mass of 1,4-BIC3, 1000 parts by mass of U-5620, which was preliminarily heated to 110° C. and dried under vacuum, 502 parts by mass of AN, 627 parts by mass of acetone, and 142 parts by mass of polyoxyethylene side chain-containing diol which was heated and dried under reduced pressure in the same manner as the polyester polyol, and the mixture was allowed to react at 75° C. for 7 hours under a nitrogen atmosphere. Thus, a prepolymer solution (D) having an isocyanate group content of 1.01% by mass was obtained. The details of the synthesis conditions and properties of the prepolymer solution (D) thus obtained are shown in Table 5.

Synthesis Example 5

Synthesis of Prepolymer Solution (E)

A prepolymer solution (E) having an isocyanate group content of 1.02% by mass was produced by the same operation as in Synthesis Example 4, except that 184 parts by mass of 1,4-BIC4 was used in place of 1,4-BIC3. The details of the synthesis conditions and properties of the prepolymer solution (E) thus obtained are shown in Table 5.

Synthesis Example 6

Synthesis of Prepolymer Solution (F)

A prepolymer solution (F) having an isocyanate group content of 1.02% by mass was produced by the same operation as in Synthesis Example 4, except that 184 parts by mass of 1,4-BIC7 was used in place of 1,4-BIC3. The details of the synthesis conditions and properties of the prepolymer solution (F) thus obtained are shown in Table 5.

TABLE 5

|  |  | Synthesis Example 1 | Synthesis Example 2 | Synthesis Example 3 | Synthesis Example 4 | Synthesis Example 5 | Synthesis Example 6 |
|---|---|---|---|---|---|---|---|
| Prepolymer Solution | | A | B | C | D | E | F |
| Polyisocyanate (part by mass) | 1,4-BIC3 | 265 | — | — | 184 | — | — |
| | 1,4-BIC4 | — | 265 | — | — | 184 | — |
| | 1,4-BIC7 | — | — | 265 | — | — | 184 |
| | Trans Ratio (mol %) | 86 | 81 | 71 | 86 | 81 | 71 |
| Polyol (part by mass) | U-5620 | 1000 | 1000 | 1000 | 1000 | 1000 | 1000 |
| Active Hydrogen Compound Having a Hydrophilic Group Component (part by mass) | DMPA | 59 | 59 | 59 | — | — | — |
| | Polyoxyethylene Side Chain-Containing Diol (A) | — | — | — | 142 | 142 | 142 |
| Solvent (part by mass) | AN | 1367 | 1367 | 1367 | 502 | 502 | 502 |
| | Acetone | — | — | — | 628 | 628 | 628 |
| Equivalent Ratio of Isocyanate Group (NCO/OH) | | 1.45 | 1.45 | 1.45 | 1.55 | 1.55 | 1.55 |
| Carboxyl Group Concentration of Prepolymer (mmol/g) | | 0.32 | 0.32 | 0.32 | — | — | — |
| Oxyethylene Group Concentration of Prepolymer (mass %) | | — | — | — | 8.16 | 8.16 | 8.16 |
| Neutralization Equivalent of Neutralizing Agent to Hydrophilic Group (NH/COOH) | | 0.95 | 0.95 | 0.95 | — | — | — |
| Neutralizing Agent (part by mass) | TEA | 42 | 42 | 42 | — | — | — |

Example 1

Synthesis of Aqueous Polyurethane Resin (A)

A 3-L stainless steel vessel was charged with 1000 parts by mass of ion exchange water preliminarily adjusted to 10° C., and 750 parts by mass of the prepolymer solution (A) preliminarily adjusted to 20° C. was gradually added thereto with stirring at 2000 rpm using a homo disper (trade name: T.K. Homo Disper, manufactured by PRIMIX Corporation) and dispersed.

Then, 14.9 parts by mass of a chain extender solution in which 2.99 parts by mass of hydrazine was prepared in a 20% by mass aqueous solution was gradually added thereto with attention to heat generation. The equivalent ratio of the amino group in the chain extender to the isocyanate group in the prepolymer (hereinafter abbreviated as the equivalent ratio of the chain extender) was set to 0.95.

Hydrazine monohydrate (manufactured by Wako Pure Chemicals Industries, Ltd.) was used as the hydrazine, and the part by mass of hydrazine is equivalent to that of hydrazine monohydrate (the same applies to the description of the equivalent ratio of the chain extender and the amount of the hydrazine used, in the following Examples and Comparative Examples).

After addition of the chain extender solution, the mixture was stirred at 10 to 25° C. for 2 hours to conduct a chain extension reaction. Further, AN was distilled off under reduced pressure to thereby obtain an aqueous dispersion of aqueous polyurethane resin (A) having a solid content of 35% by mass. The details of the synthesis conditions and properties of the aqueous polyurethane resin (A) thus obtained are shown in Table 6.

Example 2

Synthesis of Aqueous Polyurethane Resin (B)

An aqueous dispersion of aqueous polyurethane resin (B) was produced by the same conditions and operation as in Example 1, except that the prepolymer solution (B) was used and 15.4 parts by mass of a chain extender solution in which 3.07 parts by mass of hydrazine was prepared in a 20% by mass aqueous solution was used as a chain extender. The details of the synthesis conditions and properties of the aqueous polyurethane resin (B) thus obtained are shown in Table 6.

Example 3

Synthesis of Aqueous Polyurethane Resin (C)

A four-neck flask equipped with a stirrer, a thermometer, a reflux condenser, and a nitrogen inlet tube was charged with 750 parts by mass of the prepolymer (D) and the mixture was warmed to 30° C. Subsequently, 1000 parts by mass of ion exchange water preliminarily adjusted to 20° C. was gradually added thereto to prepare an aqueous dispersion, and 49.2 parts by mass of a chain extender solution in which 9.85 parts by mass of hexamethylenediamine (manufactured by Wako Pure Chemicals Industries, Ltd., hereinafter abbreviated as HDA) was prepared in a 20% by mass aqueous solution was added thereto to cause chain extension.

After addition of the chain extender solution, the chain extension reaction was allowed to proceed by stirring at 10 to 25° C. for 2 hours. Further, AN and acetone were distilled off under reduced pressure to thereby obtain an aqueous dispersion of aqueous polyurethane resin (C) having a solid content of 35% by mass. The details of the synthesis conditions and properties of the aqueous polyurethane resin (C) thus obtained are shown in Table 6.

Example 4

Synthesis of Aqueous Polyurethane Resin (D)

An aqueous dispersion of aqueous polyurethane resin (D) was produced by the same conditions and operation as in Example 3, except that the prepolymer solution (E) was used and 49.6 parts by mass of a chain extender solution in which 9.92 parts by mass of HDA was prepared in a 20% by mass aqueous solution was used as a chain extender. The details of the synthesis conditions and properties of the aqueous polyurethane resin (D) thus obtained are shown in Table 6.

Comparative Example 1

Synthesis of Aqueous Polyurethane Resin (E)

An aqueous dispersion of aqueous polyurethane resin (E) was produced by the same conditions and operation as in Example 1, except that the prepolymer solution (C) was used and 15.8 parts by mass of a chain extender solution in which 3.15 parts by mass of hydrazine was prepared in a 20% by mass aqueous solution was used as a chain extender. The details of the synthesis conditions and properties of the aqueous polyurethane resin (E) thus obtained are shown in Table 6.

Comparative Example 2

Synthesis of Aqueous Polyurethane Resin (F)

An aqueous dispersion of aqueous polyurethane resin (F) was produced by the same conditions and operation as in Example 3, except that the prepolymer solution (F) was used and 49.7 parts by mass of a chain extender solution in which 9.94 parts by mass of HDA was prepared in a 20% by mass aqueous solution was used as a chain extender. The details of the synthesis conditions and properties of the aqueous polyurethane resin (F) thus obtained are shown in Table 6.

Evaluation

As for the aqueous polyurethane resin (hereinafter abbreviated as each aqueous polyurethane resin) obtained in those Examples and Comparative Examples, the acid resistance (oleic acid resistance), softening temperature, tensile strength at break, elongation at break, and strength development were determined by the following methods. The results are shown in Table 6.

<Preparation of Test Sample>

Each of the aqueous polyurethane resins (A), (B), and (E) was applied onto an OHP film degreased with acetone, using an applicator, and then dried at 110° C. for 1 hour to obtain about 60 µm-thick films. Subsequently, each of the films was aged for 1 week in a laboratory of 23° C. and 55% relative humidity. Thus, test samples were produced.

Each of the aqueous polyurethane resins (C), (D), and (F) was placed into a plastic tray and saturated steam having a temperature of at least 90° C. was applied thereonto for about 1 minute to solidify the resins. The solidified resins were allowed to stand in the laboratory of 23° C. and 55% relative humidity for a whole day and night, and thereafter, dried at 110° C. for 2 hours to produce about 250 µm-thick films. Subsequently, each of the films was aged for 1 week in the laboratory of 23° C. and 55% relative humidity. Thus, test samples were produced.

<Oleic Acid Resistance (Unit: %)>

The test sample of each aqueous polyurethane resin was cut into a 1×10 cm size piece and the mass of the test sample piece was measured. Subsequently, the test sample was immersed in oleic acid (manufactured by Wako Pure Chemicals Industries, Ltd.) at 23° C. for 7 days. After immersion, the oleic acid adhered to the surface of the test sample was quickly wiped off before the mass measurement of the test sample. Then, the mass of the test sample after immersion was measured. The oleic acid resistance (%) was calculated from the mass of the test sample before and after the immersion in the oleic acid by the following equation:

Oleic acid resistance(%)=(mass(g) of the test sample after immersion−mass(g) of the test sample before immersion)/mass(g) of the test sample before immersion×100

<Softening Temperature (Unit: °C.)>

The test sample of each of the aqueous polyurethane resins was stamped out into a size having a width of 5 mm and a length of 50 mm with a dumbbell. Subsequently, a dynamic viscoelasticity measuring apparatus (manufactured by IT MEASUREMENT CONTROL Co, Ltd., model: DVA-200) was used for this test sample, and the dynamic viscoelasticity of the test sample was measured on the conditions of tension mode, a gauge length of 25 mm, a heating rate of 5° C./min, and a measurement frequency of 10 Hz. In a region where the storage modulus of a rubber or leather-like plateau region was inflected, an intersection point of each tangent of the storage modulus was determined and the temperature thereat was defined as a softening temperature.

<Tensile Strength at Break (TS) (Unit: %)>

The test sample of each of the aqueous polyurethane resins was stamped out into a size having a width of 1 cm and a length of 10 cm with a dumbbell. Subsequently, a tensile and compression testing machine (manufactured by INTESCO co., Ltd., Model 205N) was used for this test sample, and a tensile test was conducted on the conditions of 23° C., a tensile speed of 300 mm/min, and a distance between chucks of 50 mm. Thus, the tensile strength at break (TS) of each aqueous polyurethane resin was determined.

<Elongation at Break (EL) (Unit: %)>

The test sample of each of the aqueous polyurethane resins was stamped out into a size having a width of 1 cm and a length of 10 cm with a dumbbell. Subsequently, a tensile and compression testing machine (manufactured by INTESCO Co., Ltd., Model 205N) was used for this test sample, and a tensile test was conducted on the conditions of 23° C., a tensile speed of 300 mm/min, and a distance between chucks of 50 mm. Thus, the elongation at break (EL) of each aqueous polyurethane resin was determined.

<Strength Development (Unit: MPa/Day)>

After completion of heat treatment at 110° C. during production of the test sample, the tensile test was conducted with setting a tensile strength at break of the test sample after allowed to stand for 1 hour in the room of 23° C. and 55% relative humidity to TS1 (MPa) and a tensile strength at break of the test sample after 7 days elapsed to TS2 (MPa), and the strength development was then determined by the following equation:

Strength Development=(TS2−TS1)/7

TABLE 6

|  |  | Ex. 1 | Ex. 2 | Comp. Ex. 1 |
|---|---|---|---|---|
| Aqueous Polyurethane Resin |  | A | B | E |
| Prepolymer Solution |  | A | B | C |
| (part by mass) |  | 750 | 750 | 750 |
| Ion Exchange Water (part by mass) |  | 1000 | 1000 | 1000 |
| Chain Extender | Hydradine | 2.99 | 3.07 | 3.15 |
| (part by mass) | Aqueous Solution Containing 20% by Mass of Chain Extender | 14.9 | 15.4 | 15.8 |

TABLE 6-continued

| | | | | |
|---|---|---|---|---|
| Evaluation of Physical Properties | Oleic Acid Resistance (%) | 8.1 | 8.3 | 9.1 |
| | Softening Temperature (° C.) | 194 | 192 | 184 |
| | TS (MPa) | 46 | 44 | 38 |
| | EL (%) | 415 | 420 | 440 |
| | Strength Development (MPa/Day) | 0.05 | 0.2 | 1.0 |

| | | Ex. 3 | Ex. 4 | Comp. Ex. 2 |
|---|---|---|---|---|
| Aqueous Polyurethane Resin | | C | D | F |
| Prepolymer Solution (part by mass) | | D 750 | E 750 | F 750 |
| Ion Exchange Water (part by mass) | | 1000 | 1000 | 1000 |
| Chain Extender (part by mass) | HDA | 9.85 | 9.92 | 9.94 |
| | Aqueous Solution Containing 20% by Mass of Chain Extender | 49.2 | 49.6 | 49.7 |
| Evaluation of Physical Properties | Oleic Acid Resistance (%) | 18.7 | 19.2 | 21.6 |
| | Softening Temperature (° C.) | 202 | 199 | 193 |
| | TS (MPa) | 27.3 | 26 | 22.2 |
| | EL (%) | 550 | 560 | 590 |
| | Strength Development (MPa/Day) | 0.2 | 0.5 | 1.5 |

5) Synthesis and Evaluation of Granular Polyurethane Resin and Slush Molded Article a) Preparation of Dispersion Stabilizer (I)

A three-neck flask equipped with a stirrer was charged with 2000 parts by mass of adipate polyester polyol (trade name: U-2610, manufactured by Mitsui Chemicals Polyurethanes, Inc.) and 98 parts by mass of maleic anhydride. The mixture was then gradually heated under a nitrogen flow and was thereafter stirred at 150° C. for 20 hours. Further, the mixture was gradually heated to 170° C. under a reduced pressure of 2.66 kPa with nitrogen bubbling, and stirred at the same temperature for 5 hours, to obtain an unsaturated bond-containing polyol.

After the temperature was lowered to 70° C. under a nitrogen atmosphere, 200 parts by mass of ethyl isocyanate was gradually added dropwise to 1300 parts by mass of the unsaturated bond-containing polyol. The mixture was then allowed to react at a temperature of 75 to 80° C. for 6 hours to synthesize an unsaturated bond-containing compound having a urethane bond at the end of the molecule.

Next, the unsaturated bond-containing compound was subjected to a reduced pressure treatment on the conditions of 130° C. and 0.66 kPa or less. Further, 11547 parts by mass of butyl acetate was added to 6077 parts by mass of the unsaturated bond-containing compound to prepare a uniform solution. Thereafter, the atmosphere was fully replaced with nitrogen and the solution was heated to 110° C.

A monomer solution obtained by preliminarily mixing 21270 parts by mass of lauryl methacrylate and 1100 parts by mass of benzoyl peroxide was added dropwise at 110° C. under a nitrogen atmosphere for about 1 hour. The mixture was allowed to react at a temperature of 110 to 120° C. for 2 hours and then further allowed to react at 130° C. for 2 hours. As a result, a dispersion stabilizer (I) having a solid content of about 65% by mass was obtained.

b) Synthesis of Granular Polyurethane Resin

Example 1

Synthesis of Granular Polyurethane Resin (A)

A reaction vessel equipped with a nitrogen introducing tube, a thermometer, a condenser tube, and a stirrer was charged with 250.08 parts by mass of Takelac U-2420 (adipate polyester polyol, manufactured by Mitsui Chemicals Polyurethanes, Inc.) and 300.5 parts by mass of Takelac U-2024 (adipate polyester polyol, manufactured by Mitsui Chemicals Polyurethanes, Inc.) as high-molecular-weight polyols, 3.1 parts by mass of IRGANOX 245 (manufactured by Ciba Specialty Chemicals K. K.) as an antioxidant, 3.1 parts by mass of Tinuvin 571 (manufactured by Ciba Specialty Chemicals K. K.) as a benzotriazol type ultraviolet absorber, 3.1 parts by mass of Tinuvin 765 (manufactured by Ciba Specialty Chemicals K. K.) as a hindered amine light stabilizer, and 97.22 parts by mass of 1,4-BIC3 as a polyisocyanate component, and the mixture was heated to a temperature of 80 to 85° C. with thoroughly stirring.

Subsequently, the reaction vessel was charged at once with 2.26 parts by mass of 2-ethylhexyl alcohol (manufactured by Wako Pure Chemicals Industries, Ltd.) as a monol. After the reaction was continued for about 2 hours, it was confirmed that the NCO content had dropped to 2.73% by mass, so that an isocyanate group-terminated prepolymer was obtained.

Thereafter, the reaction vessel containing such prepolymer was charged at once with 0.4 parts by mass of the dispersion stabilizer (I) and 20 parts by mass of n-heptane which were preliminarily mixed, and the isocyanate group-terminated prepolymer was dispersed over about 0.5 hours. Subsequently, the reaction vessel was charged at once with 50 parts by mass of n-heptane relative to such prepolymer, and the isocyanate group-terminated prepolymer was dispersed over about 0.5 hours.

Then, 19.36 parts by mass of 1,4-butanediol (manufactured by Wako Pure Chemicals Industries, Ltd.) was charged in portions, and the mixture was thereafter allowed to react at the same temperature for 5 hours, to obtain a dispersion of thermoplastic polyurethane resin.

Next, the dispersion was cooled to 30° C. or below and the solid was collected by filtration.

Subsequently, a dryer was charged with 100 parts by mass of the solid, 0.5 parts by mass of TSF-451-3000 (silicone oil, manufactured by GE Toshiba Silicones Co., Ltd.) as a releasing agent, and 0.3 parts by mass of an antiblocking agent (trade name: PM032D, manufactured by Ganz Chemical Co., Ltd.), and the mixture was dried at 40° C. for 3 hours with stirring under reduced pressure. Thereafter, the resulting content was cooled to 25° C. or below and then discharged to produce a granular polyurethane resin (A).

To 100 parts by mass of the granular polyurethane resin (A) thus produced, 0.6 parts by mass of a carbon black/calcium carbonate dispersion (trade name: PV-817, manufactured by Sumika Color CO., LTD.) and 0.4 parts by mass of a carbon black/calcium carbonate dispersion (manufactured by Sumika Color CO., LTD., trade name: PV-801) as pigments were supplied in a Henschel mixer and stirred at a rotational speed of 700 min$^{-1}$ for 1 minute. Then, the mixture was screened through a 48 mesh sieve and further through a 200 mesh sieve, and the granular polyurethane resin (A) was colored.

Example 2

Synthesis of Granular Polyurethane Resin (B)

A granular polyurethane resin (B) was produced by the same blending formulation and operation as in Example 1 except that 1,4-BIC4 was used in place of 1,4-BIC3.

Comparative Example 1

Preparation of Granular Polyurethane Resin (C)

A granular polyurethane resin (C) was produced by the same blending formulation and operation as in Example 1 except that 1,4-BIC7 was used in place of 1,4-BIC3.

The granular polyurethane resin (hereinafter abbreviated as each powder) obtained in each of Examples and Comparative Example had an average particle size before blending of the above-mentioned additive (pigment) in the range of about 110 to 170 μm. The volume-average particle size of each powder was determined by measuring the volume-average particle size of each powder which was replaced with n-heptane and dispersed in n-heptane, using a particle size analyzer (manufactured by Nikkiso Co., Ltd., model: MICROTRAC HRA). The average particle size was a value of 50 cumulative percent in the particle size distribution curve based on the volume percent.

Evaluation

<Mold Releasable Time (Unit: Min)>

After a embossing mold was heated to 250° C. in an oven, 300 g of each powder was sprayed onto the mold having a vertical length of 15 cm and a horizontal length of 15 cm, and allowed to stand for 8 seconds. Thereafter, unfused excess powder was discarded. Next, the mold was allowed to stand at 270° C. for 60 seconds. Then, 30 seconds after the mold was taken out from the oven, the mold was water-cooled by immersing in water having a temperature of 23° C. for 30 seconds, and a 1-mm-thick sheet was then taken out.

When the vertical length of the sheet after mold release was set to L2 (mm) and the vertical length of the mold was set to L1 (mm), an absolute value calculated by the following equation was defined as a dimensional change of the sheet, and the time required when the sheet can be released from the mold with a dimensional change of less than 1.5% was determined.

Dimensional change=$|(L2-L1)\times 100/L1|$

After the sheet was formed from each powder, the physical properties of the obtained sheet were determined by the following methods. The results are shown in Table 7.

<50% Modulus of Sheet (Unit: MPa)>

The 50% modulus of the sheet was determined according to the method described in JIS K-6251. The sheet was stamped out with a JIS-No. 4 dumbbell, and extended with a tensile strength testing machine (trade name: universal tensile testing machine RTA-500, manufactured by ORIENTEC Co., LTD.) on the conditions of a tensile speed of 300 mm/min, to determine a 50% modulus.

<Softening Temperature of Sheet (Unit: ° C.)>

The temperature dependency of the storage modulus of the sheet was determined using a dynamic viscoelasticity measuring device (manufactured by Rheometrics Far East Ltd., trade name: RSA-III). It was determined on the conditions of a temperature of −90° C. to 200° C., a heating rate of 5° C./min, and a measurement frequency of 10 Hz, and in a region where the storage modulus of a rubber or leather-like plateau region was inflected, an intersection point of each tangent of the storage modulus was determined and this temperature was defined as a softening temperature.

[Table 7]

TABLE 7

|  |  | Ex. 1 | Ex. 2 | Comp. Ex. 1 |
|---|---|---|---|---|
|  | Granular Polyurethane Resin | A | B | C |
|  | Trans Ratio of 1,4-BIC (mol %) | 86 | 81 | 71 |
| Evaluation of Physical Properties | Mold Releasable Time (min) | 1.0 | 1.5 | 7.5 |
|  | 50% Modulus (Mpa) | 3.2 | 2.6 | 2.1 |
|  | Softening Temperature (° C.) | 142 | 139 | 112 |

6) Synthesis and Evaluation of Polyurethane Resin for Elastic Molding and Elastic Molded Article

Example 1

Synthesis of Elastic Molded Article (A)

Under a nitrogen atmosphere, a reactor equipped with an impeller, a thermometer, and a water cooled condenser was charged with 100 parts by mass of adipate polyester polyol (trade name: Takelac U-7020, manufactured by Mitsui Chemicals Polyurethanes, Inc.) (hereinafter abbreviated as U-7020) having a number average molecular weight of 2000, which was preliminarily subjected to reduced pressure dehydration treatment, 100 parts by mass of polytetramethylene ether glycol (trade name: PolyTHF2000, manufactured by BASF Japan, Ltd.) (hereinafter abbreviated as PolyTHF) having a number average molecular weight of 2000, which was likewise preliminarily subjected to reduced pressure dehydration treatment, and 30.8 parts by mass of 1,4-BIC3 so that the equivalent ratio (NCO/hydroxyl group) of the isocyanate group in 1,4-BIC3 to the hydroxyl group in U-7020 and PolyTHF was 1.59, and the mixture was heated to 80° C.

Subsequently, the mixture was allowed to react at 80° C. for 1 hour with stirring, and as a catalyst, 0.002 parts by mass of dibutyltin dilaurate (manufactured by Wako Pure Chemicals Industries, Ltd.) was then added.

The added mixture was allowed to react until the isocyanate group content was 2.05% by mass at the same temperature, to produce an isocyanate group-terminated polyurethane prepolymer (hereinafter abbreviated as a prepolymer) (A).

Then, N,N'-dimethylacetamide (organic synthesis grade, manufactured by Wako Pure Chemicals Industries, Ltd.) (hereinafter abbreviated as DMAc) preliminarily immersing molecular sieves 4A was added to the prepolymer (A) which was cooled to 30° C. or below, so that the prepolymer (A) was dissolved to give a concentration of 10% by mass.

Thereafter, 1.08% by mass of the DMAc solution (hereinafter abbreviated as amine solution) containing a mixed amine of 3.26 parts by mass of ethylenediamine (hereinafter abbreviated as EDA) and 0.25 parts by mass of diethylamine (hereinafter abbreviated as DEA) was added dropwise thereto so that the temperature of the DMAc solution of the prepolymer (A) was not exceed 20° C., to thereby cause a chain extension reaction. The concentration ratio of the amino group in EDA and that in DEA were 94.2% by mole and 5.8% by mole, respectively. The equivalent ratio of the amino group in the mixed amine with respect to the isocyanate group in the DMAc solution of the prepolymer (A) was 1.001.

After the dropwise addition of the amine solution, the mixture was allowed to react at room temperature for 2 hours, heated to 60° C., and was allowed to react at the same temperature for 2 hours. Then, as stabilizers, 1.17 parts by mass of Irganox245 (manufactured by Ciba Japan K.K.), 1.17 parts by mass of Tinuvin765 (manufactured by Ciba Japan K.K.), and 1.17 parts by mass of Tinuvin213 (manufactured by Ciba Japan K.K.) were added thereto to produce a DMAc solution of a polyurethane resin (A) for elastic molding.

The DMAc solution of the polyurethane resin (A) for elastic molding was poured on a glass plate so as to have a thickness of 100 μm, and DMAc was distilled off at 40° C. at normal pressure under a nitrogen atmosphere for 24 hours.

Next, the polyurethane resin solution was heated to 60° C. and then dried at the same temperature for 5 hours. Further, the dried resin was subjected to reduced pressure at the same temperature for 7 hours to thereby distilling off DMAc, and the resulting product was heated at 100° C. for 1 hour to produce an elastic molded article (A).

Example 2

Synthesis of Elastic Molded Article (B)

An elastic molded article (B) was produced by the same blending formulation and operation as in Example 1 except that 30.8 parts by mass of 1,4-BIC4 was used in place of 1,4-BIC3.

Comparative Example 1

Synthesis of Elastic Molded Article (C)

An elastic molded article (C) was produced by the same blending formulation and operation as in Example 1 except that 30.8 parts by mass of 1,4-BIC7 was used in place of 1,4-BIC3.

Evaluation

As for the elastic molded articles (hereinafter abbreviated as each elastic molded article) obtained in those Examples and Comparative Example, the residual strain after cyclic tensional deformation, softening temperature, tensile strength at break, elongation at break, and hardness development were determined by the following methods. The results are shown in Table 8.

<Residual Strain After Repeated Elongation Deformation (Unit: %)>

A tensile test was conducted on strip-shaped elastic molded articles using a tensile testing machine (manufactured by INTESCO Co., Ltd., Model: 205) installed in a laboratory at 23° C. and 55% relative humidity. More specifically, an operation of elongating a film having a sample length (L1) of 30 mm in the tensile direction to 200% at a tensile speed of 500 mm/min was repeated 5 times.

The film was elongated to 300% at the 5th time and then maintained in such state for 60 seconds. Thereafter, the sample length (L2) at the time when this elongation was recovered was measured until the stress was no longer detected.

Then, the residual strain after repeated elongation deformation was calculated using the following equation:

Residual Strain={(L2−L1)/L1}×100

<Softening Temperature (Unit: ° C.)>

Each of the elastic molded articles was stamped out into a size having a width of 5 mm and a length of 50 mm with a dumbbell. Subsequently, a dynamic viscoelasticity measuring apparatus (manufactured by IT MEASUREMENT CONTROL Co, Ltd., model: DVA-200) was used for this elastic molded article, and the dynamic viscoelasticity of the elastic molded article was measured on the conditions of tension mode, a gauge length of 25 mm, a heating rate of 5° C./min, and a measurement frequency of 10 Hz. In a region where the storage modulus of a rubber or leather-like plateau region was inflected, an intersection point of each tangent of the storage modulus was determined and this temperature was defined as a softening temperature.

<Tensile Strength at Break (TS) (Unit: %)>

Each of the elastic molded articles was stamped out into a size having a width of 1 cm and a length of 10 cm with a dumbbell. Subsequently, a tensile and compression testing machine (manufactured by INTESCO Co., Ltd., Model 205N) was used for each of the elastic molded articles, and a tensile test was conducted on the conditions of 23° C., a tensile speed of 300 mm/min, and a distance between chucks of 50 mm. Thus, the tensile strength at break (TS) of each of the elastic molded articles was determined.

<Elongation at Break (EL) (Unit: %)>

Each of the elastic molded articles was stamped out into a size having a width of 1 cm and a length of 10 cm with a dumbbell. Subsequently, a tensile and compression testing machine (manufactured by INTESCO Co., Ltd., Model 205N) was used for each of the elastic molded articles, and a tensile test was conducted on the conditions of 23° C., a tensile speed of 300 mm/min, and a distance between chucks of 50 mm. Thus, the elongation at break (EL) of each of the elastic molded articles was determined.

<Strength Development (Unit: MPa/Day)>

After completion of heat treatment at 100° C. during production of the elastic molded articles, the tensile test was conducted with setting a tensile strength at break of the test sample after allowed to stand for 1 hour in the room of 23° C. and 55% relative humidity to TS1 (MPa) and a tensile strength at break of the test sample after 7 days elapsed to TS2 (MPa), and the strength development was then determined by the following equation:

Strength Development=(TS2−TS1)/7

[Table 8]

TABLE 8

|  |  | Ex. 1 | Ex. 2 | Comp. Ex. 1 |
|---|---|---|---|---|
| Elastic Molded Articles | | A | B | C |
| Trans Ratio of 1,4-BIC (mol %) | | 86 | 81 | 71 |
| Evaluation of Physical Properties | Strength Development (MPa/Day) | 0.1 | 0.3 | 1.0 |
| | Residual Strain After Repeated Elongation Deformation (%) | 27.6 | 30 | 38.2 |
| | Softening Temperature (° C.) | 192 | 189 | 176 |
| | TS (MPa) | 61.4 | 61 | 58.6 |
| | EL (%) | 1072 | 1108 | 1209 |

7) Synthesis and Evaluation of Polyurethane Resin for Reaction Injection Molding and Reaction Injection Molded Article a) Preparation of Isocyanurate-Modified NBDI Under a nitrogen atmosphere, 430.0 parts by mass of norbornane diisocyanate (trade name: Cosmonate NBDI, manufactured by Mitsui Chemicals, Inc., hereinafter abbreviated as NBDI) and 1.70 parts by mass of potassium fluoride were mixed with stirring at 50° C. for 5 hours and then filtration was performed. To this filtrate was added 0.043 parts by mass of dibutyltin dilaurate and then the added filtrate was subjected to deaeration under reduced pressure with bubbling the nitrogen into the liquid phase.

Further, the filtrate was heated to 40° C., 0.885 parts by mass of an isocyanurate-forming catalyst (isocyanurate-forming catalyst obtained by mixing potassium fluoride (manufactured by Johoku Chemical Co., Ltd.) and polyethylene glycol (having a hydroxyl value of 400 mg KOH/g, hereinafter abbreviated as PEG400) at room temperature for 3 hours to prepare a PEG400 solution containing 1.6% by mass of potassium fluoride) preliminarily prepared was added dropwise to the filtrate at a reaction temperature of 40 to 45° C. and the mixture was allowed to react for 17 hours.

Thereafter, 0.06 parts by mass of a reaction terminator (trade name: JP-506H, manufactured by Johoku Chemical Co., Ltd.) was added thereto, and the mixture was stirred at 40 to 45° C. for 1 hour to thereby produce a polyisocyanate mixture containing an isocyanurate-modified NBDI.

The NCO content of the polyisocyanate mixture thus produced was 32.1% by mass, and the content of the isocyanurate-modified NBDI (measuring method: GPC) was 38.1%. Hereinafter, this polyisocyanate mixture is abbreviated as NBDI nurate mass.

Example 1

Under a nitrogen atmosphere, a reactor equipped with a stirrer was charged with 70 parts by mass of 1,4-BIC3 and 30 parts by mass of NBDI nurate mass, and the mixture was mixed with stirring while being subjected to deaeration under reduced pressure, to prepare a polyisocyanate component.

On the other hand, 100 parts by mass of polyether polyol (trade name: EP-950P, manufactured by Mitsui Chemicals Polyurethanes, Inc.), 35 parts by mass of 1,4-butanediol (manufactured by Mitsubishi Chemical Corporation), 0.5 parts by mass of dibutyltin dineodecanoate (manufactured by GE silicone, trade name: UL-28) which is a urethanizing catalyst, and 0.5 parts by mass of a defoaming agent (manufactured by Nippon Unicar Co. Ltd., trade name: SAG-47) were added to another reactor equipped with a stirrer, and the mixture was mixed with stirring at 70° C. for 30 minutes while being subjected to deaeration under reduced pressure, to thereby prepare a polyol component.

A polyurethane resin for reaction injection molding, that is, the above-mentioned polyisocyanate component and polyol component, were mixed in a mixing head of a two-component type high-pressure foaming machine which was fixed to a mold, injected from a gate into the test mold made of aluminum, and released from the test mold at a time when a reaction injection molded article could be released, i.e., the mold release time shown in Table 9, to thereby produce a reaction injection molded article (1).

The injection was performed when the blending ratio of the polyisocyanate component and the polyol component was a NCO index (NCO/OH) of 100.

The molding conditions are as follows. An aqueous silicone-based releasing agent was preliminarily applied to the molding surface of the mold.

Injection rate: 400 g/sec
Polyisocyanate component raw material temperature: 45° C.
Polyol component raw material temperature: 45° C.
Mold size: 460×380×1 mm
Mold temperature: 70° C.

Example 2

A reaction injection molded article (2) was produced by the same blending formulation and operation as in Example 1 except that 1,4-BIC4 was used in place of 1,4-BIC3.

Comparative Example 1

A reaction injection molded article (3) was produced by the same blending formulation and operation as in Example 1 except that 1,4-BIC7 was used in place of 1,4-BIC3.

Evaluation

<Mold Release Time (Unit: Second)>

A catalyst was added to a mixed solution of the polyisocyanate component and the polyol component obtained by mixing them at the same blending ratio as that used in each of Examples and Comparative Example, and a time from when the pressure reduction and stirring was started to when the gelated polyurethane resin could be released from the mold was measured. The measured time was referred to as a mold release time (DT) in each of Examples and Comparative Example.

As for the reaction injection molded article obtained in those Examples and Comparative Example (hereinafter abbreviated as each molded article), the shore-A hardness, softening temperature, and tear resistance development were determined by the following methods. These results are shown in Table 9.

<Shore-A Hardness>

The Shore-A hardness of each molded article was determined according to the testing method for vulcanized rubber described in JIS K6301 (1969).

<Softening Temperature (Unit: ° C.)>

Each of the molded articles was stamped out into a size having a width of 5 mm and a length of 50 mm with a dumbbell. Subsequently, a dynamic viscoelasticity measuring apparatus (manufactured by IT MEASUREMENT CONTROL Co, Ltd., model: DVA-200) was used for this sample, and the temperature dispersion of dynamic viscoelasticity of the sample was measured on the conditions of tension mode, a gauge length of 25 mm, a heating rate of 5° C./min, and a measurement frequency of 1 Hz. In a region where the storage modulus of a rubber or leather-like plateau region was inflected, an intersection point of each tangent of the storage modulus was determined and this temperature was defined as a softening temperature.

<Tear Resistance Development (Unit: N/Mm·Day)>

According to the testing method for vulcanized rubber described in JIS K6301 (1969), a tear test was conducted for molded articles at 4 hours elapsed after released from the mold, so that the tear resistance (TR) of each of the molded articles was determined. The results were set to TR0.

Further, the TR of the molded article that was allowed to stand for 2 days at a constant temperature of 23° C. and a constant relative humidity of 55% after released from the mold was determined and the obtained value was set to TR2. The tear resistance development was calculated from these values according to the following equation:

$$\text{Tear resistance development}=(TR2-TR0)/2$$

The smaller the value, the better the development of the physical properties.

TABLE 9

|  |  | Ex. 1 | Ex. 2 | Comp. Ex. 1 |
|---|---|---|---|---|
| Polyurethane Resin for Reaction Injection Molding | | A | B | C |
| Trans Ratio of 1,4-BIC (mol %) | | 86 | 81 | 71 |
| Evaluation of Physical Properties | Mold Release Time (sec) | 45 | 50 | 70 |
| | Hardness (Shore A) | 91 | 90 | 85 |
| | Softening Temperature (° C.) | 221 | 220 | 197 |
| | Tear Resistance Development (N/min·Day) | 1.0 | 2.3 | 10.6 |

8) Synthesis and Evaluation of Two-Part Curing Polyurethane Resin and Coating Film Example 1

Synthesis of Two-Part Curing Polyurethane Resin (A) and Coating Film (A)

A reactor equipped with a stirrer, a thermometer, a nitrogen gas inlet tube, and a Dimroth condenser tube was charged with 338.11 parts by mass of 1,4-BIC3 and 32.38 parts by mass of dodecyl alcohol under a nitrogen gas atmosphere, heated to 85° C., and then allowed to react at the same temperature for 4 hours.

The mixture was then heated to 90° C. and allowed to react at the same temperature for 1 hour with addition of 0.007 parts by mass of bismuth octylate as a catalyst.

Thereafter, the resulting mixture was heated to 100° C. and allowed to react at the same temperature for 4 hours. Then, the FT-IR and the NCO content by mass % were determined to confirm the isocyanate group concentration, and 0.01 parts by mass of bismuth octylate was further added thereto. Subsequently, the reaction was continued at 100° C. for 8 hours. Then, 0.02 parts by mass of o-toluenesulfonamide as a catalyst deactivator was added thereto to deactivate the catalyst, so that the reaction was finally terminated.

Unreacted 1,4-BIC3 was removed from the resulting reaction solution by treatment with a film evaporator, to thereby obtain a pale yellow, transparent polyisocyanate component.

This polyisocyanate component and a commercially available acrylic polyol (trade name: ACRYDIC A-801, manufactured by DIC Corporation) were blended so that the equivalent ratio (NCO/hydroxyl group) of the isocyanate group in the polyisocyanate to the hydroxyl group in the acrylic polyol was 1.0, to prepare a reaction mixture (two-part curing polyurethane resin (A)).

NMR, FT-IR, and GPC measurements confirmed that the polyisocyanate component in Example 1 had an allophanate/isocyanurate composition ratio of 82/18. A urethane group was not substantially observed. The content of unreacted 1,4-BIC3 was 0.5% by mass, and the NCO content was 13.6% by mass. Further, the two-part curing polyurethane resin (A) was completely dissolved without becoming cloudy even if diluted with more than 1000% by mass of ethyl acetate.

The two-part curing polyurethane resin (A) thus produced was then applied to a steel plate which was chromate-treated and a glass plate, so as to have an average film thickness of 25±5 μm, and was cured on the conditions of 25° C. and 55% relative humidity, to form coating films (A).

Example 2

Synthesis of Two-Part Curing Polyurethane Resin (B) and Coating Film (B)

A two-part curing polyurethane resin (B) and a coating film (B) were produced by the same blending formulation and operation as in Example 1 except that 1,4-BIC4 was used in place of 1,4-BIC3.

NMR, FT-IR, and GPC measurements confirmed that the polyisocyanate component in Example 2 had an allophanate/isocyanurate composition ratio of 81/19. A urethane group was not substantially observed. The content of unreacted 1,4-BIC4 was 0.5% by mass, and the NCO content was 13.5% by mass. Further, the two-part curing polyurethane resin (B) was completely dissolved without becoming cloudy even if diluted with more than 1000% by mass of ethyl acetate.

Comparative Example 1

Synthesis of Two-Part Curing Polyurethane Resin (C) and Coating Film (C)

A two-part curing polyurethane resin (C) and a coating film (C) were produced by the same blending formulation and operation as in Example 1 except that 1,4-BIC7 was used in place of 1,4-BIC3.

NMR, FT-IR, and GPC measurements confirmed that the polyisocyanate component in Comparative Example 1 had an allophanate/isocyanurate composition ratio of 81/19. A urethane group was not substantially observed. The content of unreacted 1,4-BIC7 was 0.5% by mass, and the NCO content by mass was 13.5%. Further, the two-part curing polyurethane resin (C) was completely dissolved without becoming cloudy even if diluted with more than 1000% by mass of ethyl acetate.

The allophanate/isocyanurate composition ratio as determined in the following manner. The molecular weight distribution of the polyisocyanate components in Examples and Comparative Example was measured with a GPC apparatus equipped with a refractive index detector (RID), the area ratio of the peak corresponding to the allophanate with respect to all the peaks was determined as an allophanate composition ratio while the area ratio of the remaining peaks with respect to all the peaks was determined as an isocyanurate composition ratio, and the allophanate/isocyanurate composition ratio was then calculated. In addition, the functional groups such as allophanate, isocyanurate, and urethane bond were also determined by NMR and FT-IR.

Evaluation

As for the two-part curing polyurethane resin (hereinafter abbreviated as each two-part curing polyurethane resin) and the coating film (hereinafter abbreviated to each coating film) obtained in those Examples and Comparative Example, set-to-touch time, dry hard time, film hardness, and tensile strength were determined by the following methods. The results are shown in Table 10.

<Set-to-Touch Time (Unit: Minute)>

According to JIS K 5600-1-1, the center of a coated surface was touched by a finger under the conditions of 25° C. and 55% relative humidity and, when none of the sample was transferred to the fingertip, the set-to-touch time was determined.

<Dry Hard Time (Unit: Hour)>

According to JIS K 5600-1-1, the center of the test piece was strongly pinched between the thumb and forefinger under the conditions of 25° C. and 55% relative humidity, and when no fingerprint impression was left on the coated surface to be in a dry-hard state, the dry hard time was determined.

<Coating Hardness>

According to JIS-K5600-5-6, the pencil hardness at the time when a surface of the coating film was scratched was evaluated as coating hardness.

<Tensile Strength (Unit: MPa)>

Using a tensile and compression testing machine (manufactured by INTESCO Co., Ltd., Model: 205N), A sample is removed from a glass plate and it is after drying. A tensile test was conducted on the conditions of 23° C. and a tensile speed of 50 mm/min to determine a tensile strength.

TABLE 10

|  |  | Ex. 1 | Ex. 2 | Comp. Ex. 1 |
|---|---|---|---|---|
| Two-Part Curing Polyurethane Resin | | A | B | C |
| Trans Ratio of 1,4-BIC (mol %) | | 86 | 81 | 71 |
| Allophanate/Isocyanurate Composition Ratio | | 82/18 | 81/19 | 81/19 |
| Evaluation of Physical Properties | Set-to-Touch Time (min) | 3.5 | 4.0 | 5.5 |
| | Dry Hard Time (Hr) | 4.8 | 5.0 | 7.0 |
| | Coating Hardness | H | H | H |
| | Tensile Strength (MPa) | 73 | 72 | 64 |

9) Synthesis and Evaluation of Polyurethane Foam

Example 1

Synthesis of Polyurethane Foam (A)

Weighed were 100 parts by mass of polyether polyol (A) (initiator: glycerol, hydroxyl value: 34 mg KOH/g, ethyleneoxide content: 15% by mass, and primary hydroxyl group ratio at the molecular end: 82% by mol), 5 parts by mass of triethanolamine (manufactured by Mitsui Chemicals, Inc.), 0.5 parts by mass of TOYOCAT F22 (manufactured by Tosoh Corporation, amine catalyst), and 1.0 part by mass of L-580 (manufactured by Momentive Performance Materials Inc., silicone-based foam stabilizer), and were mixed with stirring in a laboratory of 23° C. and 55% relative humidity until they were thoroughly uniform, to thereby prepare a resin premix. Further, a potassium carbonate aqueous solution in which 0.7 parts by mass of potassium carbonate ($K_2CO_3$) and 1.5 parts by mass of ion exchange water were dissolved was prepared.

Thereafter, the temperatures of the resin premix, the potassium carbonate aqueous solution and 1,4-BIC3 of Preparation Example 3 were adjusted to 23° C. Then, in the laboratory, 2.2 parts by mass of the potassium carbonate aqueous solution was added to the resin premix, and the mixture was then mixed with stirring at a rotation speed of 500 rpm for 6 seconds. Thereafter, 1,4-BIC3 of Preparation Example 3 in an amount such that the isocyanate index was 110 was immediately added thereto, and the added mixture was then mixed with stirring at a rotation speed of 2000 rpm for 6 seconds, to prepare a reaction solution.

Subsequently, a reaction solution was quickly poured into a wooden box (a 12-cm cube box opening upward), and then foamed. The resulting polyurethane foam was allowed to stand for 1 day in a laboratory of 23° C. and 55% relative humidity and then cut to produce a polyurethane foam (A).

The polyurethane foam (A) thus produced was evaluated for the following physical properties.

Example 2

Synthesis of Polyurethane Foam (B)

A polyurethane foam (B) was produced by the same blending formulation and operation as in Example 1 except that 1,4-BIC4 was used in place of 1,4-BIC3.

Comparative Example 1

Synthesis of Polyurethane Foam (C)

A polyurethane foam (C) was produced by the same blending formulation and operation as in Example 1 except that 1,4-BIC7 was used in place of 1,4-BIC3.

Comparative Example 2

Synthesis of Polyurethane Foam (D)

A polyurethane foam (D) was produced by the same blending formulation and operation as in Example 1 except that 1,4-BIC7 was used in place of 1,4-BIC3, and F-242T (manufactured by Shin-Etsu Chemical Co., Ltd., silicone-based foam stabilizer) was used in place of L-580.

Evaluation

As for the polyurethane foam obtained in those Examples and Comparative Examples, the cream time (CT), rise time (RT), shrinkage, free density, and Asker F hardness (Asker F hardness 1 day, 3 days, and 7 days after foaming) were determined. The results are shown in Table 11.

<Foaming Time (Unit: Second)>

The cream time (CT) and the rise time (RT) were determined.

<Shrinkage>

When the area of the cross-section (parallel to the bottom surface) of the center portion of the foamed block was reduced to at least 30% or more from the inside dimensions (12 cm×12 cm) of the box, this state was determined as "shrinkage". Conversely, when shrinkage phenomenon was not visually observed, the reduction was at most 10% or less.

<Density (Unit: $Kg/M^3$)>

The density was determined according to JIS K6400.

A 10 cm×10 cm×5 cm test piece was collected from the center portion of the foamed block so that a 10 cm×10 cm surface is parallel to the bottom surface of the foamed block. An Asker Durometer Type F (manufactured by Kobunshi Keiki Co., Ltd.) was placed on the upper surface of the 10 cm×10 cm surface, and after 10 seconds, the measured numerical value was read.

TABLE 11

|  |  | Ex. 1 | Ex. 2 | Comp. Ex. 1 | Comp. Ex. 2 |
|---|---|---|---|---|---|
| Polyurethane Foam | | A | B | C | D |
| Trans Ratio of 1,4-BIC (mol %) | | 86 | 81 | 71 | 71 |
| Polyether Polyol (A) (part by mass) | | 100 | 100 | 100 | 100 |
| Crosslinking Agent (part by mass) | Triethanolamine | 5.0 | 5.0 | 5.0 | 5.0 |
| Foaming Agent (part by mass) | Ion Exchange Water | 1.5 | 1.5 | 1.5 | 1.5 |
| Catalyst (part by mass) | Potassium Carbonate | 0.7 | 0.7 | 0.7 | 0.7 |
|  | F22 (Amine type) | 0.5 | 0.5 | 0.5 | 0.5 |
| Foam Stabilizer (part by mass) | L-580 | 1.0 | 1.0 | 1.0 | — |
|  | F-242T | — | — | — | 1.0 |
| INDEX | | 110 | 110 | 110 | 110 |
| Evaluation of Physical Properties | Cream Time (sec) | 18.0 | 17.0 | 18.0 | 18.0 |
|  | Rise Time (sec) | 55 | 56 | 68 | 82 |
|  | Shrinkage | Not Shrinked | Not Shrinked | Shrinked | Shrinked |
|  | Density (kg/m$^3$) | 49.8 | 47.5 | — | — |
|  | Asker F Hardness After 1 day | 12 | 11 | — | — |
|  | After 3 days | 12 | 11 | — | — |
|  | After 7 days | 12 | 11 | — | — |

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The polyurethane resin of the present invention can be suitably used for wide applications such as elastomers (solution polyurethane, aqueous polyurethane, powder, thermosetting elastomer, thermoplastic elastomer, spray molding urethane, elastic fiber, film, sheet, etc.), lenses (glass lenses), artificial and synthetic leather, slush powders, elastic molded articles (spandex), RIM products, paints (mainly solution-based and powder-based curing agents: adduct, allophanate, biuret, urethodione, isocyanurate, and mixtures thereof), adhesives, sealing materials, and foams.

The invention claimed is:

1. A polyurethane resin obtained by a reaction between a polyisocyanate component comprising
   polyisocyanate component consisting of 1,4-bis(isoeyanatomethyl)cyclohexane consisting of 80-93% by mole of trans isomers and the remaining 7-20% by mole of cis isomers, wherein the cis and the trans isomers equal 100% by mole, and
   an active hydrogen compound component,
   wherein the active hydrogen compound component comprises at least one component selected from the group consisting of: a polyol component having two or more hydroxyl groups, a polythiol component having two or more mercapto groups, and a polyamine component having two or more amino groups.

2. The polyurethane resin according to claim 1, wherein the 1,4-bis(isocyanatomethyl)cyclohexane comprises 80-86% by mole of trans isomers.

3. The polyurethane resin according to claim 1, being a molding resin.

4. The polyurethane resin according to claim 1, being an optical polyurethane resin.

5. The polyurethane resin according to claim 4, wherein the active hydrogen compound component is a polyol component having a hydroxyl value of 280 to 1240 mg KOH/g and an average functionality of more than 2 and less than 5.

6. A polyurethane resin obtained by a reaction between a polyisocyanate component and an active hydrogen compound component, wherein the polyisocyanate component comprises:
   1,4-bis(isocyanatomethyl)cyclohexane consisting of 80-93% by mole of trans isomers and the remaining 7-20% by mole of cis isomers wherein the cis and the trans isomers equal 100% by mole and
   a polyisocyanate other than the 1,4-bis(isocyanatomethyl) cyclohexane;
   the active hydrogen compound component comprises:
   a high-molecular-weight polyol, an active hydrogen compound comprising a hydrophilic group and a chain extender; and
   first, the polyisocyanate component is allowed to react with the high-molecular-weight polyol and the active hydrogen compound comprising a hydrophilic group to prepare an isocyanate group-terminated prepolymer, and
   subsequently, the isocyanate group-terminated prepolymer and the chain extender are allowed to react to thereby obtain an aqueous polyurethane resin.

7. A film, being made of the polyurethane resin as defined in claim 6.

8. Artificial and synthetic leather, using the polyurethane resin as defined in claim 6.

9. The polyurethane resin according to claim 1, being a granular polyurethane resin.

10. The polyurethane resin according to claim 9, being used for slush molding.

11. A slush molded article, being obtained by slush molding of the polyurethane resin as defined in claim 9.

12. The polyurethane resin according to claim 1, being a polyurethane resin for elastic molding.

13. An elastic molded article using the polyurethane resin as defined in claim 12.

14. The polyurethane resin according to claim 1,
   wherein the polyisocyanate component further comprises a polyisocyanate other than the 1,4-bis(isocyanatomethyl)cyclohexane including 80-93% by mole of trans isomers), which is an isocyanurate-modified product of at least either one of alicyclic polyisocyanate and aralkyl polyisocyanate, and the polyurethane resin is a polyurethane resin for reaction injection molding.

15. The polyurethane resin according to claim 14, wherein the alicyclic polyisocyanate and the aralkyl polyisocyanate are at least one kind selected from the group consisting of 1,3-bis(isocyanatomethyl)cyclohexane, 1,4-bis(isocyanatomethyl)cyclohexane, 2,5-di(isocyanatomethyl)bicyclo[2,2,1]heptane, 2,6-di(isocyanatomethyl)bicyclo[2,2,1]heptane, isophorone diisocyanate, 1,3-bis(isocyanatomethyl)benzene, and 1,4-bis(isocyanatomethyl)benzene.

16. A reaction injection molded article being formed from the polyurethane resin as defined in claim 14.

17. The polyurethane resin according to claim 1, wherein the polyisocyanate component further comprises
an allophanate-modified 1,4-bis(isocyanatomethyl)cyclohexane including 80-93% by mole of trans isomers and
an isocyanurate-modified 1,4-bis(isocyanatomethyl)cyclohexane including 80-93% by mole of trans isomers
so as to have an allophanate/isoeyanurate composition ratio of 50/50 to 100/0,
to be prepared as a two-part curing polyurethane resin.

18. The polyurethane resin according to claim 1,
further comprising a foaming agent and
being obtained as a polyurethane foam by foaming and reaction.

19. The polyurethane resin according to claim 17, wherein
the active hydrogen compound component is a polyol component,
the polyol component having a hydroxyl value of 10 to 120 mg KOH/g and
a primary hydroxyl group at its molecular end of not less than 40% by mole or more.

20. The polyurethane resin according to claim 17, being used as a molded article for clothing, sanitary, or shoes.

* * * * *

UNITED STATES PATENT AND TRADEMARK OFFICE
CERTIFICATE OF CORRECTION

PATENT NO. : 8,722,752 B2
APPLICATION NO. : 12/682714
DATED : May 13, 2014
INVENTOR(S) : Goro Kuwamura et al.

It is certified that error appears in the above-identified patent and that said Letters Patent is hereby corrected as shown below:

In the Claims

Please correct the claim as follows:

Claim 1, Column 71, lines 47-48, delete "1,4-bis(isoeyanatomethyl)cyclohexane" and insert --1.4-bis(isocyanatomethyl)cyclohexane--

Signed and Sealed this
Fifth Day of August, 2014

Michelle K. Lee
*Deputy Director of the United States Patent and Trademark Office*